(12) United States Patent
He et al.

(10) Patent No.: US 11,096,142 B2
(45) Date of Patent: Aug. 17, 2021

(54) TERMINAL DEVICE LOCATION DETERMINING METHOD AND DEVICE

(71) Applicant: HUAWEI TECHNOLOGIES CO., LTD., Shenzhen (CN)

(72) Inventors: Chengdong He, Shenzhen (CN); Hua Li, Xi'an (CN); Xuwen Zhao, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/004,171

(22) Filed: Aug. 27, 2020

(65) Prior Publication Data

US 2020/0396711 A1 Dec. 17, 2020

Related U.S. Application Data

(63) Continuation of application No. PCT/CN2019/078310, filed on Mar. 15, 2019.

(30) Foreign Application Priority Data

Mar. 27, 2018 (CN) .......................... 201810260329.X

(51) Int. Cl.
*H04W 64/00* (2009.01)
*H04W 8/08* (2009.01)
(52) U.S. Cl.
CPC ........... *H04W 64/006* (2013.01); *H04W 8/08* (2013.01)
(58) Field of Classification Search
CPC .............................. H04W 64/006; H04W 8/08
See application file for complete search history.

(56) References Cited

U.S. PATENT DOCUMENTS

2014/0068778 A1 3/2014 Bhatia et al.
2018/0302794 A1* 10/2018 Liu .................. H04W 36/0022

FOREIGN PATENT DOCUMENTS

| CN | 101442788 A | 5/2009 |
| CN | 102045688 A | 5/2011 |
| CN | 103179504 A | 6/2013 |

(Continued)

OTHER PUBLICATIONS

3GPP. "3rd Generation Partnership Project; Technical Specification Group Service and System Aspects; Security of H(e)NB; (Release 8)." 3GPP TR 33.820 V2.0.0, Mar. 1, 2009, 75 pages.

*Primary Examiner* — Charles T Shedrick
(74) *Attorney, Agent, or Firm* — Maier & Maier, PLLC

(57) ABSTRACT

A terminal device location determining method and a device. A core network device obtains location information of a terminal device reported by the terminal device and location information reported by a first base station. The core network device determines whether the location information of the terminal device matches the location information reported by the first base station, and if the location information of the terminal device does not match the location information reported by the first base station, the core network device sends a reject message to the terminal device. By determining, through comparison, whether the location information of the terminal device reported by the terminal device matches the location information reported by the base station, it can be determined whether a location of the terminal device is incorrectly determined.

6 Claims, 30 Drawing Sheets

(56) References Cited

FOREIGN PATENT DOCUMENTS

| | | | | |
|---|---|---|---|---|
| CN | 104244281 A | | 12/2014 | |
| CN | 105764059 A | | 7/2016 | |
| CN | 106792710 A | | 5/2017 | |
| CN | 106912052 A | * | 6/2017 | |
| CN | 107071779 A | | 8/2017 | |
| CN | 107241729 A | | 10/2017 | |
| CN | 107295520 A | * | 10/2017 | |
| CN | 108574934 A | * | 9/2018 | |
| CN | 109275146 A | | 1/2019 | |
| CN | 109495838 A | * | 3/2019 | |
| CN | 110012435 A | * | 7/2019 | ............ H04W 4/029 |
| CN | 110809316 A | * | 2/2020 | |
| CN | 112055384 A | * | 12/2020 | |
| WO | WO-2019134589 A1 | * | 7/2019 | ............ H04W 64/00 |

* cited by examiner

TERMINAL DEVICE LOCATION DETERMINING METHOD AND DEVICE

CROSS-REFERENCE TO RELATED APPLICATIONS

This application is a continuation of International Application No. PCT/CN2019/078310, filed on Mar. 15, 2019, which claims priority to Chinese Patent Application No. 201810260329.X, filed on Mar. 27, 2018. The disclosures of the aforementioned applications are hereby incorporated by reference in their entireties.

TECHNICAL FIELD

Embodiments relate to the field of communications technologies, and in particular, to a terminal device location determining method and a device.

BACKGROUND

Recently, a major vulnerability has been found in the 4th generation communications system (4G). An attacker may exploit this vulnerability to fabricate and forward false information. This allows the attacker to impersonate a victim to access a network and misstate location information of the victim.

FIG. 1 is a message exchange diagram of an attack manner. As shown in FIG. 1, when a normal terminal device (user equipment, UE) accesses a network, a pseudo base station (malicious eNB) entices, by increasing signal transmit power, the normal UE to establish a communication connection to the pseudo base station. The pseudo base station and pseudo UE (malicious UE) cross two regions to form a malicious network. The pseudo base station forwards an attach request of the normal UE to the remote pseudo UE, and the pseudo UE forwards the attach request to a remote core network device by using a remote authorized base station. Similarly, the pseudo base station and the pseudo UE then forward, to the normal UE, a response message delivered by the core network device, so that the normal UE can successfully access the network by using the pseudo base station and the pseudo UE. In this way, a user location sensed by the network is inconsistent with an actual user location. For example, the normal UE and the pseudo base station are located in a city A, and the pseudo UE and the authorized base station are located in a city B. By forwarding a message by using the pseudo base station and the pseudo UE, an attacker may make the normal UE access the authorized base station located in the city B, so that the network considers that the normal UE is located in the city B.

In the foregoing attack method, a location of the terminal device is incorrectly determined by the network, and the authorized UE may be guided by the attacker to access a roaming network, resulting in a billing discrepancy.

SUMMARY

Embodiments provide a terminal device location determining method and a device. In the method, a core network device determines, by comparing location information provided by a base station with location information provided by a terminal device, whether a location of the terminal device is incorrect, to avoid a billing discrepancy resulting from incorrect location information.

According to a first aspect, an embodiment provides a terminal device location determining method. The method includes: obtaining, by a core network device, location information of a terminal device reported by the terminal device and location information reported by a first base station; determining, by the core network device, whether the location information of the terminal device matches the location information reported by the first base station; and if the location information of the terminal device does not match the location information reported by the first base station, sending, by the core network device, a reject message to the terminal device.

Optionally, in a possible implementation of the first aspect, the core network device is a mobility management device, and the obtaining, by a core network device, location information of a terminal device reported by the terminal device includes: obtaining, by the mobility management device by using a non-access stratum (NAS) initial attach request message, a NAS registration request message, or a NAS SMC complete response message, the location information of the terminal device reported by the terminal device.

Optionally, in a possible implementation of the first aspect, the core network device is a location management network element, and the obtaining, by a core network device, location information of a terminal device reported by the terminal device and location information reported by a first base station includes: receiving, by the location management network element, a request message sent by a mobility management device, where the request message includes the location information of the terminal device and the location information reported by the first base station.

Optionally, in a possible implementation of the first aspect, the location information of the terminal device includes at least one of the following: location information broadcast by a second base station, where the second base station is a base station accessed by the terminal device; auxiliary location information, where the auxiliary location information is information provided by an auxiliary positioning device, and the auxiliary location information is used to indicate a location of the terminal device; and location information broadcast by a third base station, where the third base station is a base station whose distance to the second base station is shorter than a preset distance.

According to a second aspect, an embodiment provides a terminal device location determining method. The method includes: obtaining, by a terminal device, location information of the terminal device, where the location information of the terminal device is used to indicate a current location of the terminal device; sending, by the terminal device, the location information of the terminal device to a core network device; and if the terminal device receives a reject message sent by the core network device, performing, by the terminal device, processing based on a cause value carried in the reject message.

Optionally, in a possible implementation of the second aspect, the sending, by the terminal device, the location information of the terminal device to a core network device includes: sending, by the terminal device, the location information of the terminal device to the core network device by using a NAS initial attach request message, a NAS registration request message, or a NAS SMC complete response message.

Optionally, in a possible implementation of the second aspect, the method further includes: if the cause value is used to indicate location inconsistency, re-initiating, by the terminal device, registration or attachment after a preset time period.

Optionally, in a possible implementation of the second aspect, the method further includes: determining, by the terminal device based on the location information of the terminal device, whether the current location of the terminal device is abnormal; and if the current location of the terminal device is abnormal, providing, by the terminal device, a prompt.

Optionally, in a possible implementation of the second aspect, the location information of the terminal device includes at least one of the following: location information broadcast by a second base station, where the second base station is a base station accessed by the terminal device; auxiliary location information, where the auxiliary location information is information provided by an auxiliary positioning device, and the auxiliary location information is used to indicate a location of the terminal device; and location information broadcast by a third base station, where the third base station is a base station whose distance to the second base station is shorter than a preset distance.

According to a third aspect, an embodiment provides a terminal device location determining method. The method includes: sending, by a mobility management device, a positioning request message to a terminal device; receiving, by the mobility management device, a positioning response message sent by the terminal device, where the positioning response message includes location information reported by the terminal device; determining, by the mobility management device, whether location information reported by a first base station matches the location information reported by the terminal device; and if the location information reported by the first base station does not match the location information reported by the terminal device, sending, by the mobility management device, a deregistration message or a detach message to the terminal device.

Optionally, in a possible implementation of the third aspect, the determining, by the mobility management device, whether location information reported by a first base station matches the location information reported by the terminal device includes: sending, by the mobility management device to a location management network element, the location information reported by the first base station and the location information reported by the terminal device; and receiving, by the mobility management device, a location matching result returned by the location management network element, where the location matching result is used to indicate whether the location information reported by the first base station matches the location information reported by the terminal device.

Optionally, in a possible implementation of the third aspect, the location information reported by the terminal device includes at least one of the following: location information broadcast by a second base station, where the second base station is a base station accessed by the terminal device; auxiliary location information, where the auxiliary location information is information provided by an auxiliary positioning device, and the auxiliary location information is used to indicate a location of the terminal device; and location information broadcast by a third base station, where the third base station is a base station whose distance to the second base station is shorter than a preset distance.

According to a fourth aspect, an embodiment provides a terminal device location determining method. The method includes: receiving, by a terminal device, a positioning request message sent by a core network device; sending, by the terminal device, a positioning response message to the core network device, where the positioning response message includes current location information of the terminal device; and if the terminal device receives a deregistration message or a detach message sent by the core network device, performing, by the terminal device, processing based on a cause value in the deregistration message or the detach message.

Optionally, in a possible implementation of the fourth aspect, the current location information of the terminal device includes at least one of the following: location information broadcast by a second base station, where the second base station is a base station accessed by the terminal device; auxiliary location information, where the auxiliary location information is information provided by an auxiliary positioning device, and the auxiliary location information is used to indicate a location of the terminal device; and location information broadcast by a third base station, where the third base station is a base station whose distance to the second base station is shorter than a preset distance.

According to a fifth aspect, an embodiment provides a terminal device location determining method. The method includes: obtaining, by a core network device, location information reported by a first base station; determining, by the core network device, a NAS integrity protection key based on the location information reported by the first base station; and sending, by the core network device, a NAS SMC message to a terminal device, where the NAS SMC message is used to perform integrity protection by using the NAS integrity protection key.

Optionally, in a possible implementation of the fifth aspect, the method further includes: if the core network device receives a SMC reject message sent by the terminal device, sending, by the core network device, an attach reject message or a registration reject message to the terminal device.

Optionally, in a possible implementation of the fifth aspect, the core network device is a mobility management device, and the determining, by the core network device, a NAS integrity protection key based on the location information reported by the first base station includes: sending, by the mobility management device to a data management network element, the location information reported by the first base station; receiving, by the mobility management device, an access security management entity key sent by the data management network element, where the access security management entity key is determined by the data management network element based on the location information reported by the first base station; and obtaining, by the mobility management device, the NAS integrity protection key based on the access security management entity key.

According to a sixth aspect, an embodiment provides a terminal device location determining method. The method includes: receiving, by a terminal device, a NAS SMC message sent by a core network device; determining, by the terminal device, a NAS integrity protection key based on current location information of the terminal device; and performing, by the terminal device, integrity check on the NAS SMC message based on the NAS integrity protection key.

Optionally, in a possible implementation of the sixth aspect, the method further includes: if the integrity check performed by the terminal device on the NAS SMC message based on the NAS integrity protection key fails, sending, by the terminal device, a NAS security mode reject message to the core network device, where the NAS security mode reject message carries a cause value used to indicate location inconsistency.

According to a seventh aspect, an embodiment provides a terminal device location determining method. The method includes: obtaining, by a mobility management device, location information reported by a first base station; determining, by the mobility management device based on the location information reported by the first base station, a temporal key used by the first base station; and sending, by the mobility management device, the temporal key used by the first base station to the first base station.

According to an eighth aspect, an embodiment provides a terminal device location determining method. The method includes: receiving, by a terminal device, an access stratum SMC message sent by a first base station; determining, by the terminal device, an access stratum integrity protection key based on current location information of the terminal device; and performing, by the terminal device, integrity check on the access stratum SMC message based on the access stratum integrity protection key.

Optionally, in a possible implementation of the eighth aspect, the method further includes: if the integrity check performed by the terminal device on the access stratum SMC message based on the access stratum integrity protection key fails, sending, by the terminal device, an access stratum security mode reject message to the first base station.

According to a ninth aspect, an embodiment provides a terminal device location determining method. The method includes: determining, by a first base station, an access stratum integrity protection key based on location information of the first base station; performing, by the first base station, integrity protection on an access stratum SMC message based on the access stratum integrity protection key; and sending, by the first base station, the access stratum SMC message to a terminal device.

According to a tenth aspect, an embodiment provides a core network device, including: a transceiver module, configured to obtain location information of a terminal device reported by the terminal device and location information reported by a first base station; and a processing module, configured to determine whether the location information of the terminal device matches the location information reported by the first base station, where the transceiver module is further configured to: if the location information of the terminal device does not match the location information reported by the first base station, send a reject message to the terminal device.

Optionally, in a possible implementation of the tenth aspect, the core network device is a mobility management device, and the transceiver module is optionally configured to obtain, by using a NAS initial attach request message, a NAS registration request message, or a NAS SMC complete response message, the location information of the terminal device reported by the terminal device.

Optionally, in a possible implementation of the tenth aspect, the core network device is a location management network element, and the transceiver module is optionally configured to receive a request message sent by a mobility management device, where the request message includes the location information of the terminal device and the location information reported by the first base station.

Optionally, in a possible implementation of the tenth aspect, the location information of the terminal device includes at least one of the following: location information broadcast by a second base station, where the second base station is a base station accessed by the terminal device; auxiliary location information, where the auxiliary location information is information provided by an auxiliary positioning device, and the auxiliary location information is used to indicate a location of the terminal device; and location information broadcast by a third base station, where the third base station is a base station whose distance to the second base station is shorter than a preset distance.

According to an eleventh aspect, an embodiment provides a terminal device, including: a processing module, configured to obtain location information of the terminal device, where the location information of the terminal device is used to indicate a current location of the terminal device; and a transceiver module, configured to send the location information of the terminal device to a core network device, where the processing module is further configured to: if the transceiver module receives a reject message sent by the core network device, perform processing based on a cause value carried in the reject message.

Optionally, in a possible implementation of the eleventh aspect, the transceiver module is optionally configured to send the location information of the terminal device to the core network device by using a NAS initial attach request message, a NAS registration request message, or a NAS SMC complete response message.

Optionally, in a possible implementation of the eleventh aspect, the transceiver module is further configured to: if the cause value is used to indicate location inconsistency, re-initiate registration or attachment after a preset time period.

Optionally, in a possible implementation of the eleventh aspect, the processing module is further configured to: determine, based on the location information of the terminal device, whether the current location of the terminal device is abnormal; and if the current location of the terminal device is abnormal, provide a prompt.

Optionally, in a possible implementation of the eleventh aspect, the location information of the terminal device includes at least one of the following: location information broadcast by a second base station, where the second base station is a base station accessed by the terminal device; auxiliary location information, where the auxiliary location information is information provided by an auxiliary positioning device, and the auxiliary location information is used to indicate a location of the terminal device; and location information broadcast by a third base station, where the third base station is a base station whose distance to the second base station is shorter than a preset distance.

According to a twelfth aspect, an embodiment provides a mobility management device, including: a transceiver module, configured to send a positioning request message to a terminal device, and receive a positioning response message sent by the terminal device, where the positioning response message includes location information reported by the terminal device; and a processing module, configured to determine whether location information reported by a first base station matches the location information reported by the terminal device, where the transceiver module is further configured to: if the location information reported by the first base station does not match the location information reported by the terminal device, send a deregistration message or a detach message to the terminal device.

Optionally, in a possible implementation of the twelfth aspect, the transceiver module is optionally configured to: send, to a location management network element, the location information reported by the first base station and the location information reported by the terminal device; and receive a location matching result returned by the location management network element, where the location matching result is used to indicate whether the location information reported by the first base station matches the location information reported by the terminal device.

Optionally, in a possible implementation of the twelfth aspect, the location information of the terminal device includes at least one of the following: location information broadcast by a second base station, where the second base station is a base station accessed by the terminal device; auxiliary location information, where the auxiliary location information is information provided by an auxiliary positioning device, and the auxiliary location information is used to indicate a location of the terminal device; and location information broadcast by a third base station, where the third base station is a base station whose distance to the second base station is shorter than a preset distance.

According to a thirteenth aspect, an embodiment provides a terminal device, including: a transceiver module, configured to: receive a positioning request message sent by a core network device, and send a positioning response message to the core network device, where the positioning response message includes current location information of the terminal device; and a processing module, configured to: if the transceiver module receives a deregistration message or a detach message sent by the core network device, perform processing based on a cause value in the deregistration message or the detach message.

Optionally, in a possible implementation of the thirteenth aspect, the location information of the terminal device includes at least one of the following: location information broadcast by a second base station, where the second base station is a base station accessed by the terminal device; auxiliary location information, where the auxiliary location information is information provided by an auxiliary positioning device, and the auxiliary location information is used to indicate a location of the terminal device; and location information broadcast by a third base station, where the third base station is a base station whose distance to the second base station is shorter than a preset distance.

According to a fourteenth aspect, an embodiment provides a core network device, including: a transceiver module, configured to obtain location information reported by a first base station; and a processing module, configured to determine a NAS integrity protection key based on the location information reported by the first base station, where the transceiver module is further configured to send a NAS SMC message to a terminal device, where the NAS SMC message is used to perform integrity protection by using the NAS integrity protection key.

Optionally, in a possible implementation of the fourteenth aspect, the transceiver module is further configured to: if a SMC reject message sent by the terminal device is received, send an attach reject message or a registration reject message to the terminal device.

Optionally, in a possible implementation of the fourteenth aspect, the core network device is a mobility management network element, and the transceiver module is optionally configured to send, to a data management network element, the location information reported by the first base station; and receive an access security management entity key sent by the data management network element, where the access security management entity key is determined by the data management network element based on the location information reported by the first base station; and the processing module is further configured to obtain a NAS integrity protection key based on the access security management entity key.

According to a fifteenth aspect, an embodiment provides a terminal device, including: a transceiver module, configured to receive a NAS SMC message sent by a core network device; and a processing module, configured to: determine a NAS integrity protection key based on current location information of the terminal device, and perform integrity check on the NAS SMC message based on the NAS integrity protection key.

Optionally, in a possible implementation of the fifteenth aspect, the transceiver module is further configured to: if the integrity check performed on the NAS SMC message based on the NAS integrity protection key fails, send a NAS security mode reject message to the core network device, where the NAS security mode reject message carries a cause value used to indicate location inconsistency.

According to a sixteenth aspect, an embodiment provides a mobility management device, including: a transceiver module, configured to obtain location information reported by a first base station; and a processing module, configured to determine, based on the location information reported by the first base station, a temporal key used by the first base station, where the transceiver module is further configured to send the temporal key used by the first base station to the first base station.

According to a seventeenth aspect, an embodiment provides a terminal device, including: a transceiver module, configured to receive an access stratum SMC message sent by a first base station; and a processing module, configured to: determine an access stratum integrity protection key based on current location information of the terminal device, and perform integrity check on the access stratum SMC message based on the access stratum integrity protection key.

Optionally, in a possible implementation of the seventeenth aspect, the transceiver module is further configured to: if the integrity check performed on the access stratum SMC message based on the access stratum integrity protection key fails, send an access stratum security mode reject message to the first base station.

According to an eighteenth aspect, an embodiment provides a base station, including: a processing module, configured to: determine an access stratum integrity protection key based on location information of a first base station, and perform integrity protection on an access stratum SMC message based on the access stratum integrity protection key; and a transceiver module, configured to send the access stratum SMC message to a terminal device.

According to a nineteenth aspect, an embodiment provides a core network device, including a memory, a processor, a transceiver, and a computer program. The computer program is stored in the memory, and the processor runs the computer program to perform the terminal device location determining method according to any one of the first aspect, the third aspect, the fifth aspect, and the seventh aspect.

According to a twentieth aspect, an embodiment provides a terminal device, including a memory, a processor, a transceiver, and a computer program. The computer program is stored in the memory, and the processor runs the computer program to perform the terminal device location determining method according to any one of the second aspect, the fourth aspect, the sixth aspect, and the eighth aspect.

According to a twenty-first aspect, an embodiment provides a base station, including a memory, a processor, a transceiver, and a computer program. The computer program is stored in the memory, and the processor runs the computer program to perform the terminal device location determining method according to any possible implementation of the ninth aspect.

According to a twenty-second aspect, an embodiment provides a storage medium, including a readable storage medium and a computer program. The computer program is used to implement the terminal device location determining method according to any possible implementation of any aspect.

The embodiments provide the terminal device location determining method and the device. By determining, through comparison, whether the location information of the terminal device reported by the terminal device matches the location information reported by the base station, it can be determined whether a location of the terminal device is incorrectly determined. In this way, accuracy of determining the location of the terminal device is improved, and a billing discrepancy is avoided.

DESCRIPTION OF EMBODIMENTS

Figure 2:
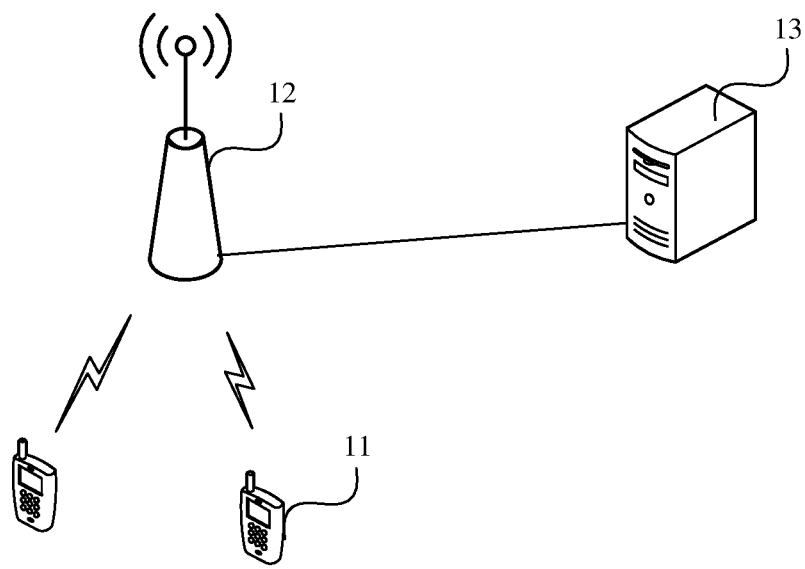
FIG. 2 is a network architectural diagram of a communications system to which an embodiment is applicable.

A terminal device location determining method and a device that are provided in the embodiments can be applied to a long term evolution (LTE) communications system and its subsequent evolved communications system, a future 5G communications system, and another communications system. For example, FIG. 2 is a network architectural diagram of a communications system to which an embodiment is applicable. As shown in FIG. 2, the communications system may include a terminal device 11, a base station 12, and a core network device 13. The terminal device 11 may perform uplink and downlink communication with the base station 12. The terminal device 11 may perform uplink and downlink communication with the core network device 13 by using the base station 12.

The terminal device 11 in the embodiments is a device with a wireless connection function, for example, a mobile phone, a tablet computer, a handheld device, a vehicle-mounted device, a wearable device, a computing device, and various forms of mobile stations and terminal devices. This is not limited in the embodiments.

The base station 12 in the embodiments may be any device that has a wireless network resource management function, or various wireless access points. For example, the base station 12 is an evolved NodeB (evolutional node B, eNB or eNodeB), a relay node, or an access point in an LTE communications system, or a gNodeB (gNB) or a wireless transceiver device (next node, NX) in a future 5G communications system. This is not limited in the embodiments.

The core network device 13 in the embodiments may include, for example, a mobility management entity MME), a home subscriber server (HSS), and an evolved serving mobile location center (E-SMLC) that are applied to a 4G network. For another example, the core network device 13 may include an access and mobility management function (AMF), an authentication server function (AUSF), a unified data management (UDM) entity, and a location management function (LMF) that are applied to a 5G network. This is not limited in the embodiments. The MME and the AMF may also be referred to as mobility management devices, and the E-SMLC and the LMF may also be referred to as location management network elements or location management devices. The HSS and the UDM entity may be referred to as data management network elements or data management devices.

For function descriptions of the network elements in the embodiments, refer to Table 1, Table 2, and Table 3.

TABLE 1

Function description of the terminal device

| Network element name | Function description |
|---|---|
| UE | When being used for the first time, the terminal device needs to send a registration request message to a network, and may report current location information. The UE calculates an authentication vector and derives a key in an authentication procedure; and completes integrity check on a non-access stratum (NAS)/access stratum (AS) security mode command (SMC) message in an SMC procedure. |

TABLE 2

Function description of the base station

| Network element name | Function description |
|---|---|
| gNB | The gNB is a wireless base station in a 5G network, and has a function similar to that of an eNB in a 4G network. The gNB receives the registration request message sent by the UE, and forwards a NAS message to the AMF; and reports location information, derives a radio resource control (RRC) integrity key, initiates an access stratum SMC procedure, and performs integrity protection on an access stratum SMC message. |
| eNB | The eNB is a wireless base station in the 4G network, and has a function similar to that of the gNB in the 5G network. |

TABLE 3

Function description of the core network device

| Network element name | Function description |
|---|---|
| AMF | The access and mobility management function is responsible for functions such as access and mobility management and security key derivation. The AMF receives the registration request message sent by the UE, stores the location information reported by the gNB, compares location information and authentication values, derives a NAS integrity key, initiates a NAS SMC procedure, and performs integrity protection on a NAS SMC message. |
| AUSF | The authentication server function performs extensible authentication protocol (EAP) authentication and home network authentication confirmation. |
| UDM | The unified data management entity stores a root key of a user and authentication-related subscription data, and calculates a 5G authentication vector. |
| LMF | The location management function manages and compares location information, and feeds back a result to the AMF. |
| MME | The mobility management entity is responsible for functions such as access and mobility management and security key derivation. The MME receives the registration request message sent by the UE, stores location information reported by the eNB, compares location information and authentication values, derives a NAS integrity key, initiates a NAS SMC procedure, and performs integrity protection on a NAS SMC message. |
| HSS | The home subscriber server derives a KASME key and calculates XRES**. |
| E-SMLC | The evolved serving mobile location center compares current location information reported by the NAS stratum UE, UE-assisted positioning information, and the location information of the UE reported by the eNB by using an S1 message, to determine whether the two pieces of location information of the UE match each other. |

The following describes related concepts in the embodiments.

1. Base Station

Three types of base stations are mentioned in the embodiments, and may be respectively referred to as a first base station, a second base station, and a third base station.

(1) First Base Station

The first base station is a base station connected to a terminal device and a core network device. The terminal device may be located within a coverage area of the first base station, or may be located outside a coverage area of the first base station.

Figure 1:
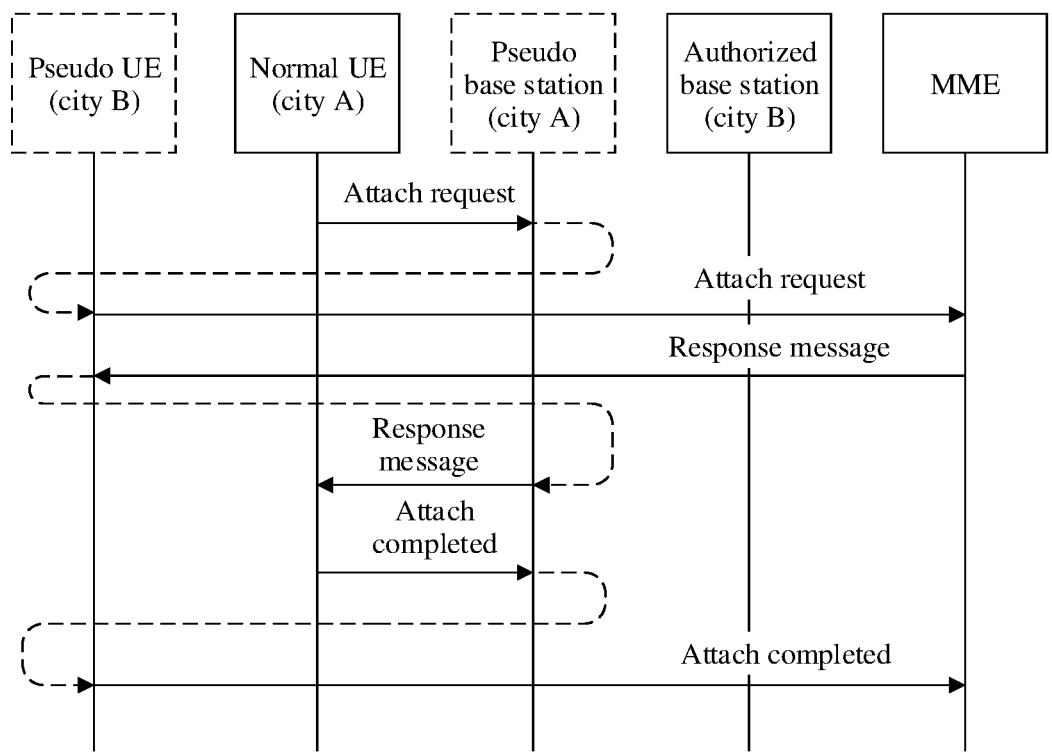
FIG. 1 is a message exchange diagram of an attack manner.

For example, as shown in FIG. 1, a first base station corresponding to the normal UE is the authorized base station located in the city B.

(2) Second Base Station

The terminal device may access a cell served by the second base station. In other words, the terminal device is located within a coverage area of the second base station. It can be understood that the first base station and the second base station may be the same base station, or may be two different base stations.

For example, as shown in FIG. 1, a second base station corresponding to the normal UE is the pseudo base station located in the city A. In this case, the first base station and the second base station that are corresponding to the normal UE are different.

In addition, it should be noted that if there is no malicious or unauthorized base station, the first base station and the second base station are the same base station. If there is a malicious base station or an unauthorized base station, the second base station is a malicious base station or an unauthorized base station, and the first base station is an authorized base station. In this case, the first base station and the second base station are different base stations.

(3) Third Base Station

The third base station is a base station adjacent to the second base station. The terminal device may receive a signal transmitted by the third base station. A quantity of third base stations is not limited in the embodiments.

For example, a base station whose distance to the second base station is shorter than a preset distance is referred to as a third base station. For example, the preset distance is 500 meters. In this case, all base stations within a range that uses the second base station as a center of circle and whose radius is 500 meters are third base stations. The preset distance is not limited herein, and may be 100 meters, 200 meters, 500 meters, 1000 meters, or the like.

Still using FIG. 1 as an example, the third base station may be another base station (not shown) geographically adjacent to the pseudo base station.

2. Location Information Reported by the Base Station

In the embodiments, meanings of "location information of the base station" and the "location information reported by the base station" are similar in some scenarios, and both can be understood as a current location, indicated by the base station side, of the terminal device.

Optionally, the location information reported by the base station may be tracking area identity (TAI) information.

3. Location Information of the Terminal Device

In the embodiments, meanings of the "location information of the terminal device", "current location information of the terminal device", and "location information reported by the terminal device" are similar in some scenarios, and all can be understood as a current location, indicated by the UE side, of the terminal device.

It should be noted that the UE may report the location information of the terminal device to the core network device by using a NAS message, or may not report the location information of the terminal device to the core network device.

Optionally, in different implementations, the location information of the terminal device may include at least one of the following:

(1) Location Information Broadcast by the Second Base Station.

For example, as shown in FIG. 1, the second base station corresponding to the normal UE is a pseudo base station. The location information of the terminal device may be location information of the pseudo base station broadcast by the pseudo base station.

In an application scenario, the pseudo base station does not tamper with the location information of the pseudo base station. The location information of the pseudo base station is marked as TAI-A. In this case, the location information of the terminal device is TAI-A. It should be noted that the first base station corresponding to the normal UE is the authorized base station located in the city B. Location information reported by the authorized base station is marked as TAI-B. In this case, the location information of the terminal device (TAI-A) is inconsistent with the location information reported by the authorized base station (TAI-B).

In another application scenario, the pseudo base station may tamper with the location information of the pseudo base station. The location information of the pseudo base station may be tampered with from TAI-A to TAI-B. In this case, the location information of the terminal device is TAI-B. It should be noted that the first base station corresponding to the normal UE is the authorized base station located in the city B. Location information reported by the authorized base station is marked as TAI-B. In this case, the location information of the terminal device (TAI-B) is consistent with the location information reported by the authorized base station (TAI-B).

(2) Auxiliary Location Information

The auxiliary location information is information provided by an auxiliary positioning device, and the auxiliary location information is used to indicate a location of the terminal device.

Optionally, the auxiliary location information may include latitude and longitude information obtained by the terminal device by using a global navigation satellite system (GNSS), a network service set identifier (SSID) obtained by the terminal device by using a wireless local area network (WLAN), and the like.

It can be understood that, because the auxiliary location information indicates a region in which the terminal device is located, when the location information broadcast by the second base station does not match the auxiliary location information, a current location of the terminal device may be abnormal.

For example, if the auxiliary location information indicates that a current location of the UE is the city A, and location information of the second base station indicates that the current location of the UE is the city B, the current location of the UE may be abnormal.

(3) Location Information Broadcast by the Third Base Station

In an exemplary embodiment, the terminal device may receive a broadcast message sent by at least one third base station, to obtain the location information of the third base station carried in the broadcast message.

It can be understood that when the location information broadcast by the second base station is inconsistent with the location information broadcast by the third base station, the current location of the terminal device may be abnormal.

For example, if the location information broadcast by the second base station indicates that the current location of the UE is the city B, and the location information broadcast by the third base station indicates that the current location of the UE is the city A, the current location of the UE may be abnormal.

In view of a prior-art technical problem that a location of a terminal device may be incorrectly determined, the embodiments provide a terminal device location determining method and a device. A core network device may determine whether location information reported by a terminal device matches location information reported by a base station, to determine whether a user location is abnormal; or location information is additionally used during key derivation in an authentication process and an integrity protection process. In this way, when the two pieces of location information do not match each other, the terminal device can be prevented from accessing a network, thereby resolving the technical problem that a location of a terminal device is incorrectly determined.

By using exemplary embodiments, the following describes in detail the technical solutions and how the foregoing technical problem is resolved by using the technical solutions. The following several exemplary embodiments may be combined with each other, and the same or a similar concept or process may not be described repeatedly in some embodiments.

Figure 3:
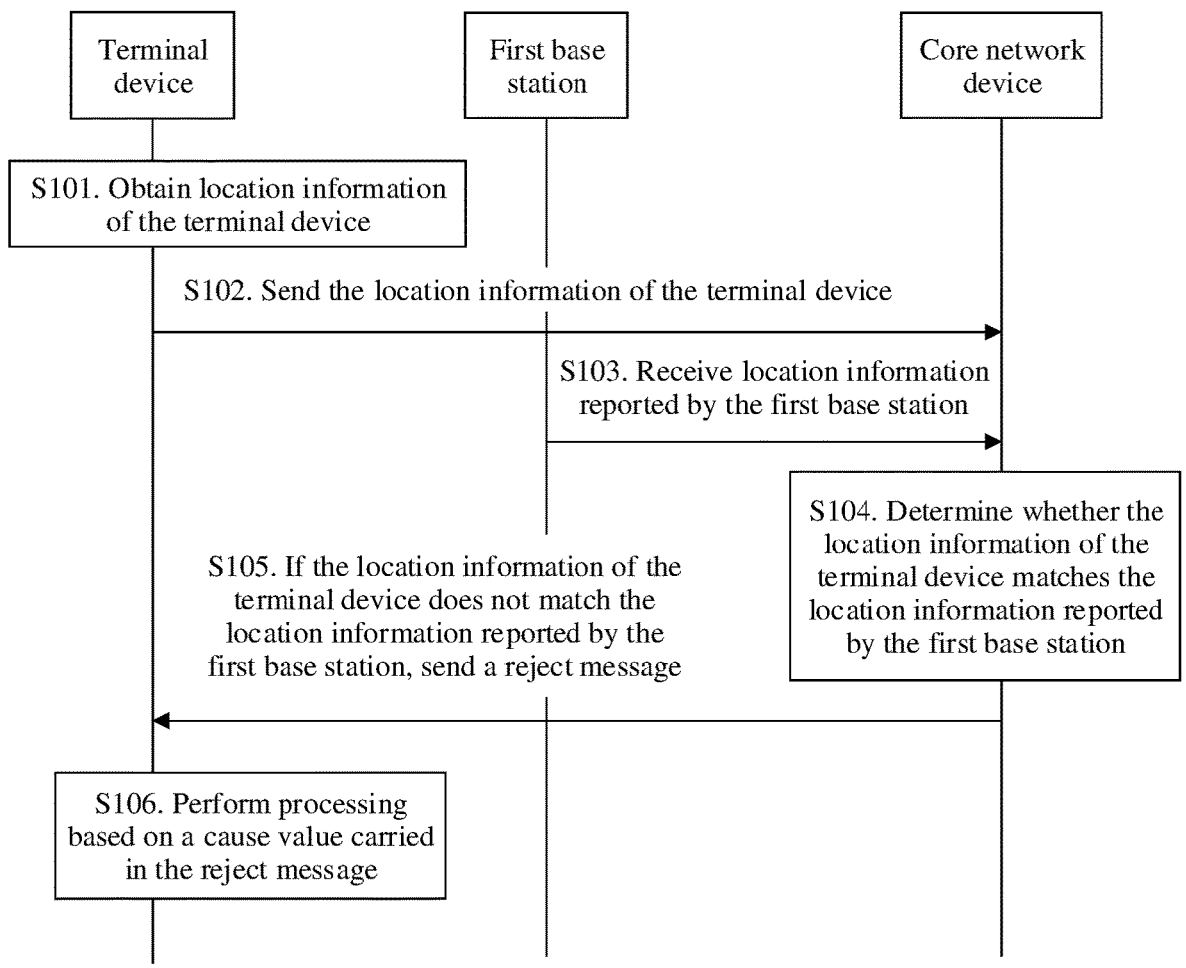
FIG. 3 is a message exchange diagram of a terminal device location determining method according to Embodiment 1.

FIG. 3 is a message exchange diagram of a terminal device location determining method according to Embodiment 1. The terminal device location determining method provided in this embodiment can be applied to a 4G communications network, a 5G communications network, or another communications network. Network elements in this embodiment may include a terminal device, a base station, and a core network device. As shown in FIG. 3, the terminal device location determining method provided in this embodiment may include the following steps.

In step S101, the terminal device obtains location information of the terminal device.

The location information of the terminal device is used to indicate a current location of the terminal device.

Optionally, the location information of the terminal device may include at least one of the following:

location information broadcast by a second base station, where the second base station is a base station accessed by the terminal device;

auxiliary location information, where the auxiliary location information is information provided by an auxiliary positioning device, and the auxiliary location information is used to indicate a location of the terminal device; and location information broadcast by a third base station, where the third base station is a base station whose distance to the second base station is shorter than a preset distance.

Optionally, the obtaining, by the terminal device, location information of the terminal device may include at least one of the following:

receiving, by the terminal device, the broadcast message sent by the second base station, where the broadcast message carries location information of the second base station;

obtaining, by the terminal device, the auxiliary location information; and receiving, by the terminal device, the broadcast message sent by the third base station, where the broadcast message carries location information of the third base station.

In step S102, the terminal device sends the location information of the terminal device to the core network device.

Correspondingly, the core network device receives the location information of the terminal device sent by the terminal device.

Optionally, the sending, by the terminal device, the location information of the terminal device to the core network device includes:

sending, by the terminal device, the location information of the terminal device to the core network device by using a NAS initial attach request message, a NAS registration request message, or a NAS SMC complete response message.

The location information of the terminal device is sent to the core network device by using the initial attach request message or the registration request message. In this way, the core network device can earlier determine whether the location of the terminal device is abnormal, to simplify message exchange in an attach process or a registration process, thereby reducing use of an air interface resource, and improving resource utilization.

The location information of the terminal device is sent to the core network device by using the NAS SMC complete response message. Because integrity protection is performed on an access stratum SMC complete response message, accuracy of determining whether the location of the terminal device is abnormal can be further improved.

In step S103, the core network device receives location information reported by a first base station.

It should be noted that a sequence of performing S102 and S103 is not limited in this embodiment. For example, S102 may be performed before S103; S103 may be performed before S102; or S102 and S103 are performed at the same time. In this case, the location information of the terminal device and the location information reported by the first base station may be carried in one message, or may be carried in different messages.

Optionally, the core network device is a mobility management device, and obtaining the location information of the terminal device reported by the terminal device may include: obtaining, by the mobility management device by using a NAS initial attach request message, a NAS registration request message, or a NAS SMC complete response message, the location information of the terminal device reported by the terminal device.

Optionally, when the terminal device sends the location information of the terminal device to the core network device by using the NAS initial attach request message or the NAS registration request message, a NAS protocol data unit (NAS-PDU) in the NAS message carries the location information of the terminal device. After receiving the NAS message, the first base station may package together the NAS-PDU (the location information of the terminal device) and the location information reported by the first base station, and send packaged information to the core network device by using an S1/N2 interface message.

Optionally, the core network device is a location management network element, and obtaining the location information of the terminal device reported by the terminal device and the location information reported by the first base station may include:

receiving, by the location management network element, a request message sent by a mobility management device, where the request message includes the location information of the terminal device and the location information reported by the first base station, and the mobility management device is an AMF or an MME.

In step S104, the core network device determines whether the location information of the terminal device matches the location information reported by the first base station.

When a determining result is that the location information of the terminal device matches the location information reported by the first base station, a subsequent procedure is normally performed. When the determining result is that the location information of the terminal device does not match the location information reported by the first base station, step S105 may be performed.

Optionally, in an implementation, if the location information of the terminal device includes the location information broadcast by the second base station, the determining, by the core network device, whether the location information of the terminal device matches the location information reported by the first base station may include:

determining, by the core network device, whether the location information broadcast by the second base station is consistent with the location information reported by the first base station; and if the location information broadcast by the second base station is consistent with the location information reported by the first base station, determining that the location information of the terminal device matches the location information reported by the first base station and that a current location of the terminal device is normal; or if the location information broadcast by the second base station is inconsistent with the location information reported by the first base station, determining that the location information of the terminal device does not match the location information reported by the first base station and that a current location of the terminal device is abnormal.

An example is used for description. As shown in FIG. 1, the pseudo base station does not tamper with location information of the pseudo base station, location information broadcast by a second base station (the pseudo base station) is TAI-A, and location information reported by a first base station (the authorized base station) is TAI-B. In this case, the two pieces of information are inconsistent, and it can be determined that a current location of the terminal device is abnormal.

In this implementation, only whether the location information broadcast by the second base station is consistent with the location information reported by the first base station is compared. The method is simple and easy to implement, improves data processing efficiency, and avoids incorrect determining of the location of the terminal device.

Optionally, in another implementation, if the location information of the terminal device includes the auxiliary location information, the determining, by the core network device, whether the location information of the terminal device matches the location information reported by the first base station may include:

determining, by the core network device, whether the auxiliary location information matches the location information reported by the first base station; and if the auxiliary location information matches the location information reported by the first base station, determining that the location information of the terminal device matches the location information reported by the first base station and that a current location of the terminal device is normal; or if the auxiliary location information does not match the location information reported by the first base station, determining that the location information of the terminal device does not match the location information reported by the first base station and that a current location of the terminal device is abnormal.

An example is used for description. As shown in FIG. 1, auxiliary location information indicates that the UE is located in the city A, and the location information reported by the first base station (the authorized base station) is TAI-B indicative of the city B. In this case, the two pieces of information are inconsistent, and it can be determined that the current location of the terminal device is abnormal.

In this implementation, the auxiliary location information and the location information reported by the first base station are different types of information, and it needs to be determined whether a region indicated by the auxiliary location information is consistent with a region indicated by the location information reported by the first base station. Because the auxiliary location information indicates an actual region in which the terminal device is located, accuracy of determining the location of the terminal device is improved, and incorrect determining of the location of the terminal device is avoided.

Optionally, in still another implementation, if the location information of the terminal device includes the location information broadcast by the third base station, the determining, by the core network device, whether the location information of the terminal device matches the location information reported by the first base station may include:

determining, by the core network device, whether the location information broadcast by the third base station is consistent with the location information reported by the first base station; and if the location information broadcast by the third base station is consistent with the location information reported by the first base station, determining that the location information of the terminal device matches the location information reported by the first base station and that a current location of the terminal device is normal; or if the location information broadcast by the third base station is inconsistent with the location information reported by the first base station, determining that the location information of the terminal device does not match the location information reported by the first base station and that a current location of the terminal device is abnormal.

An example is used for description. As shown in FIG. 1, location information broadcast by a third base station (a neighboring base station of the pseudo base station) is TAI-A, and the location information reported by the first base station (the authorized base station) is TAI-B indicative of the city B. In this case, the two pieces of information are inconsistent, and it can be determined that the current location of the terminal device is abnormal.

In this implementation, whether the location information broadcast by the third base station is consistent with the location information reported by the first base station is compared. The embodiment is simple and easy to implement, improves data processing efficiency, and avoids incorrect determining of the location of the terminal device.

Optionally, in still another implementation, if the location information of the terminal device includes the location information broadcast by the second base station and the auxiliary location information, the determining, by the core network device, whether the location information of the terminal device matches the location information reported by the first base station may include:

determining, by the core network device, whether the location information broadcast by the second base station is consistent with the location information reported by the first base station; and if the location information broadcast by the second base station is inconsistent with the location information reported by the first base station, determining that the location information of the terminal device does not match the location information reported by the first base station and that a current location of the terminal device is abnormal; or if the location information broadcast by the second base station is consistent with the location information reported by the first base station, continuing to determine whether the auxiliary location information matches the location information reported by the first base station; and if the auxiliary location information does not match the location information reported by the first base station, determining that the location information of the terminal device does not match the location information reported by the first base station and that a current location of the terminal device is abnormal; or if the auxiliary location information matches the location information reported by the first base station, determining that the location information of the terminal device matches the location information reported by the first base station and that a current location of the terminal device is normal; or determining, by the core network device, whether the auxiliary location information matches the location information reported by the first base station; and if the auxiliary location information does not match the location information reported by the first base station, determining that the location information of the terminal device does not match the location information reported by the first base station and that a current location of the terminal device is abnormal; or if the auxiliary location information matches the location information reported by the first base station, continuing to determine whether the location information broadcast by the second base station is consistent with the location information reported by the first base station; and if the location information broadcast by the second base station is consistent with the location information reported by the first base station, determining that the location information of the terminal device matches the location information reported by the first base station and that a current location of the terminal device is normal; or if the location information broadcast by the second base station is inconsistent with the location information reported by the first base station, determining that the location information of the terminal device does not match the location information reported by the first base station and that a current location of the terminal device is abnormal.

It should be noted that in another implementation, the location information of the terminal device may include at least two types of the following location information: the location information broadcast by the second base station, the auxiliary location information, and the location information broadcast by the third base station. When the core network device determines whether the location information of the terminal device matches the location information reported by the first base station, and may separately determine whether each type of the location information of the terminal device matches the location information reported by the first base station. A determining sequence of all types of location information is not limited in this embodiment.

In step S105, if the location information of the terminal device does not match the location information reported by the first base station, the core network device sends a reject message to the terminal device.

Correspondingly, the terminal device receives the reject message sent by the core network device.

The reject message may carry a cause value, where the cause value is used to indicate location inconsistency.

Optionally, the reject message may be an attach reject message or a registration reject message.

Optionally, if the core network device is a mobility management device (an MME or an AMF), the method may further include:

reporting an abnormality event to an operation and maintenance device, where the abnormality event indicates location inconsistency of the terminal device.

In step S106, if the terminal device receives the reject message sent by the core network device, the terminal device performs processing based on the cause value carried in the reject message.

Optionally, if the cause value is used to indicate location inconsistency, the terminal device may re-initiate registration or attachment after a preset time period.

An exemplary value of the preset time period is not limited in this embodiment.

It can be learned that in the terminal device location determining method provided in this embodiment, the terminal device reports the location information of the terminal device to the core network device, and the core network device determines, through comparison, whether the location information reported by the terminal device matches the location information reported by the first base station, to determine whether the location of the terminal device is incorrectly determined. In this way, accuracy of determining the location of the terminal device is improved.

It should be noted that steps S105 and S106 merely describe one of processing manners performed by the core network device and the terminal device when the location information of the terminal device does not match the location information reported by the first base station. It can be understood that if the location information of the terminal device does not match the location information reported by the first base station, the core network device may alternatively continue to perform another procedure, and the terminal device correspondingly performs the another procedure. For example, if the location information of the terminal device does not match the location information reported by the first base station, the core network device may not send a message. If the terminal device does not receive, after a period of time, a message sent by the core network device, the terminal device may correspondingly perform an existing procedure.

Optionally, the terminal device location determining method provided in this embodiment may further include:

determining, by the terminal device based on the location information of the terminal device, whether the current location of the terminal device is abnormal; and if determining that the current location of the terminal device is abnormal, providing a prompt.

In an exemplary embodiment, the user equipment may determine, based on the obtained location information of the user equipment, whether the current location of the user equipment is abnormal. If the current location of the user equipment is abnormal, a prompt may be provided, to warn a user that there is a possible attack risk. In this way, the user takes a corresponding measure to improve security, thereby avoiding a fee dispute. Optionally, after determining that the current location of the terminal device is abnormal, the terminal device may not initiate registration, or may re-initiate registration after a preset time period according to a preset policy. A prompt manner is not limited in this embodiment. For example, prompt information may be generated and displayed. Exemplary content and a display manner of the displayed information are not limited in this embodiment. For example, the displayed information may be displayed in a form of popping up a prompt window on a display screen of the user equipment. Alternatively, a prompt may be provided in a sound form.

Optionally, in an implementation, if the location information of the terminal device includes the location information broadcast by the second base station and the auxiliary location information, the determining, by the terminal device based on the location information of the terminal device, whether the current location of the terminal device is abnormal may include:

determining, by the terminal device, whether the location information broadcast by the second base station matches the auxiliary location information; and if the location information broadcast by the second base station does not match the auxiliary location information, determining that the current location of the terminal device is abnormal; or if the location information broadcast by the second base station matches the auxiliary location information, determining that the current location of the terminal device is normal.

An example is used for description. As shown in FIG. 1, the pseudo base station tampers with the location information of the pseudo base station, and tampers with the location information of the pseudo base station from TAI-A to TAI-B indicative of the city B. Auxiliary location information indicates that the UE is located in the city A. In this case, the two pieces of information are inconsistent, and it can be determined that the current location of the terminal device is abnormal.

In this implementation, the auxiliary location information and the location information broadcast by the second base station are different types of information, and it needs to be determined whether a region indicated by the auxiliary location information is consistent with a region indicated by the location information broadcast by the second base station. Because the auxiliary location information indicates an actual region in which the terminal device is located, accuracy of determining the location of the terminal device is improved, and incorrect determining of the location of the terminal device is avoided.

Optionally, in another implementation, if the location information of the terminal device includes the location information broadcast by the second base station and the location information broadcast by the third base station, the determining, by the terminal device based on the location information of the terminal device, whether the current location of the terminal device is abnormal may include:

determining, by the terminal device, whether the location information broadcast by the second base station is consistent with the location information broadcast by the third base station; and if the location information broadcast by the second base station is consistent with the location information broadcast by the third base station, determining that the current location of the terminal device is normal; or if the location information broadcast by the second base station is inconsistent with the location information broadcast by the third base station, determining that the current location of the terminal device is abnormal.

An example is used for description. As shown in FIG. 1, the pseudo base station tampers with the location information of the pseudo base station, and tampers with the location information of the pseudo base station from TAI-A to TAI-B indicative of the city B. Location information broadcast by the third base station is TAI-A. In this case, if the location information broadcast by the second base station is inconsistent with the location information broadcast by the third base station, it can be determined that the current location of the terminal device is abnormal.

Whether the location information broadcast by the second base station is consistent with the location information broadcast by the third base station is compared. The method is simple and easy to implement, and avoids incorrect determining of the location of the terminal device.

Optionally, in the terminal device location determining method provided in this embodiment, if the terminal device completes attachment or registration, the method may further include:

receiving, by the terminal device, a positioning request message sent by the core network device;

obtaining, by the terminal device, current location information of the terminal device based on the positioning request message;

sending, by the terminal device, a positioning response message to the core network device, where the positioning response message includes the current location information of the terminal device;

determining, by the core network device, whether first location information reported by the first base station matches the current location information reported by the terminal device; and if the first location information reported by the first base station does not match the current location information reported by the terminal device, sending a deregistration message or a detach message to the terminal device.

Figure 23:
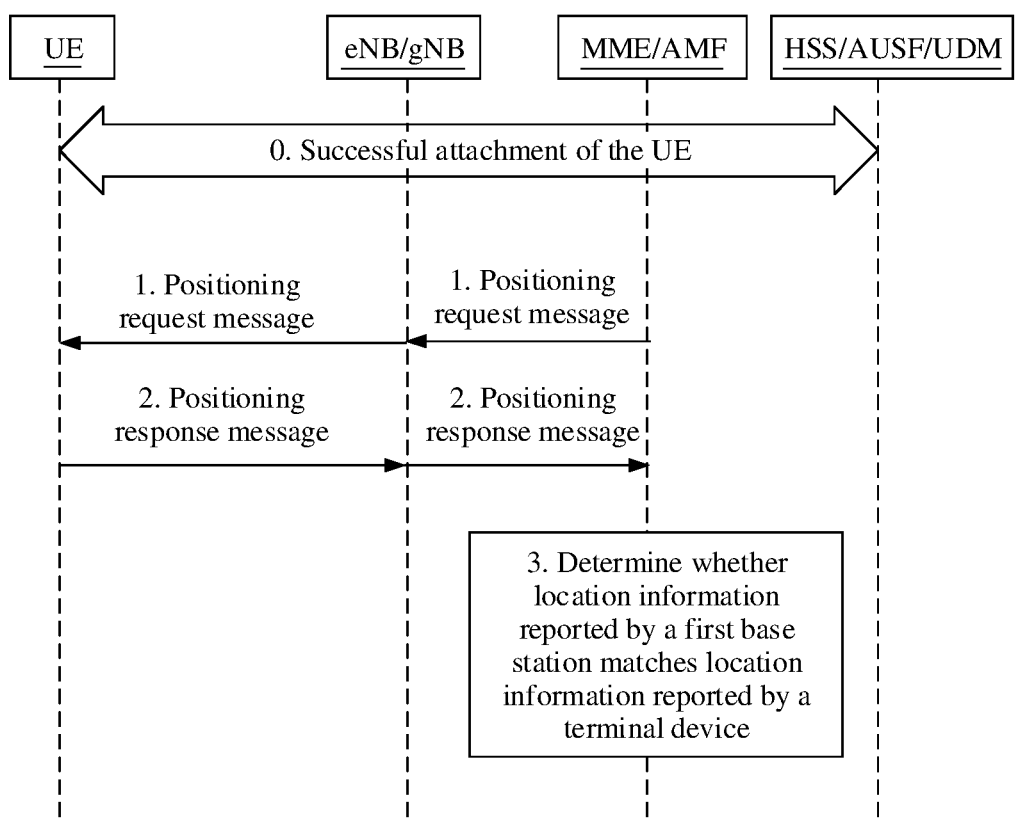
FIG. 23 is a message exchange diagram of a terminal device location determining method according to Embodiment 21.
Figure 24:
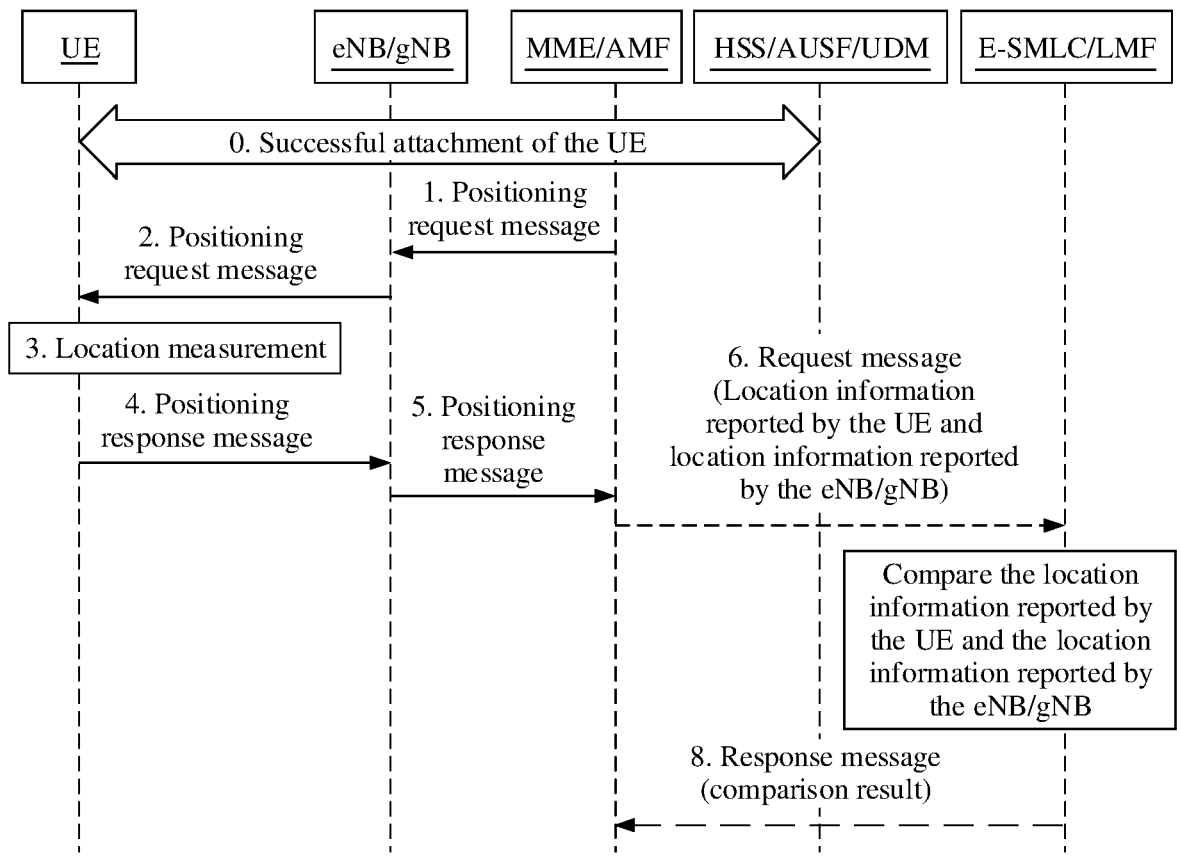
FIG. 24 is a message exchange diagram of a terminal device location determining method according to Embodiment 22.

For details, refer to the description of an embodiment shown in FIG. 23 or FIG. 24. Principles thereof are similar, and details are not described herein again.

This embodiment provides the terminal device location determining method, including: obtaining, by the core network device, the location information of the terminal device reported by the terminal device and the location information reported by the first base station; determining, by the core network device, whether the location information of the terminal device matches the location information reported by the first base station; if the location information of the terminal device does not match the location information reported by the first base station, sending, by the core network device, the reject message to the terminal device; and if the terminal device receives the reject message sent by the core network device, performing, by the terminal device, processing based on the cause value carried in the reject message. According to the terminal device location determining method provided in this embodiment, the terminal device reports the location information of the terminal device to the core network device, and the core network device determines, through comparison, whether the location information of the terminal device reported by the terminal device matches the location information reported by the base station, to determine whether the location of the terminal device is incorrectly determined. In this way, accuracy of determining the location of the terminal device is improved, and a billing discrepancy is avoided.

Figure 4:
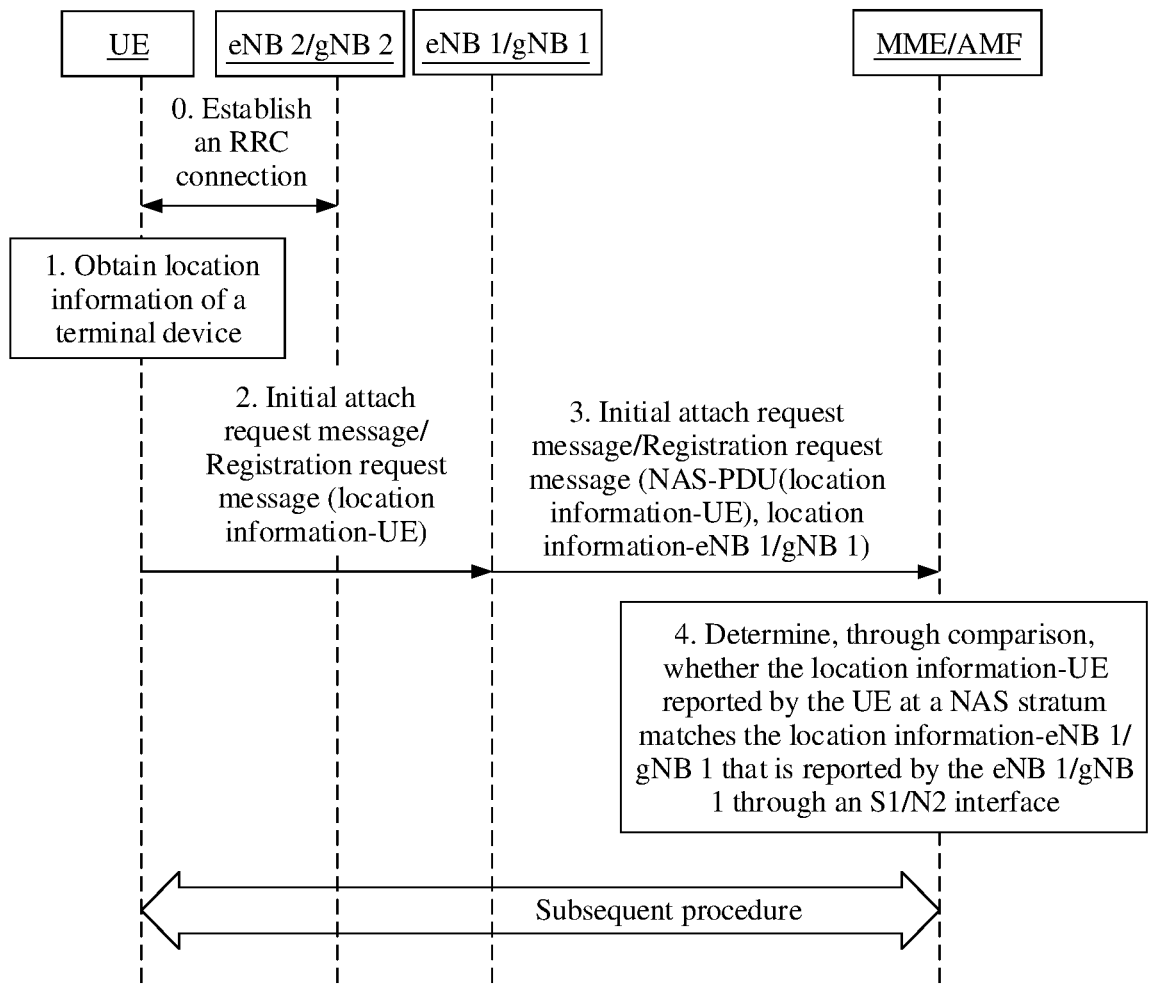
FIG. 4 is a message exchange diagram of a terminal device location determining method according to Embodiment 2.

FIG. 4 is a message exchange diagram of a terminal device location determining method according to Embodiment 2. Based on the embodiment shown in FIG. 3, this embodiment provides an exemplary implementation of the terminal device location determining method. The exemplary implementation can be applied to an LTE communications system, a 5G communications system, or another communications system. Network elements in the LTE communications system may include a UE, eNodeBs eNBs (a first eNodeB eNB 1 and a second eNodeB eNB 2), and an MME. Network elements in the 5G communications system may include a UE, gNodeBs gNBs (a first gNodeB gNB 1 and a second gNodeB gNB 2), and an AMF. It should be noted that in some scenarios, the first eNodeB eNB 1 and the second eNodeB eNB 2 may be the same eNodeB, and the first gNodeB gNB 1 and the second gNodeB gNB 2 may be the same gNodeB. As shown in FIG. 4, the terminal device location determining method provided in this application may include the following steps.

0. The UE establishes an RRC connection to the eNB 2/gNB 2.

After establishing the RRC connection to the eNB 2/gNB 2, the UE may obtain location information of the terminal device (represented by "location information-UE") from the eNB 2/gNB 2.

1. The UE obtains the location information of the terminal device ("location information-UE").

2. The UE sends an initial attach/registration request message to the MME/AMF by using the eNB 1/gNB 1.

In an exemplary embodiment, the initial attach request message or the registration request message is a NAS message, and a NAS-PDU in the initial attach request message or the registration request message may carry the location information of the terminal device.

3. The eNB 1/gNB 1 forwards the initial attach request message/registration request message to the MME/AMF through an S1/N2 interface.

The eNB 1/gNB 1 packages together the NAS-PDU (location information-UE) and location information reported by the eNB 1/gNB 1 (represented by "location information-eNB 1/gNB 1"), and sends packaged information to the MME/AMF through the S1/N2 interface.

4. The MME/AMF determines, through comparison, whether the location information of the terminal device reported by the NAS stratum UE matches the location information reported by the eNB 1/gNB 1 through the S1/N2 interface.

Then, a subsequent procedure is performed.

In an exemplary embodiment, if the MME/AMF determines that the location information of the terminal device reported by the UE does not match the location information reported by the eNB 1/gNB 1 through the S1/N2 interface, the MME/AMF may send an attach reject message or a registration reject message to the UE, where a cause value carried in the attach reject message or the registration reject message indicates location inconsistency of the terminal device.

If the MME/AMF determines that the location information of the terminal device reported by the UE matches the location information reported by the eNB 1/gNB 1 through the S1/N2 interface, the subsequent procedure is normally performed, and the UE can receive a normal response message sent by the MME/AMF.

The terminal device location determining method provided in this embodiment can be applied to an LTE communications network or a 5G communications network. The terminal device reports the location information of the terminal device to the mobility management device by using the initial attach request message or the registration request message. The mobility management device determines, through comparison, whether the location information of the terminal device reported by the terminal device matches the location information reported by the base station, to determine whether a location of the terminal device is incorrectly determined. In this way, accuracy of determining the location of the terminal device is improved, and a billing discrepancy is avoided.

Figure 5:
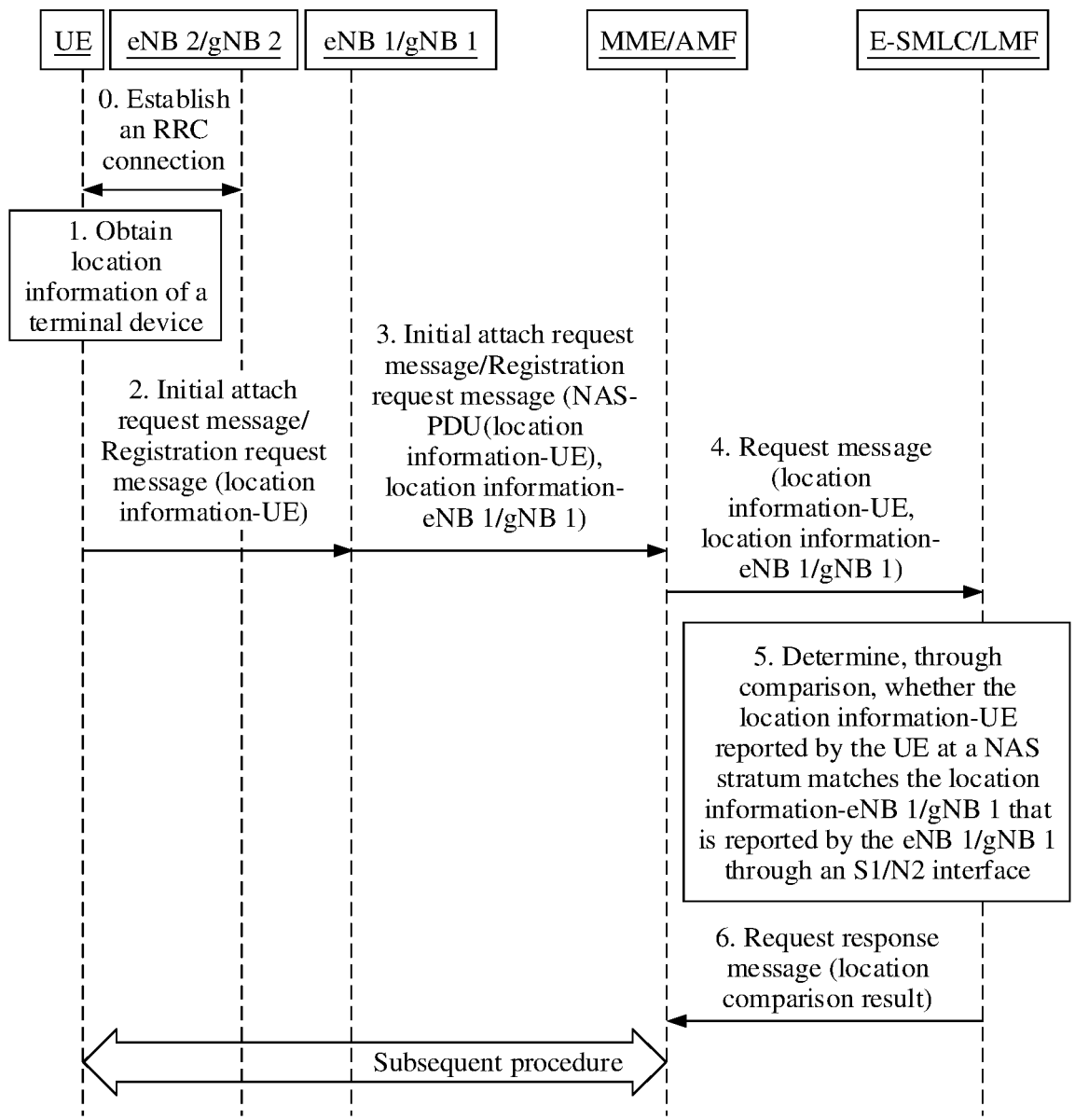
FIG. 5 is a message exchange diagram of a terminal device location determining method according to Embodiment 3.

FIG. 5 is a message exchange diagram of a terminal device location determining method according to Embodiment 3. Based on the embodiment shown in FIG. 3, this embodiment provides an exemplary implementation of the terminal device location determining method. The exemplary implementation can be applied to an LTE communications system and a 5G communications system. Network elements in the LTE communications system may include a UE, eNodeBs eNBs (a first eNodeB eNB 1 and a second eNodeB eNB 2), an MME, and an E-SMLC. Network elements in the 5G communications system may include a UE, gNodeBs gNBs (a first gNodeB gNB 1 and a second gNodeB gNB 2), an AMF, and an LMF. It should be noted that in some scenarios, the first eNodeB eNB 1 and the second eNodeB eNB 2 may be the same eNodeB, and the first gNodeB gNB 1 and the second gNodeB gNB 2 may be the same gNodeB. As shown in FIG. 5, the terminal device location determining method provided in this application may include the following steps.

In step 0, the UE establishes an RRC connection to the eNB 2/gNB 2.

After establishing the RRC connection to the eNB 2/gNB 2, the UE may obtain location information of the terminal device (represented by "location information-UE") from the eNB 2/gNB 2.

In step 1, the UE obtains the location information of the terminal device ("location information-UE").

In step 2, the UE sends an initial attach/registration request message to the MME/AMF by using the eNB 1/gNB 1.

In an exemplary embodiment, the initial attach request message or the registration request message is a NAS message, and a NAS-PDU in the initial attach request message or the registration request message may carry the location information of the terminal device.

In step 3, the eNB 1/gNB 1 forwards the initial attach request message/registration request message to the MME/AMF through an S1/N2 interface.

The eNB 1/gNB 1 packages together the NAS-PDU (location information-UE) and location information reported by the eNB 1/gNB 1 (represented by "location information-eNB 1/gNB 1"), and sends packaged information to the MME/AMF through the S1/N2 interface.

In step 4, the MME/AMF sends a request message to the E-SMLC/LMF.

The request message carries the location information of the terminal device reported by the UE and the location information reported by the eNB 1/gNB 1.

In step 5, the E-SMLC/LMF determines, through comparison, whether the location information of the terminal device reported by the NAS stratum UE matches the location information reported by the eNB 1/gNB 1 through the S1/N2 interface.

In step 6, the E-SMLC/LMF sends a request response message to the MME/AMF.

The request response message may carry a location comparison result, where the location comparison result indicates whether the location information of the terminal device reported by the UE matches the location information reported by the eNB 1/gNB 1.

Then, a subsequent procedure is performed.

In an exemplary embodiment, if the location comparison result indicates that the location information of the terminal device reported by the UE does not match the location information reported by the eNB 1/gNB 1, the MME/AMF may send an attach reject message or a registration reject message to the UE, where a cause value carried in the attach reject message or the registration reject message indicates location inconsistency of the terminal device.

If the location comparison result indicates that the location information of the terminal device reported by the UE matches the location information reported by the eNB 1/gNB 1, the subsequent procedure is normally performed, and the UE can receive a normal message sent by the MME/AMF.

The terminal device location determining method provided in this embodiment can be applied to an LTE communications network or a 5G communications network. The terminal device reports the location information of the terminal device to the mobility management device by using the initial attach request message or the registration request message. The mobility management device transfers, to the location management device, the location information of the terminal device and the location information reported by the base station. The location management device determines, through comparison, whether the location information of the terminal device reported by the terminal device matches the location information reported by the base station, to determine whether a location of the terminal device is incorrectly determined. In this way, accuracy of determining the location of the terminal device is improved, and a billing discrepancy is avoided.

Figure 6:
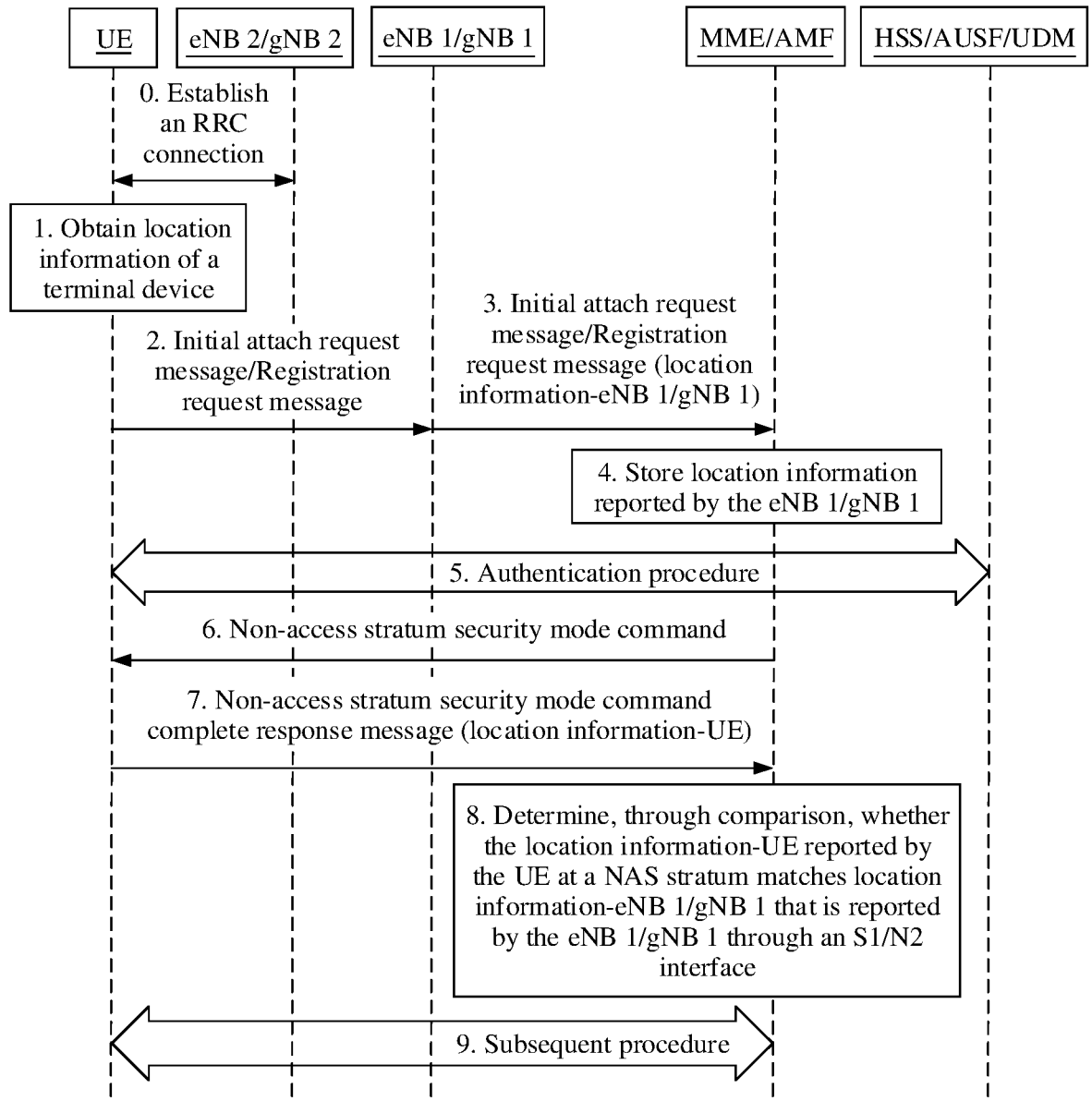
FIG. 6 is a message exchange diagram of a terminal device location determining method according to Embodiment 4.

FIG. 6 is a message exchange diagram of a terminal device location determining method according to Embodiment 4. Based on the embodiment shown in FIG. 3, this embodiment provides another exemplary implementation of the terminal device location determining method. The exemplary implementation can be applied to an LTE communications system and a 5G communications system. Network elements in the LTE communications system may include a UE, eNodeBs eNBs (a first eNodeB eNB 1 and a second eNodeB eNB 2), and an MME. Network elements in the 5G communications system may include a UE, gNodeBs gNBs (a first gNodeB gNB 1 and a second gNodeB gNB 2), and an AMF. It should be noted that in some scenarios, the first eNodeB eNB 1 and the second eNodeB eNB 2 may be the same eNodeB, and the first gNodeB gNB 1 and the second gNodeB gNB 2 may be the same gNodeB. As shown in FIG. 6, the terminal device location determining method provided in this application may include the following steps.

In step 0, the UE establishes an RRC connection to the eNB 2/gNB 2.

After establishing the RRC connection to the eNB 2/gNB 2, the UE may obtain location information of the terminal device (represented by "location information-UE") from the eNB 2/gNB 2.

In step 1, the UE obtains the location information of the terminal device.

In step 2, the UE sends an initial attach/registration request message to the MME/AMF by using the eNB 1/gNB 1.

In step 3, the eNB 1/gNB 1 forwards the initial attach request message/registration request message to the MME/AMF through an S1/N2 interface.

The eNB 1/gNB 1 sends, to the MME/AMF through the S1/N2 interface, location information reported by the eNB 1/gNB 1 (represented by "location information-eNB 1/gNB 1").

In step 4, the MME/AMF stores the location information reported by the eNB 1/gNB 1.

In step 5, an authentication procedure is performed.

A principle of the authentication procedure is similar to that of an existing authentication procedure. For the authentication procedure, refer to the existing authentication procedure.

In step 6, the MME/AMF sends a NAS SMC SMCmessage to the UE.

In step 7, the UE sends a NAS SMC complete (NAS Security Mode complete) response message to the MME/AMF.

In an exemplary embodiment, the NAS security mode complete message is a NAS message, and a NAS PDU in the NAS security mode complete message may carry the location information of the terminal device.

In step 8, the MME/AMF determines, through comparison, whether the location information of the terminal device reported by the NAS stratum UE matches the location information reported by the eNB 1/gNB 1 through the S1/N2 interface.

Then, a subsequent procedure is performed.

In an exemplary embodiment, if the MME/AMF determines that the location information of the terminal device reported by the UE does not match the location information reported by the eNB 1/gNB 1 through the S1/N2 interface, the MME/AMF may send an attach reject message or a registration reject message to the UE, where a cause value carried in the attach reject message or the registration reject message indicates location inconsistency of the terminal device.

If the MME/AMF determines that the location information of the terminal device reported by the UE matches the location information reported by the eNB 1/gNB 1 through the S1/N2 interface, the subsequent procedure is normally performed, and the UE can receive a normal response message sent by the MME/AMF.

Optionally, in step 7, the NAS SMC complete response message may further include indication information, where the indication information is used to indicate whether the NAS SMC complete response message includes the location information of the terminal device.

It should be noted that a sequence of performing step 1 and step 4 is not limited in this embodiment, provided that step 1 is performed before step 7, and step 4 is performed before step 8.

It should be noted that in this embodiment, the reporting, by the eNB 1/gNB 1, the "location information-eNB 1/gNB 1" may also be implemented in step 7. In other words, the eNB 1/gNB 1 may report the location information by using an S1/N2 message in any of steps 1 to 7.

The terminal device location determining method provided in this embodiment can be applied to an LTE communications network or a 5G communications network. The terminal device reports the location information of the terminal device to the mobility management device by using the NAS SMC complete response message. The mobility management device determines, through comparison, whether the location information of the terminal device reported by the terminal device matches the location information reported by the base station, to determine whether a location of the terminal device is incorrectly determined. In this way, a billing discrepancy is avoided.

Figure 7:
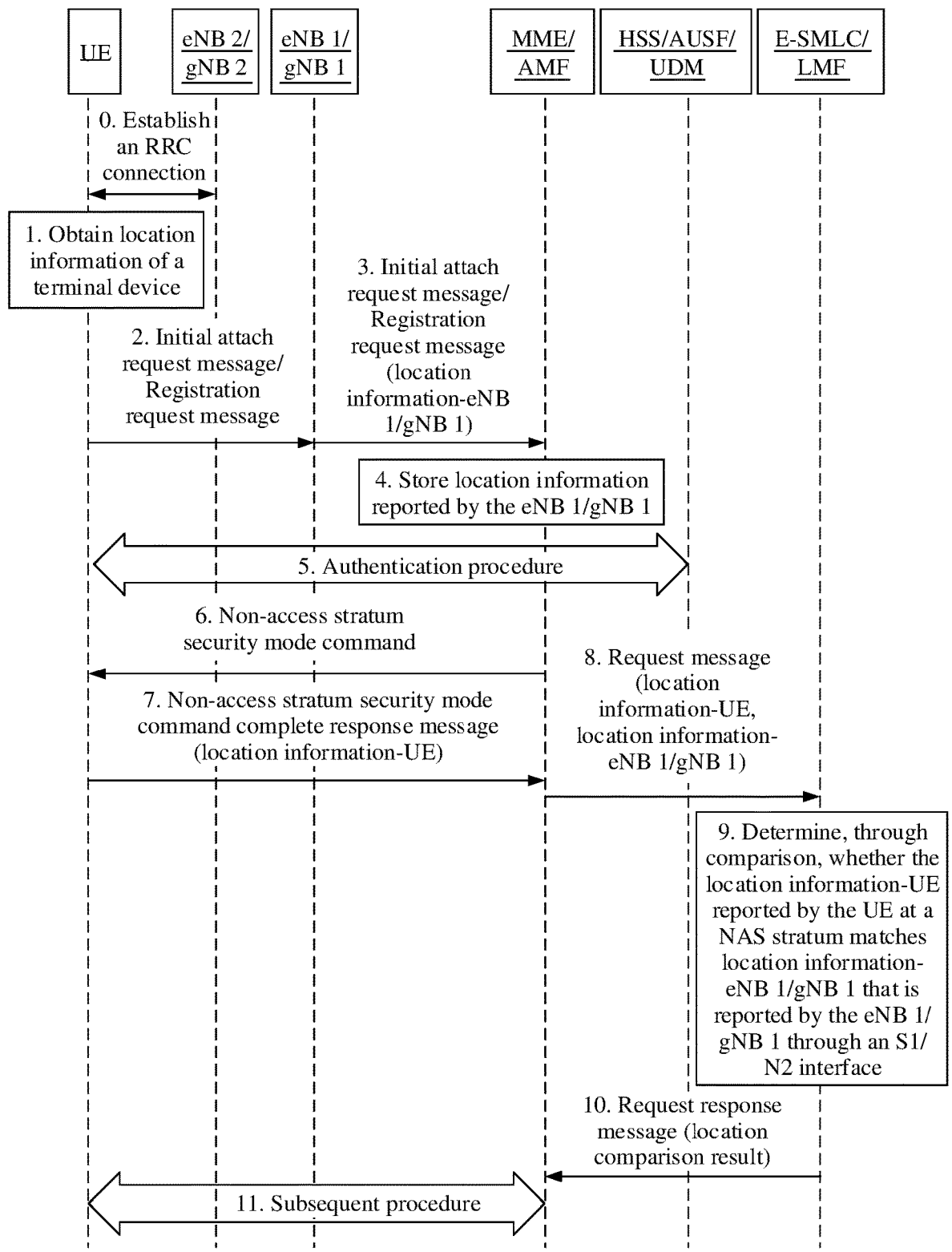
FIG. 7 is a message exchange diagram of a terminal device location determining method according to Embodiment 5.

FIG. 7 is a message exchange diagram of a terminal device location determining method according to Embodiment 5. Based on the embodiment shown in FIG. 3, this embodiment provides still another exemplary implementation of the terminal device location determining method. The exemplary implementation can be applied to an LTE communications system and a 5G communications system. Network elements in the LTE communications system may include a UE, eNodeBs eNBs (a first eNodeB eNB 1 and a second eNodeB eNB 2), an MME, and an E-SMLC. Network elements in the 5G communications system may include a UE, gNodeBs gNBs (a first gNodeB gNB 1 and a second gNodeB gNB 2), an AMF, and an LMF. It should be noted that in some scenarios, the first eNodeB eNB 1 and the second eNodeB eNB 2 may be the same eNodeB, and the first gNodeB gNB 1 and the second gNodeB gNB 2 may be the same gNodeB. As shown in FIG. 7, the terminal device location determining method provided in this application may include the following steps.

For steps 0 to 7, refer to the embodiment shown in FIG. 6. Principles thereof are similar, and details are not described herein again.

In step 8, the MME/AMF sends a request message to the E-SMLC/LMF.

The request message carries the location information of the terminal device reported by the UE and the location information reported by the eNB 1/gNB 1.

In step 9, the E-SMLC/LMF determines, through comparison, whether the location information of the terminal device reported by the NAS UE matches the location information reported by the eNB 1/gNB 1 through the S1/N2 interface.

In step 10, the E-SMLC/LMF sends a request response message to the MME/AMF.

The request response message may carry a location comparison result, where the location comparison result indicates whether the location information of the terminal device reported by the UE matches the location information reported by the eNB 1/gNB 1.

Then, a subsequent procedure is performed.

In an exemplary embodiment, if the location comparison result indicates that the location information of the terminal device reported by the UE does not match the location information reported by the eNB 1/gNB 1, the MME/AMF may send an attach reject message or a registration reject message to the UE, where a cause value carried in the attach reject message or the registration reject message indicates location inconsistency of the terminal device.

If the location comparison result indicates that the location information of the terminal device reported by the UE matches the location information reported by the eNB 1/gNB 1, the subsequent procedure is normally performed, and the UE can receive a normal message sent by the MME/AMF.

Optionally, in step 7, the NAS SMC complete response message may further include indication information, where the indication information is used to indicate whether the NAS SMC complete response message includes the location information of the terminal device.

It should be noted that a sequence of performing step 1 and step 4 is not limited in this embodiment, provided that step 1 is performed before step 7, and step 4 is performed before step 8.

It should be noted that in this embodiment, the reporting, by the eNB 1/gNB 1, the "location information-eNB 1/gNB 1" may also be implemented in step 7. In other words, the eNB 1/gNB 1 may report the location information by using an S1/N2 message in any of steps 1 to 7.

The terminal device location determining method provided in this embodiment can be applied to an LTE communications network or a 5G communications network. The terminal device reports the location information of the terminal device to the mobility management device by using the NAS SMC complete response message. The mobility management device transfers, to the location management device, the location information of the terminal device and the location information reported by the base station. The location management device determines, through comparison, whether the location information of the terminal device reported by the terminal device matches the location information reported by the base station, to determine whether a location of the terminal device is incorrectly determined. In this way, a billing discrepancy is avoided.

Figure 8:
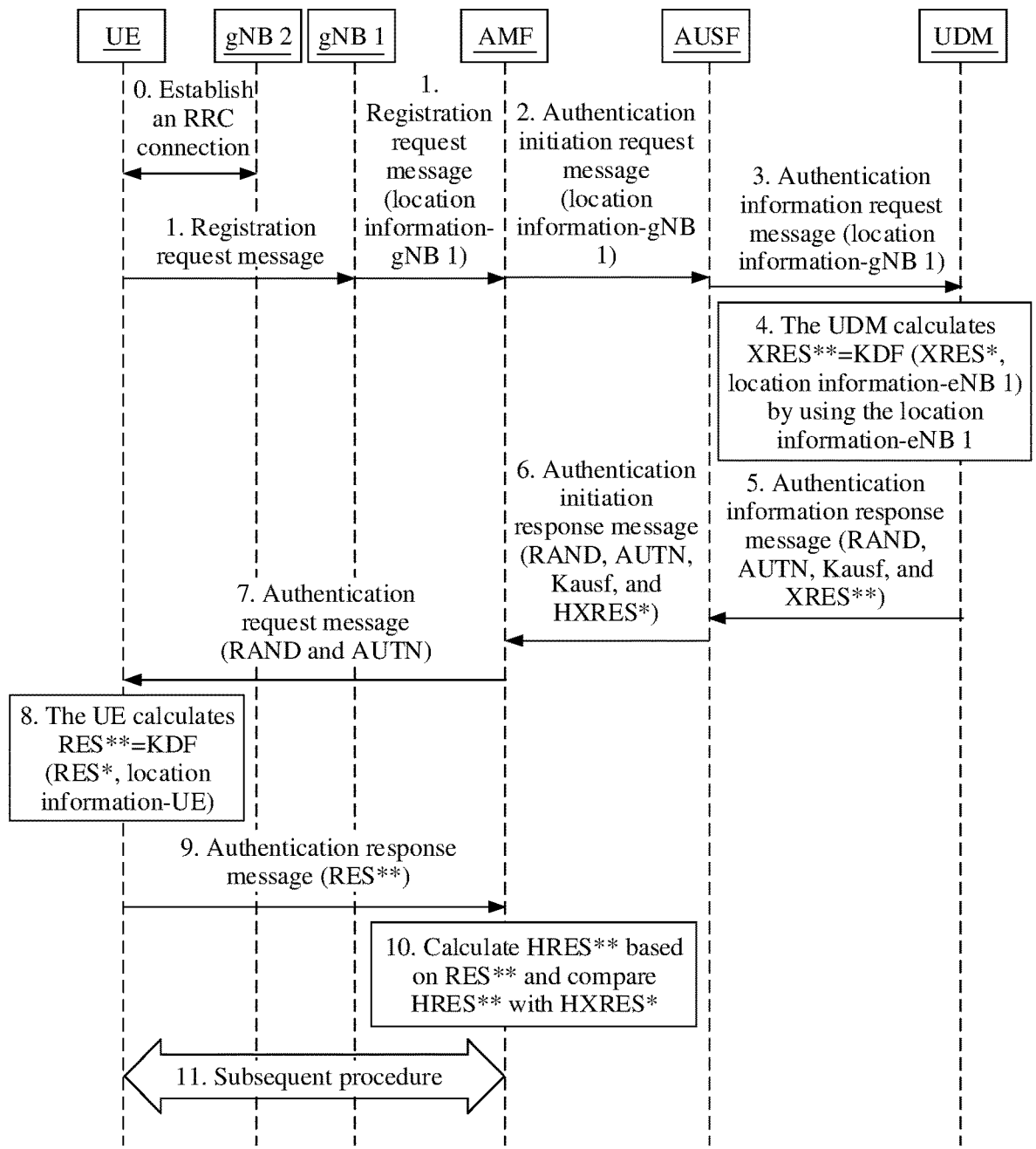
FIG. 8 is a message exchange diagram of a terminal device location determining method according to Embodiment 6.

FIG. 8 is a message exchange diagram of a terminal device location determining method according to Embodiment 6. The terminal device location determining method provided in this embodiment can be applied to a 5G communications system. Network elements in the 5G communications system may include a UE, gNodeBs (a first gNodeB gNB 1 and a second gNodeB gNB 2), and core network devices (an AMF, an AUSF, and a UDM entity). It should be noted that in some scenarios, the first gNodeB gNB 1 and the second gNodeB gNB 2 may be the same gNodeB. As shown in FIG. 8, the terminal device location determining method provided in this application may include the following steps. In step 0, the UE establishes an RRC connection to the gNB 2.

After establishing the RRC connection to the gNB 2, the UE may obtain location information of the terminal device (represented by "location information-UE") from the gNB 2. The location information of the terminal device may be location information (for example, a TAI) of the gNB 2.

In step 1, the UE sends a registration request message to the AMF by using the gNB 1.

The registration request message is a NAS message. The registration request message sent by the gNB 1 to the AMF includes location information of the gNB 1 (represented by "location information-gNB 1").

In step 2, the AMF sends an authentication initiation request message to the AUSF, where the authentication initiation request message includes the "location information-gNB 1".

In step 3, the AUSF sends an authentication information request message to the UDM entity, where the authentication information request message includes the "location information-gNB 1".

The UE initiates a registration procedure by using steps 1 to 3. The AMF obtains, through an N2 interface, the location information reported by the gNB 1, and then reports, to the UDM entity by using the AUSF, the location information reported by the gNB 1.

In step 4, the UDM entity calculates XRES**=KDF (XRES*, location information-gNB 1) or XRES**=KDF (Ki, RAND, location information-gNB 1) by using the "location information-gNB 1".

XRES* represents an expected response value used for 5G authentication; KDF( ) represents a key derivation function; and XRES** represents an expected authentication response value including location information, where Ki represents a root key of a user stored in a user data management device (for example, the UDM entity), and RAND represents a random number.

In this step, the UDM entity may determine the authentication parameter XRES** based on the location information reported by the gNB 1.

Optionally, an identifier may be set, where the identifier is used to indicate that the UE is required to calculate RES** by using the location information-UE. In an implementation, the identifier may be set in an authentication token (AUTN). In another implementation, the identifier may specially be carried by using a parameter, and is transferred to the UE by using the AUSF/AMF.

In step 5, the UDM entity sends an authentication information response message to the AUSF, where the authentication information response message includes RAND, AUTN, Kausf, and XRES**.

RAND represents a random number, AUTN represents an authentication token, and Kausf represents a key for the AUSF.

In step 6, the AUSF sends an authentication initiation response message to the AMF, where the authentication initiation response message includes RAND, AUTN, Kausf, and HXRES* (a digest value of an expected response, namely, Hash eXpected RESponse).

In step 7, the AMF sends an authentication request message to the UE by using the gNB 1, where the authentication request message includes RAND and AUTN.

In step 8, the UE calculates RES**=KDF(RES*, location information-UE) or RES**=KDF(Ki, RAND, location information-gNB 1) by using the "location information-UE".

RES* represents an authentication response value; and RES** represents an expected authentication response value including location information, where Ki represents a root key of a user stored in a USIM of the user, and RAND represents a random number.

In this step, the UE may determine the authentication parameter RES** based on the obtained location information of the terminal device.

Optionally, the UE may determine, based on an identifier sent by a network side, whether to calculate RES by using the location information-UE. If the UE calculates RES, the UE sends RES** to the AMF. Otherwise, the UE sends RES* to the AMF.

In step 9, the UE sends an authentication response message to the AMF by using the gNB 1, where the authentication response message includes RES**.

In step 10, the AMF calculates HRES based on RES, and compares the calculated HRES** with HRES*.

HRES** represents a digest value of a response including location information, and HRES* represents a digest value of a response, namely, Hash RESponse.

In step 11, a subsequent procedure may be performed.

In an exemplary embodiment, if HRES** is inconsistent with HRES*, the AMF may send an authentication reject message to the UE by using the gNB 1.

Optionally, the AMF may further determine, through comparison, whether the location information of the terminal device reported by the UE is consistent with the location information reported by the gNB 1. If the location information of the terminal device reported by the UE is consistent with the location information reported by the gNB 1, the authentication reject message may carry a cause value. The cause value indicates location inconsistency of the user equipment. The location information of the terminal device reported by the UE may be carried in a NAS message that is used before step 10, so that the location information of the terminal device reported by the UE is sent to the AMF.

If HRES** is consistent with HRES*, the subsequent procedure is normally performed.

It should be noted that, for steps 5 to 7 and steps 9 and 10, reference may be made to an existing authentication procedure. The messages (Authentication Information Response, Authentication Initiation Response, Authentication Request, and Authentication response) and related parameters (RAND, AUTN, and Kausf) used in steps 5 to 7 and steps 9 and 10 are similar to those in the existing authentication procedure. A difference therebetween lies in that: XRES is determined by the UDM entity based on the location information-gNB 1, and RES is determined by the UE based on the location information-UE.

The terminal device location determining method provided in this embodiment can be applied to a 5G communications network. The terminal device determines RES based on the obtained location information of the terminal device, and sends RES to the AMF. The UDM entity determines XRES** based on the location information reported by the base station. The AMF determines HRES* based on XRES**, and compares HRES* with HRES determined based on RES, to determine whether HRES* is consistent with HRES**, to determine whether a location of the terminal device is incorrectly determined. In this way, accuracy of determining the location of the terminal device is improved.

Figure 9:
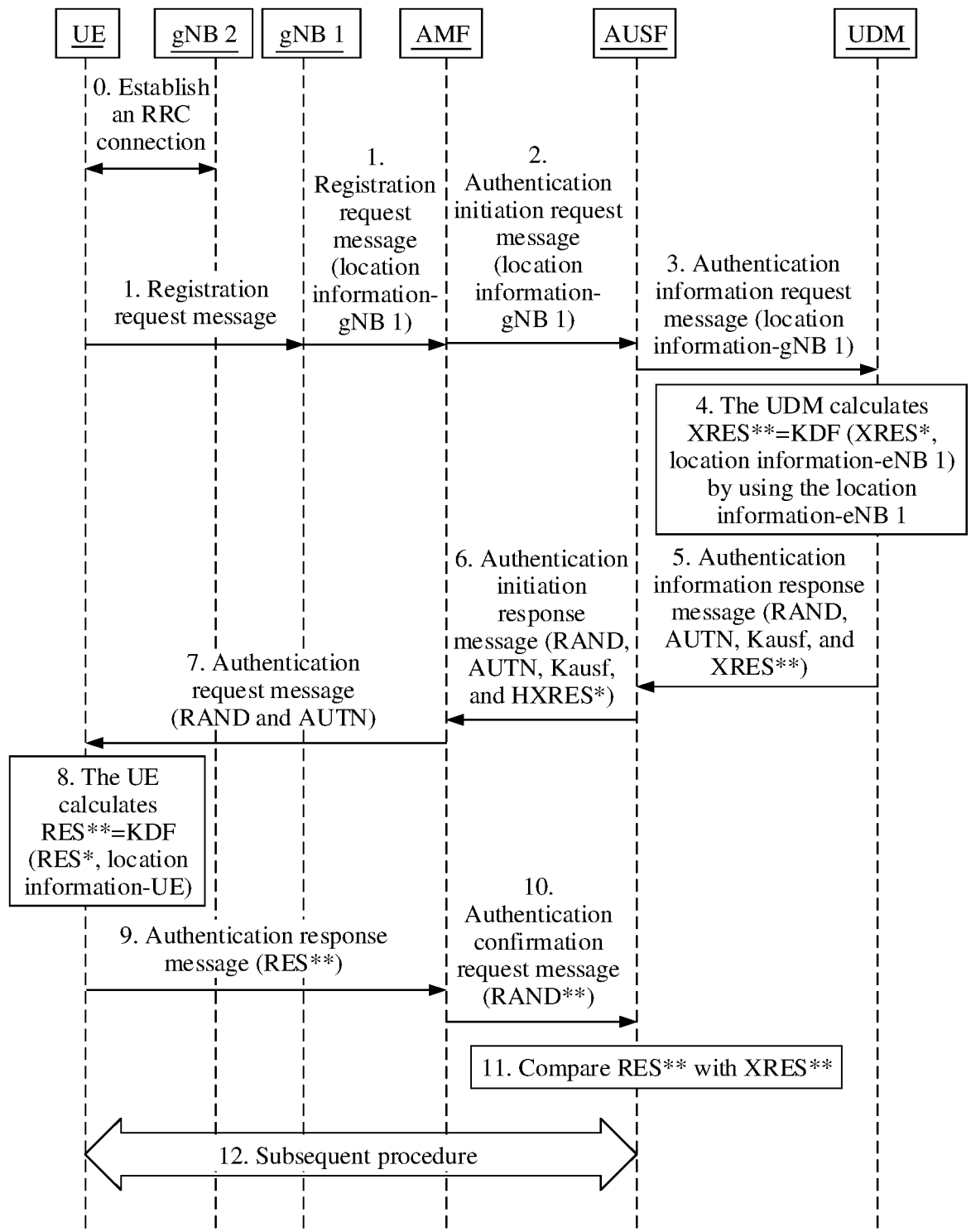
FIG. 9 is a message exchange diagram of a terminal device location determining method according to Embodiment 7.

FIG. 9 is a message exchange diagram of a terminal device location determining method according to Embodiment 7. The terminal device location determining method provided in this embodiment can be applied to a 5G communications system. Network elements in the 5G communications system may include a UE, gNodeBs (a first gNodeB gNB 1 and a second gNodeB gNB 2), and core network devices (an AMF, an AUSE, and a UDM entity). It should be noted that in some scenarios, the first gNodeB gNB 1 and the second gNodeB gNB 2 may be the same gNodeB. As shown in FIG. 9, the terminal device location determining method provided in this application may include the following steps.

Steps 0 to 9 are respectively similar to steps 0 to 9 in the embodiment shown in FIG. 8, and details are not described herein again.

In step 10, the AMF sends an authentication confirmation request message to the AUSF, where the authentication confirmation request message includes RES** reported by the UE.

In step 11, the AUSF compares RES with XRES to determine whether RES is consistent with XRES. In step 12, a subsequent procedure may be performed.

In an exemplary embodiment, if RES is inconsistent with XRES, the AUSF may send an authentication reject message to the AMF.

Optionally, the AUSF or the AMF may further determine, through comparison, whether the location information of the terminal device reported by the UE is consistent with the location information reported by the gNB 1. If the location information of the terminal device reported by the UE is consistent with the location information reported by the gNB 1, the authentication reject message may carry a cause value. The cause value indicates location inconsistency of the user equipment. The location information of the terminal device reported by the UE may be carried in a NAS message that is used before step 11, so that the location information of the terminal device reported by the UE is sent to the AUSF or the AMF.

If RES is consistent with XRES, the subsequent procedure is normally performed. The AUSF may send an authentication confirmation response message to the AMF.

A difference between this embodiment and the embodiment shown in FIG. 8 lies in that: In FIG. 8, the AMF determines, through comparison, whether HRES** is consistent with HRES*. In this embodiment, the AUSF determines, through comparison, whether RES is consistent with XRES.

The terminal device location determining method provided in this embodiment can be applied to a 5G communications network. The terminal device determines RES based on the obtained location information of the terminal device, and sends RES to the AUSF by using the AMF. The UDM entity determines XRES based on the location information reported by the base station. The AUSF determines, through comparison, whether RES is consistent with XRES**, to determine whether a location of the terminal device is incorrectly determined. In this way, accuracy of determining the location of the terminal device is improved.

Figure 10:
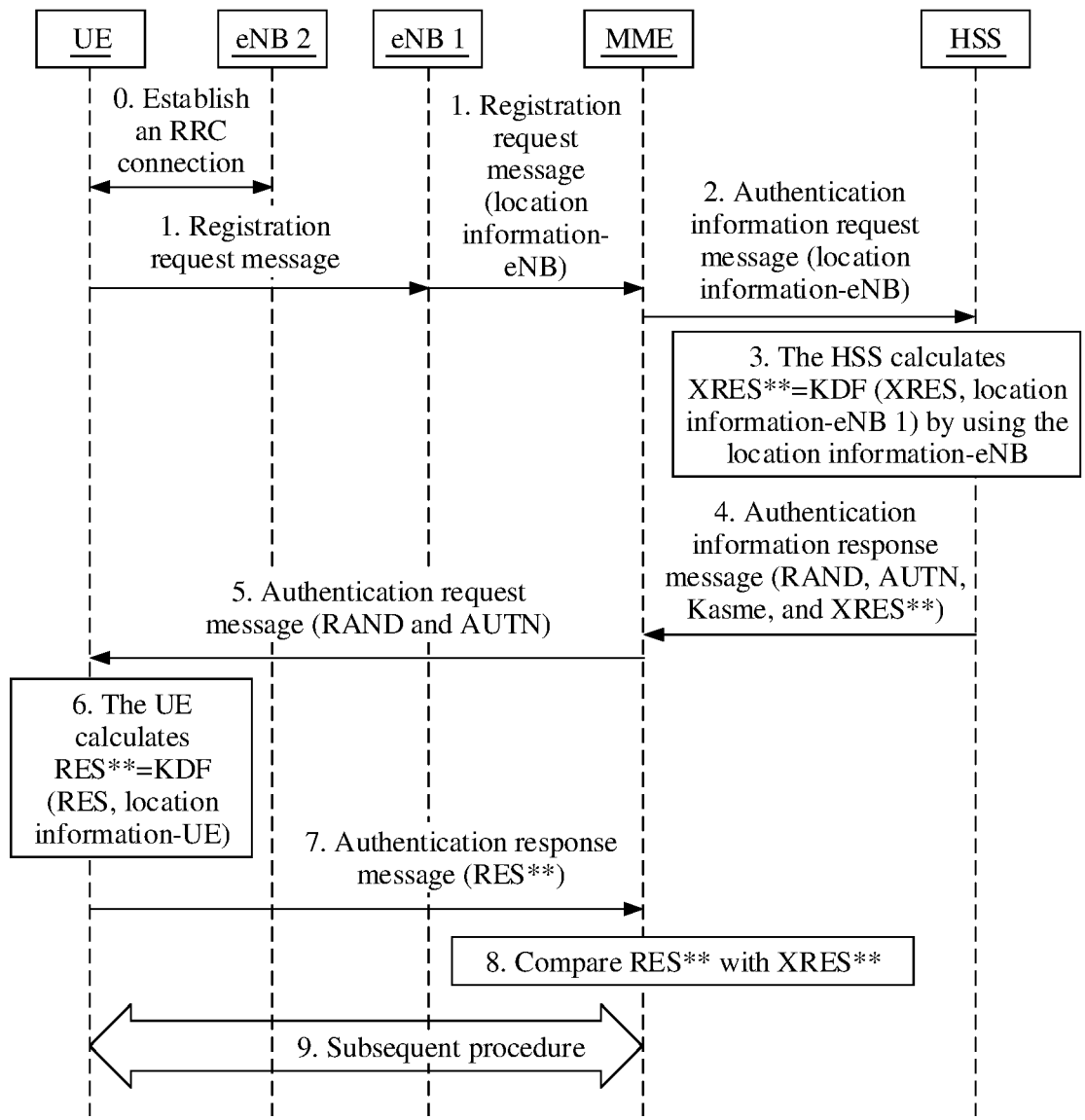
FIG. 10 is a message exchange diagram of a terminal device location determining method according to Embodiment 8.

FIG. 10 is a message exchange diagram of a terminal device location determining method according to Embodiment 8. The terminal device location determining method provided in this embodiment can be applied to an LTE communications system. Network elements in the LTE communications system may include a UE, eNodeBs (a first eNodeB eNB 1 and a second eNodeB eNB 2), and core network devices (an MME and an HSS). It should be noted that in some scenarios, the first eNodeB eNB 1 and the second eNodeB eNB 2 may be the same eNodeB. As shown in FIG. 10, the terminal device location determining method provided in this application may include the following steps.

In step 0, the UE establishes an RRC connection to the eNB 2.

After establishing the RRC connection to the eNB 2, the UE may obtain location information of the terminal device (represented by "location information-UE") from the eNB 2. The location information of the terminal device may be location information (for example, a TAI) of the eNB 2.

In step 1, the UE sends a registration request message to the MME by using the eNB 1.

The registration request message is a NAS message. The registration request message sent by the eNB 1 to the MME includes location information of the eNB 1 (represented by "location information-eNB 1").

In step 2, the MME sends an authentication information request message to the HSS, where the authentication information request message includes the "location information-eNB 1".

The UE initiates a registration procedure by using steps 1 and 2. The MME obtains, through an S1 interface, the location information reported by the eNB 1, and then reports, to the HSS, the location information reported by the eNB 1.

In step 3, the HSS calculates XRES=KDF(XRES, location information-eNB 1) or XRES=KDF(Ki, RAND, location information-gNB 1) by using the "location information-eNB 1".

XRES represents an expected response value used for 4G authentication, Ki represents the same root key stored in the HSS and a USIM card, and RAND represents a random number. In this step, the HSS may determine the authentication parameter XRES** based on the location information reported by the eNB 1.

Optionally, an identifier may be set, where the identifier is used to indicate that the UE is required to calculate RES** by using the location information-UE. In an implementation, the identifier may be set in AUTN. In another implementation, the identifier may specially be carried by using a parameter, and is transferred to the UE by using the MME.

In step 4, the HSS sends an authentication information response message to the MME, where the authentication information response message includes RAND, AUTN, Kasme, and XRES**.

Kasme represents a key of an access security management entity access security management entity.

In step 5, the MME sends an authentication request message to the UE by using the eNB 1, where the authentication request message includes RAND and AUTN.

In step 6, the UE calculates RES=KDF(RES, location information-UE) or RES=KDF(Ki, RAND, location information-UE) by using the "location information-UE".

RES represents an authentication response value; and RES** represents an expected authentication response value including location information, where Ki represents a root key of a user stored in a SIM of the user, and RAND represents a random number.

In this step, the UE may determine the authentication parameter RES** based on the obtained location information of the terminal device.

Optionally, the UE may further determine, based on an identifier sent by a network side, whether to calculate RES by using the location information-UE. If the UE calculates RES, the UE sends RES** to the MME. Otherwise, the UE sends RES to the MME.

In step 7, the UE sends an authentication response message to the MME by using the eNB 1, where the authentication response message includes RES**.

In step 8, the MME compares RES with XRES to determine whether RES is consistent with XRES.9. A subsequent procedure may be performed.

In an exemplary embodiment, if RES is inconsistent with XRES, the MME may send an authentication reject message to the UE by using the eNB 1.

Optionally, the MME may further determine, through comparison, whether the location information of the terminal device reported by the UE is consistent with the location information reported by the eNB 1. If the location information of the terminal device reported by the UE is consistent with the location information reported by the eNB 1, the authentication reject message may carry a cause value. The cause value indicates location inconsistency of the user equipment. The location information of the terminal device reported by the UE may be carried in a NAS message that is used before step 8, so that the location information of the terminal device reported by the UE is sent to the MME.

If RES is consistent with XRES, the subsequent procedure is normally performed.

It should be noted that, for steps 4, 5, and 7, reference may be made to an existing authentication procedure. The messages (Authentication Information Response, Authentication Request, and Authentication response) and related parameters (RAND, AUTN, and Kasme) used in steps 4, 5, and 7 are similar to those in the existing authentication procedure. A difference therebetween lies in that: XRES is determined by the HSS based on the location information-eNB 1, and RES is determined by the UE based on the location information-UE.

The terminal device location determining method provided in this embodiment can be applied to an LTE communications network. The terminal device determines RES based on the obtained location information of the terminal device, and sends RES to the MME. The HSS determines XRES based on the location information reported by the base station. The MME determines whether RES is consistent with XRES**, to determine whether a location of the terminal device is incorrectly determined. In this way, accuracy of determining the location of the terminal device is improved.

Figure 11:
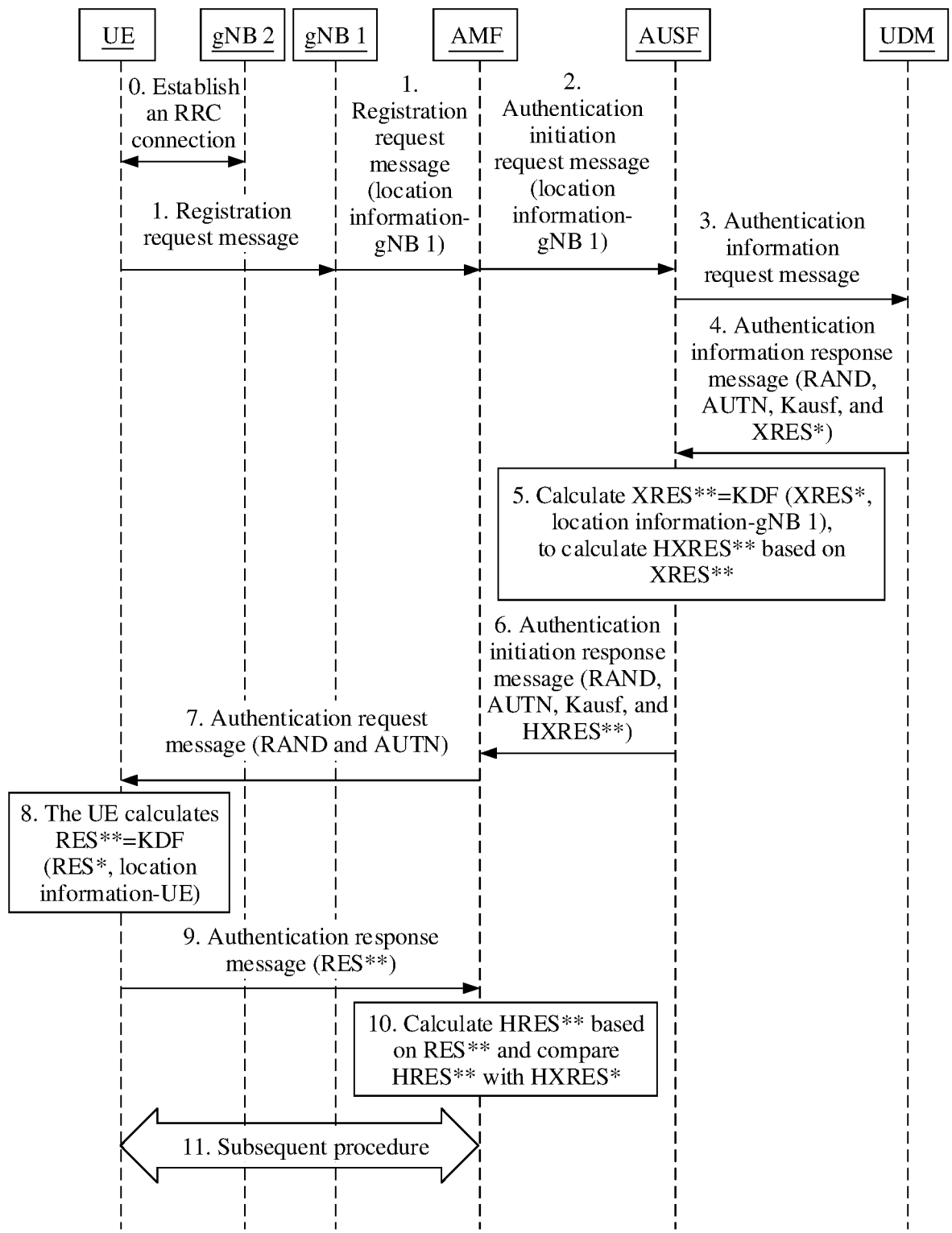
FIG. 11 is a message exchange diagram of a terminal device location determining method according to Embodiment 9.

FIG. 11 is a message exchange diagram of a terminal device location determining method according to Embodiment 9. The terminal device location determining method provided in this embodiment can be applied to a 5G communications system. Network elements in the 5G communications system may include a terminal device (UE), gNodeBs (a first gNodeB gNB 1 and a second gNodeB gNB 2), and core network devices (an AMF, an AUSE, and a UDM entity). It should be noted that in some scenarios, the first gNodeB gNB 1 and the second gNodeB gNB 2 may be the same gNodeB. As shown in FIG. 11, the terminal device location determining method provided in this application may include the following steps.

In step 0, the UE establishes an RRC connection to the gNB 2.

After establishing the RRC connection to the gNB 2, the UE may obtain location information of the terminal device (represented by "location information-UE") from the gNB 2. The location information of the terminal device may be location information (for example, a TAI) of the gNB 2.

In step 1, the UE sends a registration request message to the AMF by using the gNB 1.

The registration request message is a NAS message. The registration request message sent by the gNB 1 to the AMF includes location information of the gNB 1 (represented by "location information-gNB 1").

In step 2, the AMF sends an authentication initiation request message to the AUSF, where the authentication initiation request message includes the "location information-gNB 1".

In step 3, the AUSF sends an authentication information request message to the UDM entity.

In step 4, the UDM entity sends an authentication information response message to the AUSF, where the authentication information response message includes RAND, AUTN, Kausf, and XRES*.

In step 5, the AUSF calculates XRES**=KDF(XRES*, location information-gNB 1) by using the "location information-gNB 1", and then calculates HXRES based on XRES.

In this step, the AUSF may determine the authentication parameters XRES and HXRES based on the location information reported by the gNB 1.

HXRES represents a digest value of an expected response including location information. Optionally, the AUSF may set an identifier, where the identifier is used to indicate that the UE is required to calculate RES by using the location information-UE. In an implementation, the identifier may be set in AUTN. In another implementation, the identifier may specially be carried by using a parameter, and is transferred to the UE by using the AMF.

In step 6, the AUSF sends an authentication initiation response message to the AMF, where the authentication initiation response message includes RAND, AUTN, Kausf, and HXRES**.

In step 7, the AMF sends an authentication request message to the UE by using the gNB 1, where the authentication request message includes RAND and AUTN.

In step 8, the UE calculates RES**=KDF(RES*, location information-UE) by using the "location information-UE".

In this step, the UE may determine the authentication parameter RES** based on the obtained location information of the terminal device.

Optionally, the UE may further determine, based on an identifier sent by a network side, whether to calculate RES by using the location information-UE. If the UE calculates RES, the UE sends RES** to the AMF. Otherwise, the UE sends RES* to the AMF.

In step 9, the UE sends an authentication response message to the AMF by using the gNB 1, where the authentication response message includes RES**.

In step 10, the AMF calculates HRES based on RES and compares the calculated HRES with HXRES.

In step 11, a subsequent procedure may be performed.

In an exemplary embodiment, if HXRES** is inconsistent with HRES*, the AMF may send an authentication reject message to the UE by using the gNB 1.

Optionally, the AMF may further determine, through comparison, whether the location information of the terminal device reported by the UE is consistent with the location information reported by the gNB 1. If the location information of the terminal device reported by the UE is consistent with the location information reported by the gNB 1, the authentication reject message may carry a cause value. The cause value indicates location inconsistency of the user equipment. The location information of the terminal device reported by the UE may be carried in a NAS message that is used before step 10, so that the location information of the terminal device reported by the UE is sent to the AMF.

If HXRES** is consistent with HRES*, the subsequent procedure is normally performed.

Steps 0 to 2 and steps 7 to 9 in this embodiment are respectively similar to steps 0 to 2 and steps 7 to 9 in the embodiment shown in FIG. 8.

A difference between this embodiment and the embodiment shown in FIG. 8 lies in that: In FIG. 8, the UDM entity calculates XRES**, and the AUSF calculates HXRES*. In this embodiment, the AUSF calculates XRES and HXRES.

The terminal device location determining method provided in this embodiment can be applied to a 5G communications network. The terminal device determines RES based on the obtained location information of the terminal device, and sends RES to the AMF. The AUSF determines XRES and HXRES based on the location information reported by the base station. The AMF determines whether HRES determined based on RES is consistent with HXRES**, to determine whether a location of the terminal device is incorrectly determined. In this way, accuracy of determining the location of the terminal device is improved.

Figure 12:
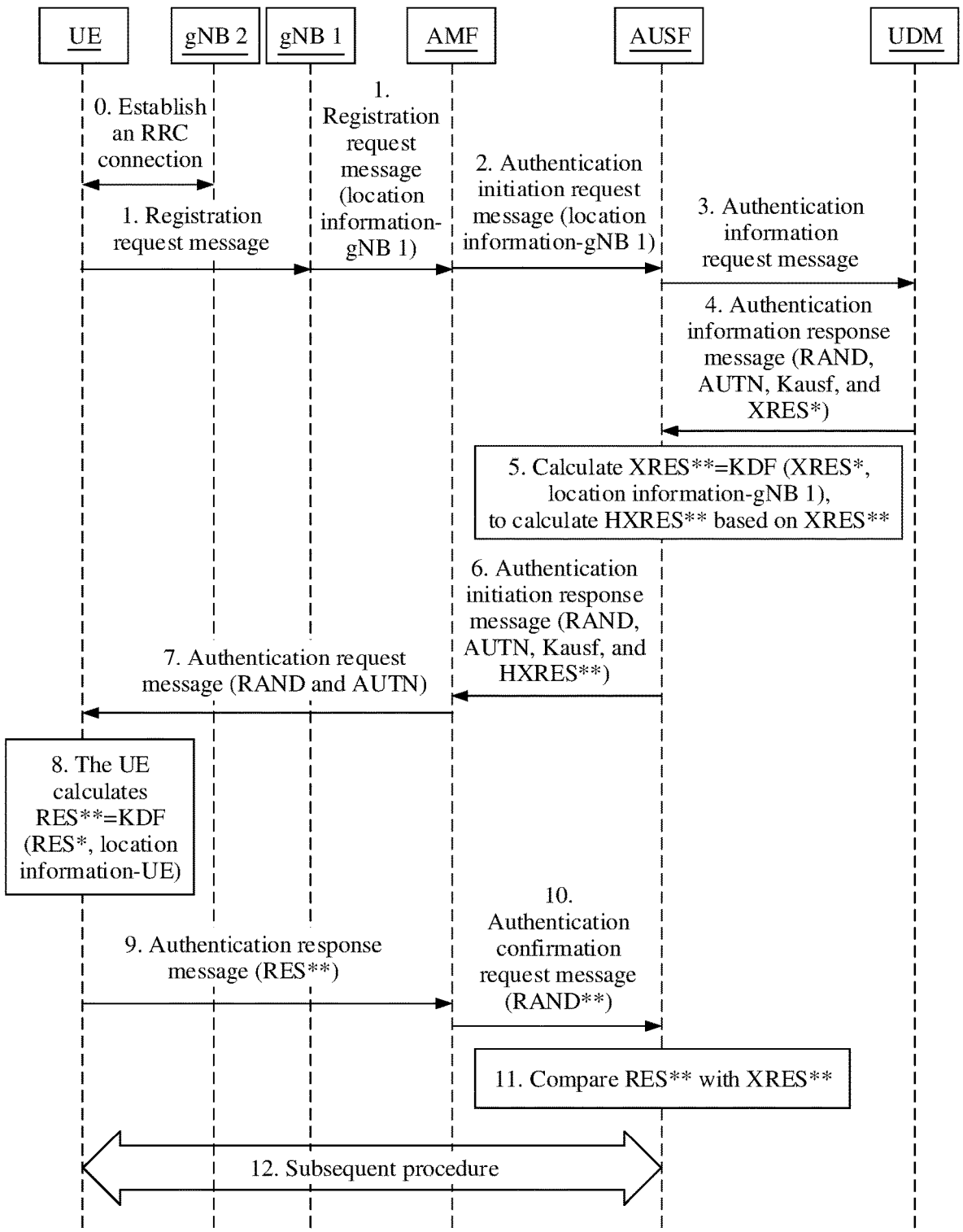
FIG. 12 is a message exchange diagram of a terminal device location determining method according to Embodiment 10.

FIG. 12 is a message exchange diagram of a terminal device location determining method according to Embodiment 10. The terminal device location determining method provided in this embodiment can be applied to a 5G communications system. Network elements in the 5G communications system may include a UE, gNodeBs (a first gNodeB gNB 1 and a second gNodeB gNB 2), and core network devices (an AMF, an AUSE, and a UDM entity). It should be noted that in some scenarios, the first gNodeB gNB 1 and the second gNodeB gNB 2 may be the same gNodeB. As shown in FIG. 12, the terminal device location determining method provided in this application may include the following steps.

Steps 0 to 9 are respectively similar to steps 0 to 9 in the embodiment shown in FIG. 11, and details are not described herein again.

In step 10, the AMF sends an authentication confirmation request message to the AUSF, where the authentication confirmation request message includes RES** reported by the UE.

In step 11, the AUSF compares RES with XRES to determine whether RES is consistent with XRES.

In step 12, a subsequent procedure may be performed.

In an exemplary embodiment, if RES is inconsistent with XRES, the AUSF may send an authentication reject message to the AMF.

Optionally, the AUSF or the AMF may further determine, through comparison, whether the location information of the terminal device reported by the UE is consistent with the location information reported by the gNB 1. If the location information of the terminal device reported by the UE is consistent with the location information reported by the gNB 1, the authentication reject message may carry a cause value. The cause value indicates location inconsistency of the user equipment. The location information of the terminal device reported by the UE may be carried in a NAS message that is used before step 11, so that the location information of the terminal device reported by the UE is sent to the AUSF or the AMF.

If RES is consistent with XRES, the subsequent procedure is normally performed. The AUSF may send an authentication confirmation response message to the AMF.

A difference between this embodiment and the embodiment shown in FIG. 11 lies in that: In FIG. 11, the AMF determines, through comparison, whether HXRES** is consistent with HRES*. In this embodiment, the AUSF determines, through comparison, whether RES is consistent with XRES.

The terminal device location determining method provided in this embodiment can be applied to a 5G communications network. The terminal device determines RES based on the obtained location information of the terminal device, and sends RES to the AUSF by using the AMF. The AUSF determines XRES based on the location information reported by the base station, and determines, through comparison, whether RES is consistent with XRES**, to determine whether a location of the terminal device is incorrectly determined. In this way, accuracy of determining the location of the terminal device is improved.

Figure 13:
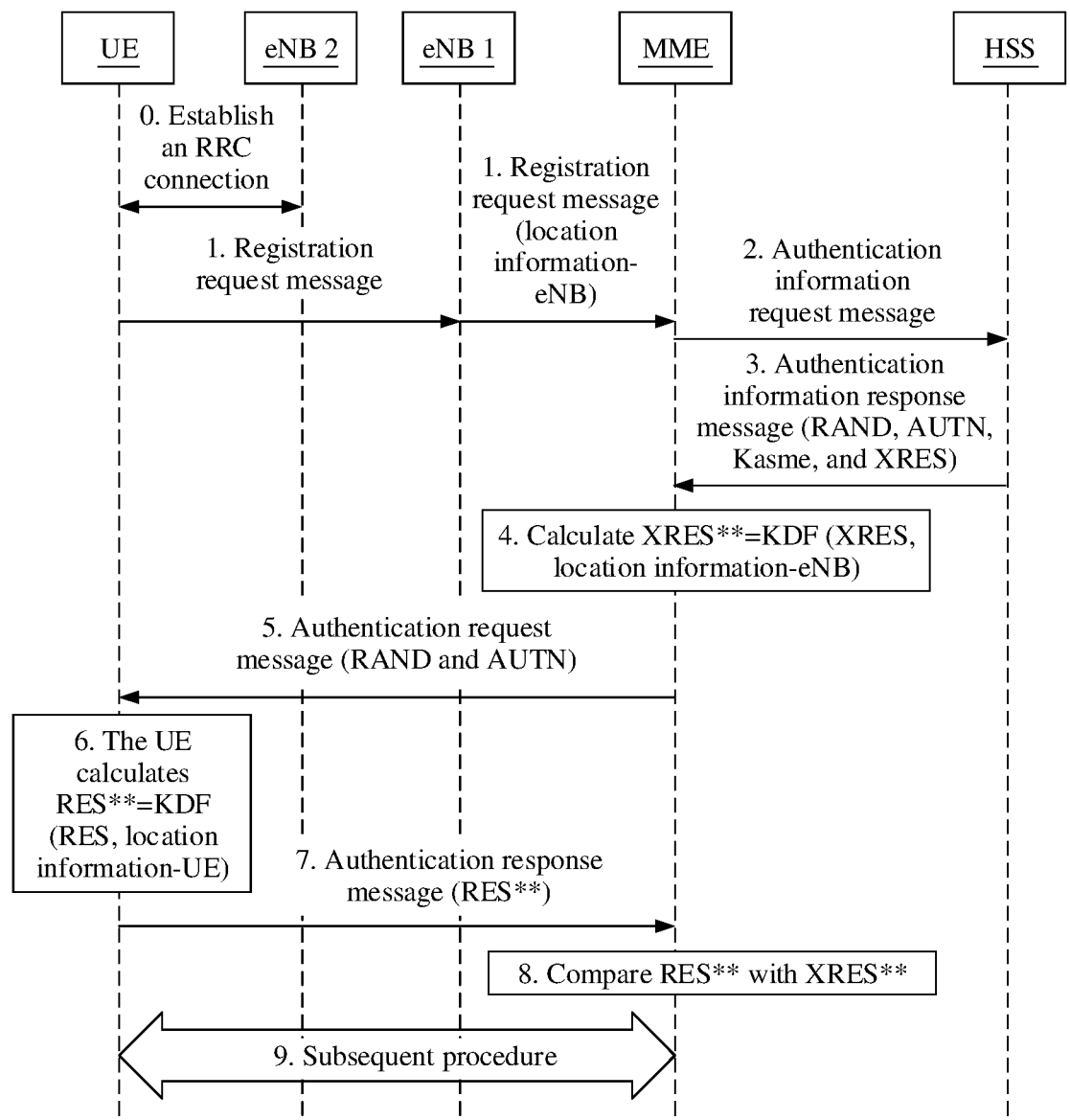
FIG. 13 is a message exchange diagram of a terminal device location determining method according to Embodiment 11.

FIG. 13 is a message exchange diagram of a terminal device location determining method according to Embodiment 11. The terminal device location determining method provided in this embodiment can be applied to an LTE communications system. Network elements in the LTE communications system may include a UE, eNodeBs (a first eNodeB eNB 1 and a second eNodeB eNB 2), and core network devices (an MME and an HSS). It should be noted that in some scenarios, the first eNodeB eNB 1 and the second eNodeB eNB 2 may be the same eNodeB. As shown in FIG. 13, the terminal device location determining method provided in this application may include the following steps.

In step 0, the UE establishes an RRC connection to the eNB 2.

After establishing the RRC connection to the eNB 2, the UE may obtain location information of the terminal device (represented by "location information-UE") from the eNB 2. The location information of the terminal device may be location information (for example, a TAI) of the eNB 2.

In step 1, the UE sends a registration request message to the MME by using the eNB 1.

The registration request message is a NAS message. The registration request message sent by the eNB 1 to the MME includes location information of the eNB 1 (represented by "location information-eNB 1").

In step 2, the MME sends an authentication information request message to the HSS.

In step 3, the HSS sends an authentication information response message to the MME, where the authentication information response message includes RAND, AUTN, Kasme, and XRES.

In step 4, the MME calculates XRES**=KDF(XRES, location information-eNB 1) by using the "location information-eNB 1".

In this step, the MME may determine the authentication parameter XRES** based on the location information reported by the eNB 1.

Optionally, an identifier may be set, where the identifier is used to indicate that the UE is required to calculate RES** by using the location information-UE. In an implementation, the identifier may be set in AUTN. In another implementation, the identifier may be, for example, carried by using a parameter, and is transferred to the UE.

In step 5, the MME sends an authentication request message to the UE by using the eNB 1, where the authentication request message includes RAND and AUTN.

In step 6, the UE calculates RES**=KDF(RES, location information-UE) by using the "location information-UE".

In this step, the UE may determine the authentication parameter RES** based on the obtained location information of the terminal device.

Optionally, the UE may further determine, based on an identifier sent by a network side, whether to calculate RES by using the location information-UE. If the UE calculates RES, the UE sends RES** to the MME. Otherwise, the UE sends RES to the MME.

In step 7, the UE sends an authentication response message to the MME by using the eNB 1, where the authentication response message includes RES**.

In step 8, the MME compares RES with XRES to determine whether RES is consistent with XRES.

In step 9, a subsequent procedure may be performed.

In an exemplary embodiment, if HRES** is inconsistent with HRES*, the MME may send an authentication reject message to the UE by using the eNB 1.

Optionally, the MME may further determine, through comparison, whether the location information of the terminal device reported by the UE is consistent with the location information reported by the eNB 1. If the location information of the terminal device reported by the UE is consistent with the location information reported by the eNB 1, the authentication reject message may carry a cause value. The cause value indicates location inconsistency of the user equipment. The location information of the terminal device reported by the UE may be carried in a NAS message that is used before step 8, so that the location information of the terminal device reported by the UE is sent to the MME.

If HRES** is consistent with HRES*, the subsequent procedure is normally performed.

A difference between this embodiment and the embodiment shown in FIG. 10 lies in that: In FIG. 10, the HSS calculates XRES. In this embodiment, the MME calculates XRES.

The terminal device location determining method provided in this embodiment can be applied to an LTE communications network. The terminal device determines RES based on the obtained location information of the terminal device, and sends RES to the MME. The MME determines XRES based on the location information reported by the base station, and determines whether RES is consistent with XRES**, to determine whether a location of the terminal device is incorrectly determined. In this way, accuracy of determining the location of the terminal device is improved.

Figure 14:
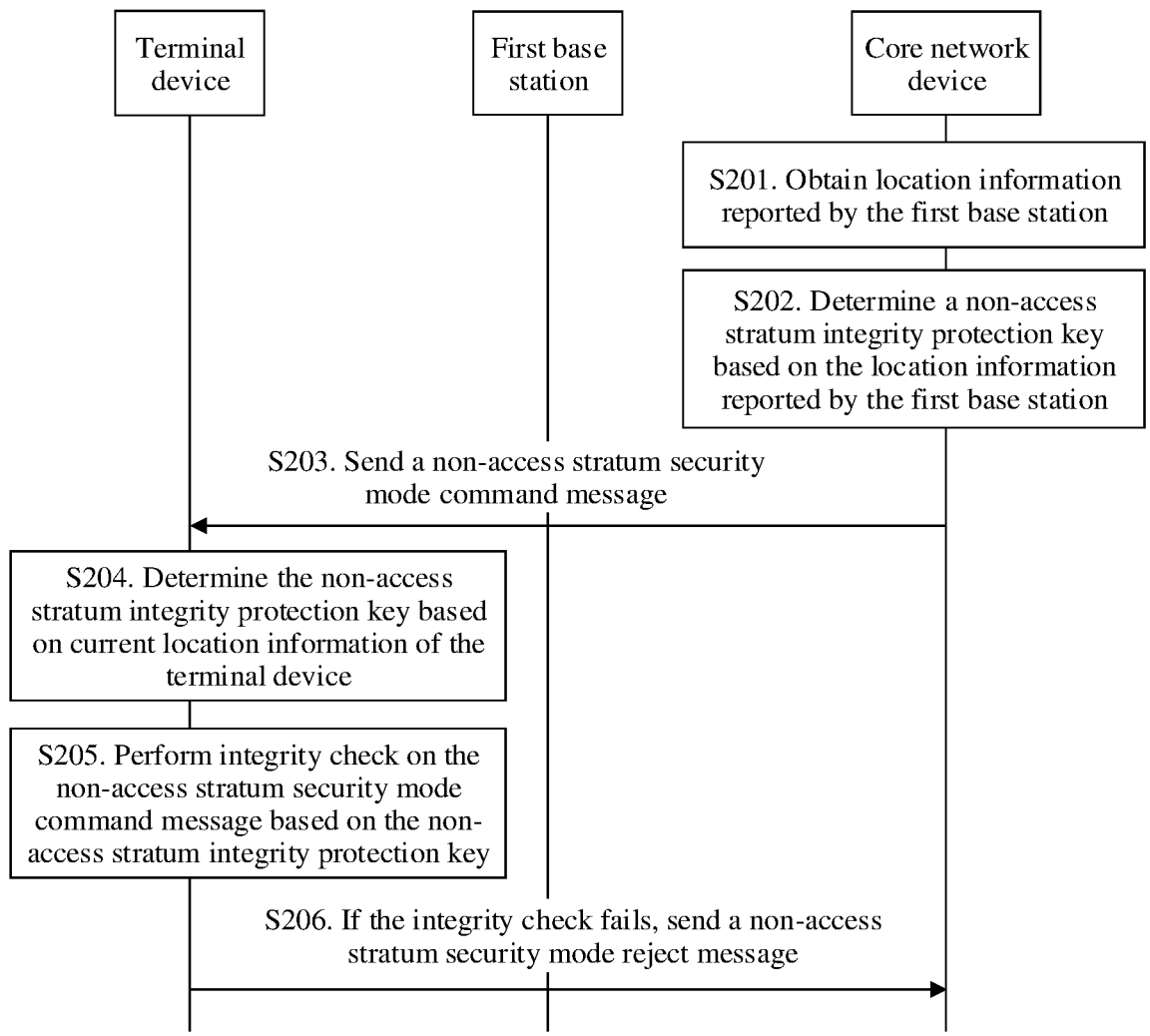
FIG. 14 is a message exchange diagram of a terminal device location determining method according to Embodiment 12.

FIG. 14 is a message exchange diagram of a terminal device location determining method according to Embodiment 12. The terminal device location determining method provided in this embodiment can be applied to a 4G communications network or a 5G communications network. Network elements in this embodiment may include a terminal device, a base station, and a core network device. The terminal device and the core network device may communicate with each other by using the base station (the base station is a first base station herein). As shown in FIG. 14, the terminal device location determining method provided in this embodiment may include the following steps.

In step S201, the core network device obtains location information reported by the first base station.

In step S202, the core network device determines a NAS integrity protection key based on the location information reported by the first base station.

Optionally, the core network device is a mobility management network element, and the determining a NAS integrity protection key based on the location information reported by the first base station may include:

sending, to a data management network element, the location information reported by the first base station; and receiving an access security management entity key sent by the data management network element, where the access security management entity key is determined by the user data management network element based on the location information reported by the first base station.

In step S203, the core network device sends a NAS SMC message to the terminal device.

The NAS SMC message is used to perform integrity protection by using the NAS integrity protection key.

Correspondingly, the terminal device receives the NAS SMC message sent by the core network device.

In step S204, the terminal device determines a NAS integrity protection key based on current location information of the terminal device.

In step S205, the terminal device performs integrity check on the NAS SMC message based on the NAS integrity protection key.

It can be learned that in the terminal device location determining method provided in this embodiment, the core network device determines the NAS integrity protection key based on the location information reported by the base station, and performs integrity protection on the NAS SMC message by using the NAS integrity protection key; and the terminal device determines the NAS integrity protection key based on the current location information of the terminal device, and performs integrity check on the NAS SMC message based on the NAS integrity protection key. If the location information reported by the base station does not match the current location information of the terminal device, the integrity protection check cannot succeed. If the location information reported by the base station matches the current location information of the terminal device, the integrity protection check can succeed. Therefore, the location information reported by the base station and the current location information of the terminal device can be applied to a key derivation process, to determine whether a location of the terminal device is incorrectly determined. In this way, when the two pieces of location information do not match each other, the terminal device is prevented from accessing a network, thereby improving communication security performance.

Optionally, the terminal device location determining method provided in this embodiment may further include the following step.

In step S206, if the integrity check performed by the terminal device on the NAS SMC message based on the NAS integrity protection key fails, the terminal device sends a NAS security mode reject message to the core network device.

Optionally, the core network device may send the location information of the first base station to the terminal device by using the NAS SMC message. Alternatively, after receiving the NAS SMC message sent by the core network device to the terminal device, the first base station packages the location information of the first base station and a NAS PDU together and sends packaged information to the terminal device. When failing in performing the integrity check on the NAS SMC message, the terminal device may determine, through comparison, whether the location information of the terminal device matches the location information of the first base station, to determine whether the location of the terminal device is incorrect. Alternatively, the terminal device determines, based on the location information of the terminal device, whether the location of the terminal device is incorrect. For details, refer to the description of the embodiment shown in FIG. 3, and details are not described herein again. If the terminal device determines that the location information of the terminal device does not match the location information of the first base station, the NAS security mode reject message may carry a cause value indicating location inconsistency.

Optionally, the NAS security mode reject message may carry a cause value and the location information of the terminal device. Subsequently, the core network device may determine, through comparison, whether the location information reported by the first base station matches the location information of the terminal device reported by the terminal device.

Optionally, the terminal device location determining method provided in this embodiment may further include:

if the core network device receives the SMC reject message sent by the terminal device, sending, by the core network device, an attach reject message or a registration reject message to the terminal device.

Optionally, if the NAS security mode reject message includes the location information of the terminal device, the core network device may determine, through comparison, whether the location information of the first base station matches the location information of the terminal device reported by the terminal device. If the core network device determines that the location information of the terminal device does not match the location information reported by the first base station, the attach reject message or the registration reject message may carry the cause value indicating location information inconsistency.

It should be noted that the location information of the terminal device reported by the terminal device may alternatively be carried in the NAS message before step S206, so that the location information of the terminal device is reported to the core network device.

This embodiment provides the terminal device location determining method, including: obtaining, by the core network device, the location information reported by the first base station; determining, by the core network device, the NAS integrity protection key based on the location information reported by the first base station; sending, by the core network device, the NAS SMC message to the terminal device; determining, by the terminal device, the NAS integrity protection key based on the current location information of the terminal device; and performing integrity check on the NAS SMC message based on the NAS integrity protection key. According to the terminal device location determining method provided in this embodiment, the location information reported by the base station and the current location information of the terminal device can be applied to a NAS key derivation process. In this way, when the two pieces of location information do not match each other, the terminal device is prevented from accessing a network, thereby improving communication security performance.

Figure 15A:
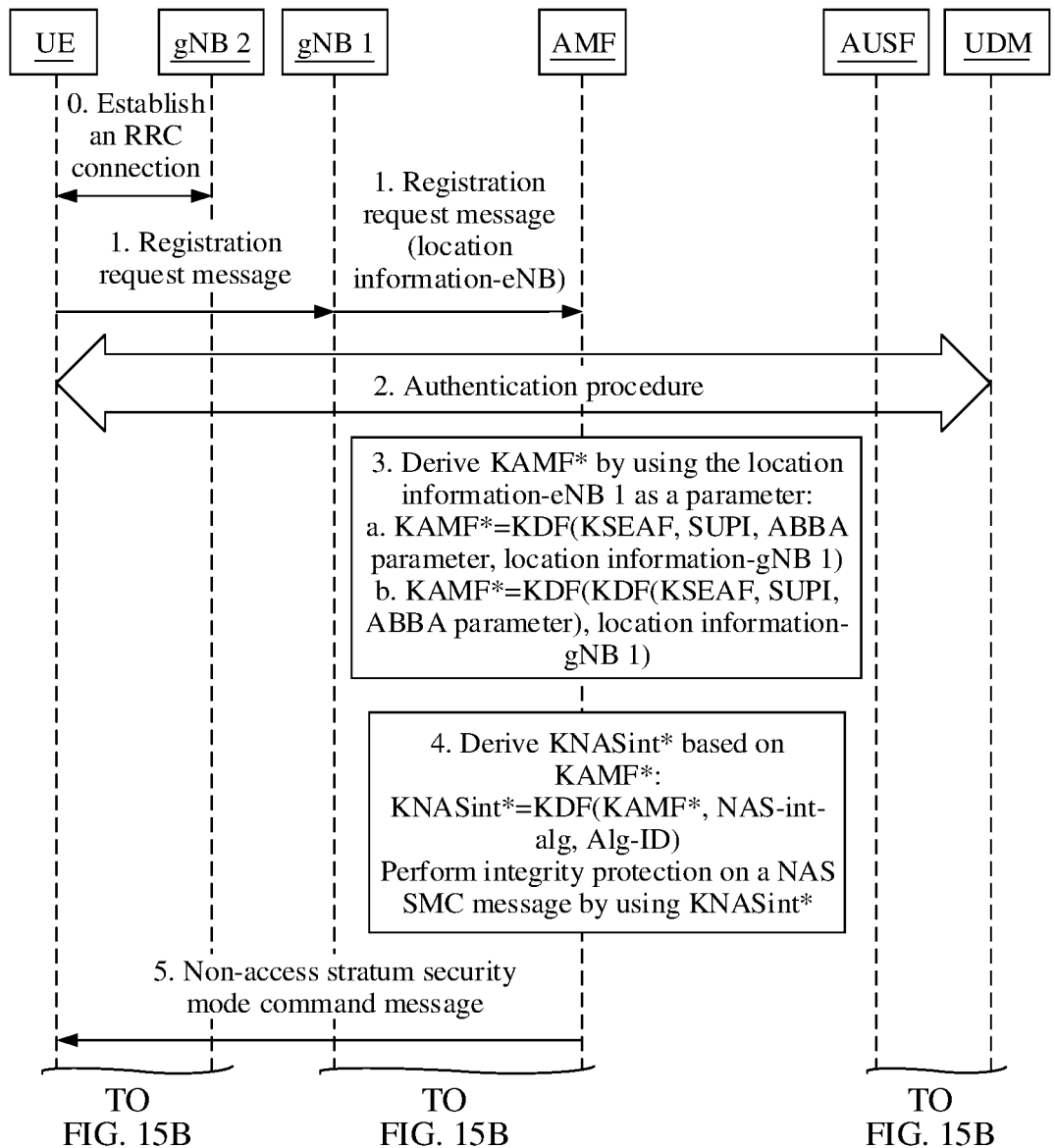
FIG. 15A is a message exchange diagram of a terminal device location determining method according to Embodiment 13.
Figure 15B:
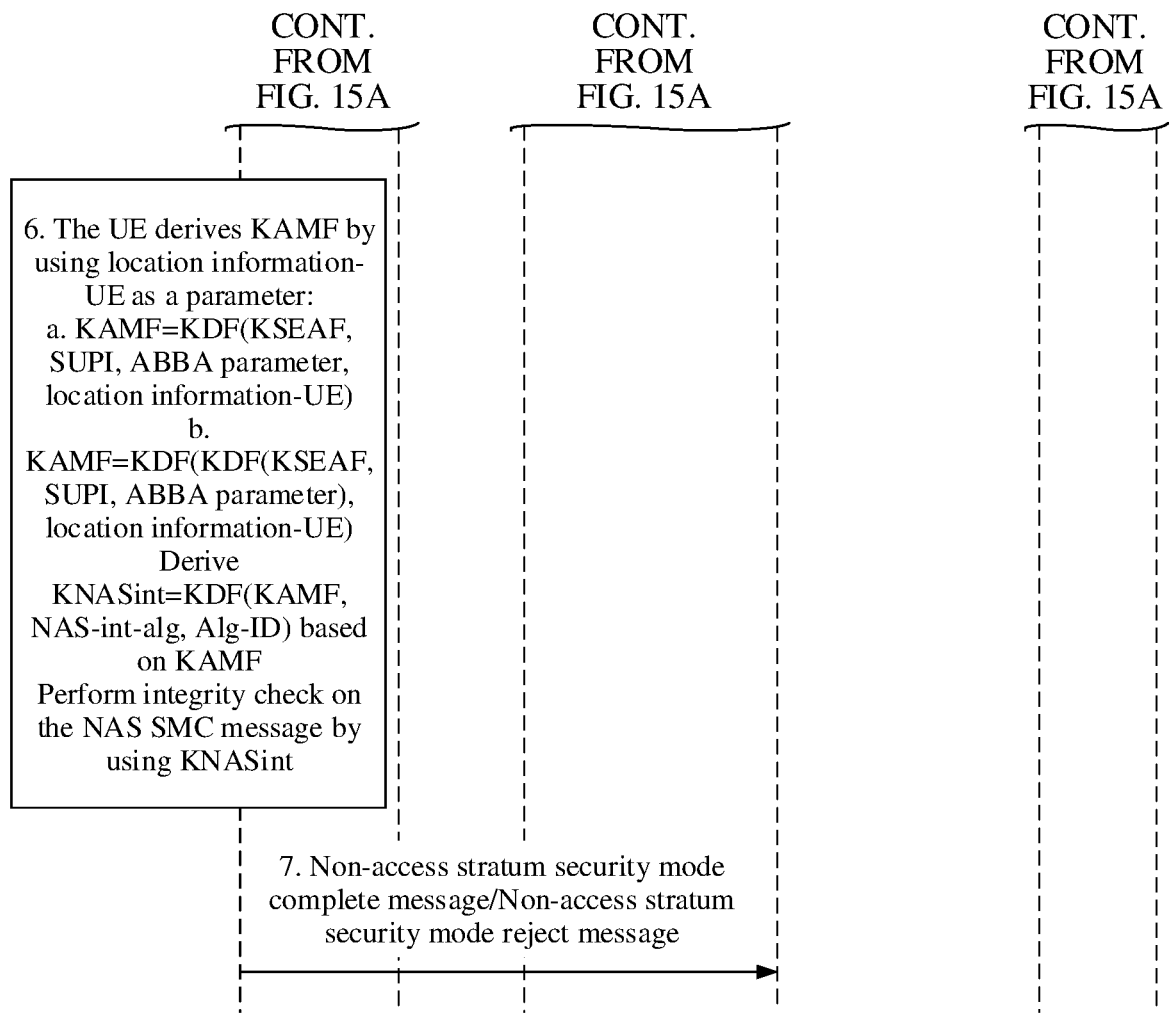
FIG. 15B is a message exchange diagram of a terminal device location determining method according to Embodiment 13.

FIG. 15A and FIG. 15B are a message exchange diagram of a terminal device location determining method according to Embodiment 13. Based on the embodiment shown in FIG. 14, this embodiment provides an exemplary implementation of the terminal device location determining method. The terminal device location determining method provided in this embodiment can be applied to a 5G communications system. Network elements in the 5G communications system may include a UE, gNodeBs (a first gNodeB gNB 1 and a second gNodeB gNB 2), and core network devices (an AMF, an AUSE, and a UDM entity). It should be noted that in some scenarios, the first gNodeB gNB 1 and the second gNodeB gNB 2 may be the same gNodeB. As shown in FIG. 15A and FIG. 15B, the terminal device location determining method provided in this application may include the following steps.

In step 0, the UE establishes an RRC connection to the gNB 2.

After establishing the RRC connection to the gNB 2, the UE may obtain location information of the terminal device (represented by "location information-UE") from the gNB 2. The location information of the terminal device may be location information (for example, a TAI) of the gNB 2.

In step 1, the UE sends a registration request message to the AMF by using the gNB 1.

The registration request message is a NAS message. The registration request message sent by the gNB 1 to the AMF includes location information of the gNB 1 (represented by "location information-gNB 1").

In step 2, an authentication procedure may be performed.

The authentication procedure is similar to an existing authentication procedure. For the authentication procedure, refer to the existing authentication procedure.

In step 3, the AMF derives KAMF* by using the location information reported by the gNB 1 (location information-gNB 1) as a parameter.

Optionally, KAMF* may be determined in either of the following manners:

a. KAMF*=KDF(KSEAF, SUPI, ABBA parameter, location information-gNB 1), and b. KAMF*=KDF(KDF(KSEAF, SUPI, ABBA parameter), location information-gNB 1).

KAMF* represents a key of an AMF including location information, KSEAF represents a key of a security anchor function, SUPI represents a subscriber permanent identifier, and the ABBA parameter represents a parameter, namely, The Anti-Bidding down Between Architectures for preventing a downgrade attack.

In step 4, the AMF derives KNASint*=KDF(KAMF*, NAS-int-alg, Alg-ID) based on KAMF*, and then the AMF initiates a NAS SMC procedure, and performs integrity protection on a NAS SMC message by using KNASint*.

NAS-int-alg represents a NAS integrity protection algorithm, Alg-ID represents an algorithm identifier, and KNASint* represents a NAS stratum integrity protection key including location information.

In step 5, the AMF sends a NAS SMC message to the UE by using the gNB 1.

In step 6, the UE derives KAMF by using the obtained location information of the terminal device (location information-UE) as a parameter.

Optionally, KAMF may be determined in either of the following manners:

a. KAMF=KDF(KSEAF, SUPI, ABBA parameter, location information-UE), and b. KAMF=KDF(KDF(KSEAF, SUPI, ABBA parameter), location information-UE).

KAMF represents a key used by the AMF.

The UE derives KNASint=KDF(KAMF, NAS-int-alg, Alg-ID) based on KAMF, and performs integrity check on the NAS SMC message by using KNASint.

KNASint represents a NAS stratum integrity protection key.

In step 7, based on a check result in step 6, the UE sends a NAS security mode complete message or a NAS security mode reject message to the AMF by using the gNB 1.

In an exemplary embodiment, if the check succeeds in step 6, the UE sends the NAS Security Mode Complete message to the AMF. If the check fails in step 6, the UE sends the NAS Security Mode Reject message to the AMF.

It should be noted that all parameters in this embodiment except KAMF* and KAMF, and manners of obtaining the parameters are the same as those in the prior art.

Optionally, the terminal device location determining method provided in this embodiment may further include:

if the integrity check performed by the UE on the NAS SMC message based on the NAS integrity protection key fails, sending, by the UE, a NAS security mode reject message to the core network device.

Optionally, the core network device may send the location information of the first gNodeB to the UE by using the NAS SMC message. Alternatively, after receiving the NAS SMC message sent by the core network device to the UE, the first gNodeB packages the location information of the first gNodeB and a NAS PDU together, and sends packaged information to the UE. When failing in performing the integrity check on the NAS SMC message, the UE may determine, through comparison, whether the location information of the UE matches the location information of the first gNodeB, to determine whether a location of the UE is incorrect. Alternatively, the UE determines, based on the location information of the UE, whether a location of the UE is incorrect. For details, refer to the description of the embodiment shown in FIG. 3, and details are not described herein again. If the UE determines that the location information of the UE does not match the location information of the first gNodeB, the NAS security mode reject message may carry a cause value indicating location inconsistency.

Optionally, the NAS security mode reject message may carry the cause value and the location information of the UE. Subsequently, the core network device may determine, through comparison, whether the location information reported by the first gNodeB matches the location information of the UE reported by the UE.

Optionally, the terminal device location determining method provided in this embodiment may further include:

if the core network device receives a SMC reject message sent by the UE, sending, by the core network device, an attach reject message or a registration reject message to the UE.

Optionally, if the NAS security mode reject message includes the location information of the UE, the core network device may determine, through comparison, whether the location information of the first gNodeB matches the location information of the UE reported by the UE. If the core network device determines that the location information of the UE does not match the location information reported by the first gNodeB, the attach reject message or the registration reject message may carry the cause value indicating location information inconsistency.

There is another form in this embodiment. The AMF may alternatively send, to the AUSF, the location information reported by the gNB 1 (location information-gNB 1); the AUSF generates Kseaf=KDF(Kausf, location information-gNB 1, . . . ) or Kseaf=KDF(CK'||IK', location information-gNB 1, . . . ) based on the location information-gNB 1; and the AUSF sends Kseaf to the SEAF/AMF, and then the AMF derives Kamf based on Kseaf and further derives a NAS integrity protection key based on Kamf.

The UE side derives a NAS integrity protection key by using the same method, but location information parameter used in the derivation process is the location information-UE.

There is still another form in this embodiment. The AMF may alternatively send, to the AUSF, the location information reported by the gNB 1 (location information-gNB 1); the AUSF sends the location information-gNB 1 to the UDM entity; the UDM entity generates Kausf=KDF(CK||IK, location information-gNB 1, . . . ) or CK'||IK'=KDF(CK||IK, location information-gNB 1, . . . ) based on the location information-gNB 1, and then the UDM entity sends Kausf to the AUSF, or sends CK' and IK' to the AUSF (in this case, the AUSF generates Kausf based on CK' and IK'); the AUSF generates Kseaf based on Kausf, and the AUSF sends Kseaf to the SEAF/AMF, and then the AMF derives Kamf based on Kseaf and further derives a NAS integrity protection key based on Kamf.

The UE side derives a NAS integrity protection key by using the same method, but location information parameter used in the derivation process is the location information-UE.

The terminal device location determining method provided in this embodiment can be applied to a 5G communications network. The AMF can complete NAS integrity key derivation and integrity protection on the NAS message by using the location information reported by the base station. The terminal device can complete the NAS integrity key derivation and check on the NAS message by using the obtained location information of the terminal device. In this way, when the two pieces of location information do not match each other, the terminal device is prevented from accessing a network, thereby improving communication security performance.

Figure 16A:
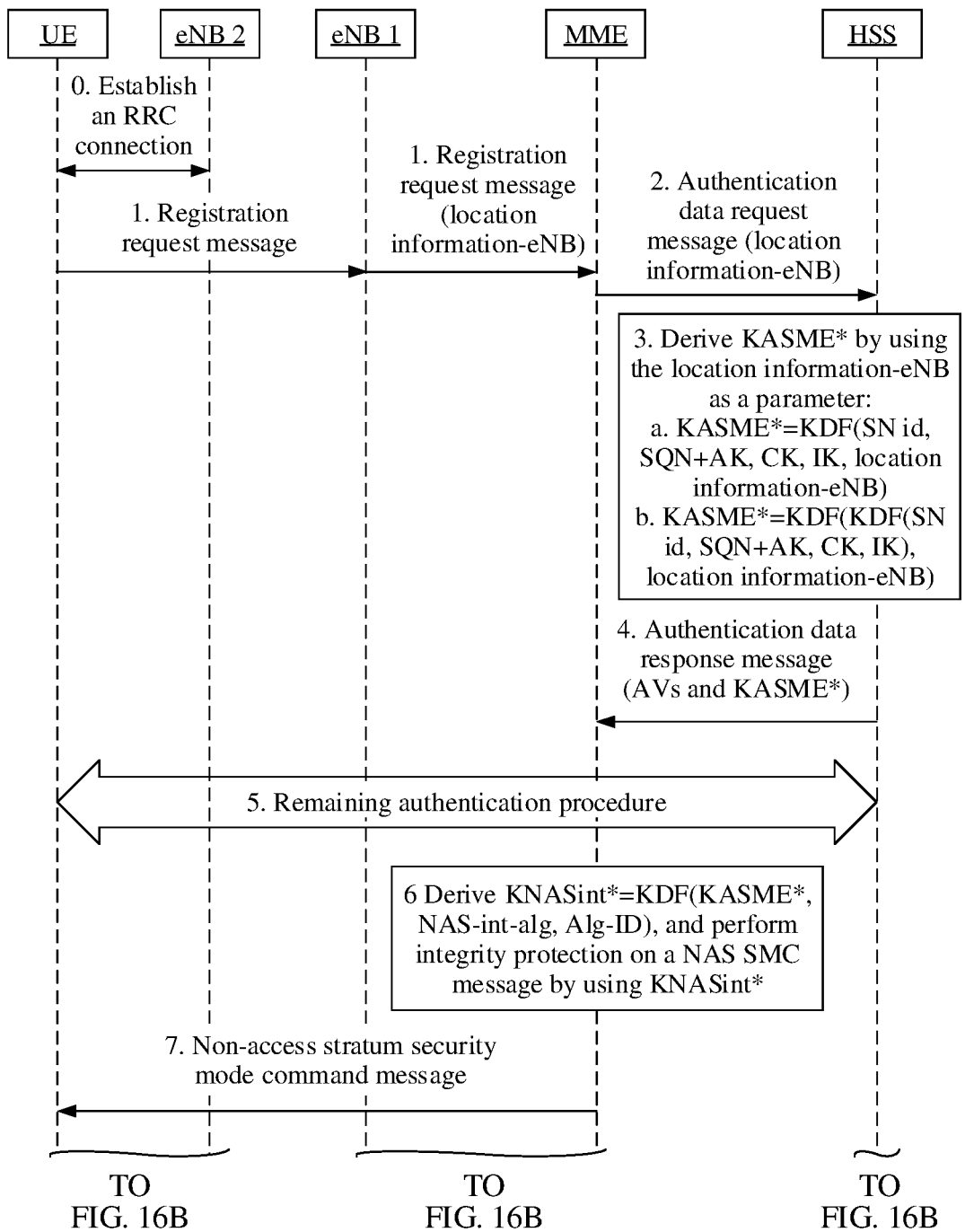
FIG. 16A is a message exchange diagram of a terminal device location determining method according to Embodiment 14.
Figure 16B:
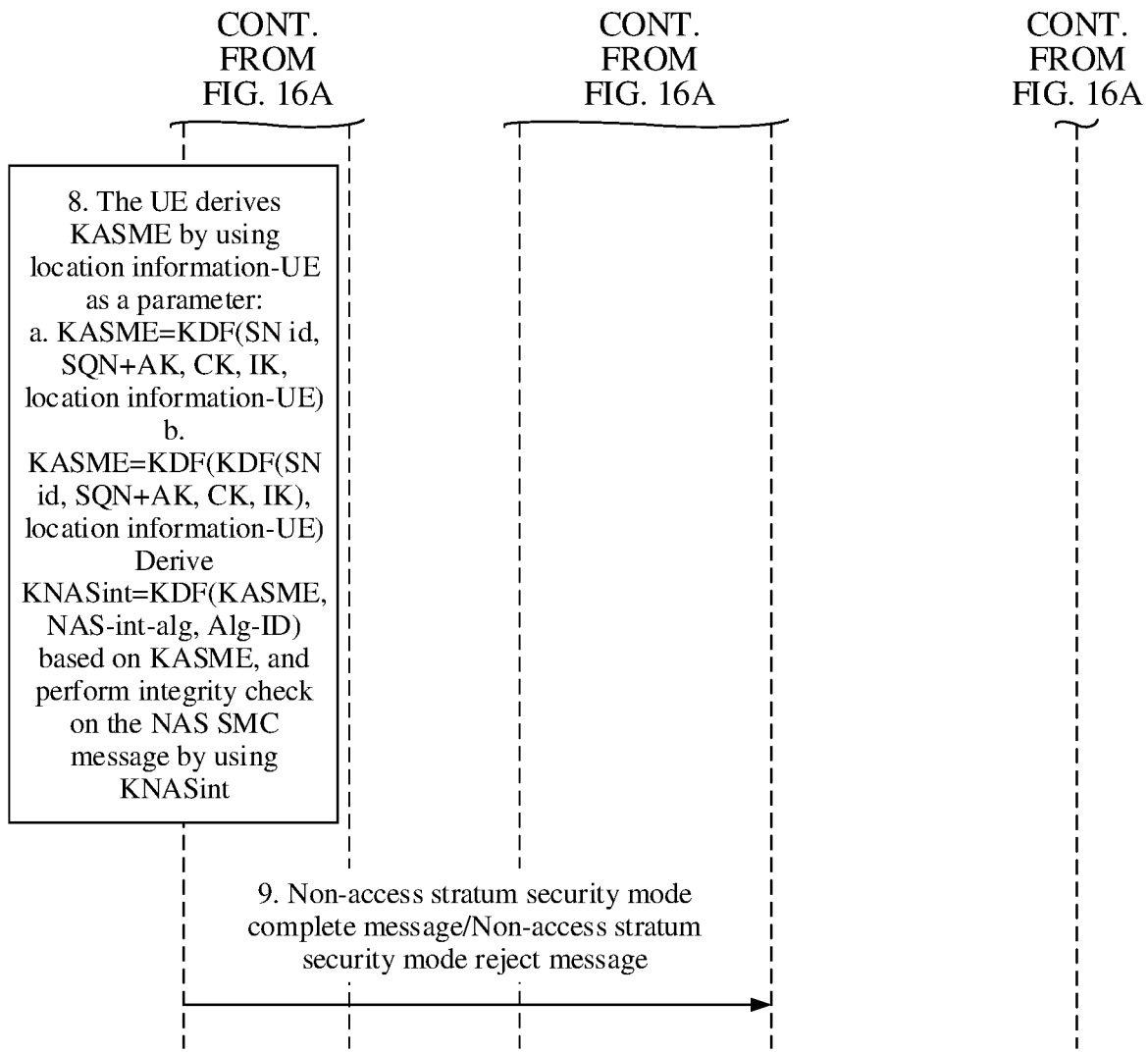
FIG. 16B is a message exchange diagram of a terminal device location determining method according to Embodiment 14.

FIG. 16A and FIG. 16B are a message exchange diagram of a terminal device location determining method according to Embodiment 14. Based on the embodiment shown in FIG. 14, this embodiment provides an exemplary implementation of the terminal device location determining method. The terminal device location determining method provided in this embodiment can be applied to an LTE communications system. Network elements in the LTE communications system may include a UE, eNodeBs (a first eNodeB eNB 1 and a second eNodeB eNB 2), and core network devices (an MME and an HSS). It should be noted that in some scenarios, the first eNodeB eNB 1 and the second eNodeB eNB 2 may be the same eNodeB. As shown in FIG. 16A and FIG. 16B, the terminal device location determining method provided in this application may include the following steps.

In step 0, the UE establishes an RRC connection to the eNB 2.

After establishing the RRC connection to the eNB 2, the UE may obtain location information of the terminal device (represented by "location information-UE") from the eNB 2. The location information of the terminal device may be location information (for example, a TAI) of the eNB 2.

In step 1, the UE sends a registration request message to the MME by using the eNB 1.

The registration request message is a NAS message. The registration request message sent by the eNB 1 to the MME includes location information of the eNB 1 (represented by "location information-eNB 1").

In step 2, the MME sends authentication data request information to the HSS, where the authentication data request information includes the location information reported by the eNB 1.

In step 3, the MME derives KASME* by using the location information reported by the gNB 1 (location information-gNB 1) as a parameter.

Optionally, KASME* may be determined in either of the following manners:

a. KASME*=KDF(SN id, SQN+AK, CK, IK, location information-eNB 1), and b. KASME*=KDF(KDF(SN id, SQN+AK, CK, IK), location information-eNB 1).

KASME* represents an access security management entity key including location information, SN id represents a serving network identity (serving network identity), SQN represents a sequence number, AK represents an anonymity key, CK represents a cipher key, and IK represents an integrity protection key.

In step 4, the HSS sends an authentication data response message to the MME, where the authentication data response message includes AVs and KASME*.

AVs represents an authentication vector authorization vector.

In step 5, the remaining authentication procedure may be performed.

The remaining authentication procedure is similar to an existing authentication procedure. For the remaining authentication procedure, refer to the existing authentication procedure.

In step 6, the MME derives KNASint*=KDF(KASME*, NAS-int-alg, Alg-ID), and performs integrity protection on a NAS SMC message by using KNASint*.

In step 7, the MME sends a NAS SMC message to the UE by using the eNB 1.

In step 8, the UE derives KASME by using the obtained location information of the terminal device (location information-UE) as a parameter.

Optionally, KASME may be determined in either of the following manners:

a. KASME=KDF(SN id, SQN+AK, CK, IK, location information-UE), and b. KASME=KDF(KDF(SN id, SQN+AK, CK, IK), location information-UE).

The UE derives KNASint=KDF(KASME, NAS-int-alg, Alg-ID) based on KASME, and performs integrity check on the NAS SMC message by using KNASint.

KASME represents an access security management entity key, and KNASint represents a NAS stratum integrity protection key.

In step 9, based on a check result in step 8, the UE sends a NAS security mode complete message or a NAS security mode reject message to the MME by using the eNB 1.

In an exemplary embodiment, if the check succeeds in step 8, the UE sends the NAS Security Mode Complete message to the MME. If the check fails in step 8, the UE sends the NAS Security Mode Reject message to the MME.

It should be noted that all parameters in this embodiment except KASME* and KASME, and manners of obtaining the parameters are the same as those in the prior art.

Optionally, the terminal device location determining method provided in this embodiment may further include:

if the integrity check performed by the UE on the NAS SMC message based on the NAS integrity protection key fails, sending, by the UE, a NAS security mode reject message to the core network device.

Optionally, the core network device may send the location information of the first eNodeB to the UE by using the NAS SMC message. Alternatively, after receiving the NAS SMC message sent by the core network device to the UE, the first eNodeB packages the location information of the first eNodeB and a NAS PDU together, and sends packaged information to the UE. When failing in performing the integrity check on the NAS SMC message, the UE may determine, through comparison, whether the location information of the UE matches the location information of the first eNodeB, to determine whether a location of the UE is incorrect. Alternatively, the UE determines, based on the location information of the UE, whether a location of the UE is incorrect. For details, refer to the description of the embodiment shown in FIG. 3, and details are not described herein again. If the UE determines that the location information of the UE does not match the location information of the first eNodeB, the NAS security mode reject message may carry a cause value indicating location inconsistency.

Optionally, the NAS security mode reject message may carry the cause value and the location information of the UE. Subsequently, the core network device may determine, through comparison, whether the location information reported by the first eNodeB matches the location information of the UE reported by the UE.

Optionally, the terminal device location determining method provided in this embodiment may further include:

if the core network device receives a SMC reject message sent by the UE, sending, by the core network device, an attach reject message or a registration reject message to the UE.

Optionally, if the NAS security mode reject message includes the location information of the UE, the core network device may determine, through comparison, whether the location information of the first eNodeB matches the location information of the UE reported by the UE. If the core network device determines that the location information of the UE does not match the location information reported by the first eNodeB, the attach reject message or the registration reject message may carry the cause value indicating location information inconsistency.

The terminal device location determining method provided in this embodiment can be applied to an LTE communications network. The HSS can obtain KASME* based on the location information reported by the base station, and the MME can complete NAS integrity key derivation and integrity protection on the NAS message based on the KASME*. The terminal device can complete NAS integrity key derivation and check on the NAS message by using the obtained location information of the terminal device. In this way, when the two pieces of location information do not match each other, the terminal device is prevented from accessing a network, thereby improving communication security performance.

Figure 17:
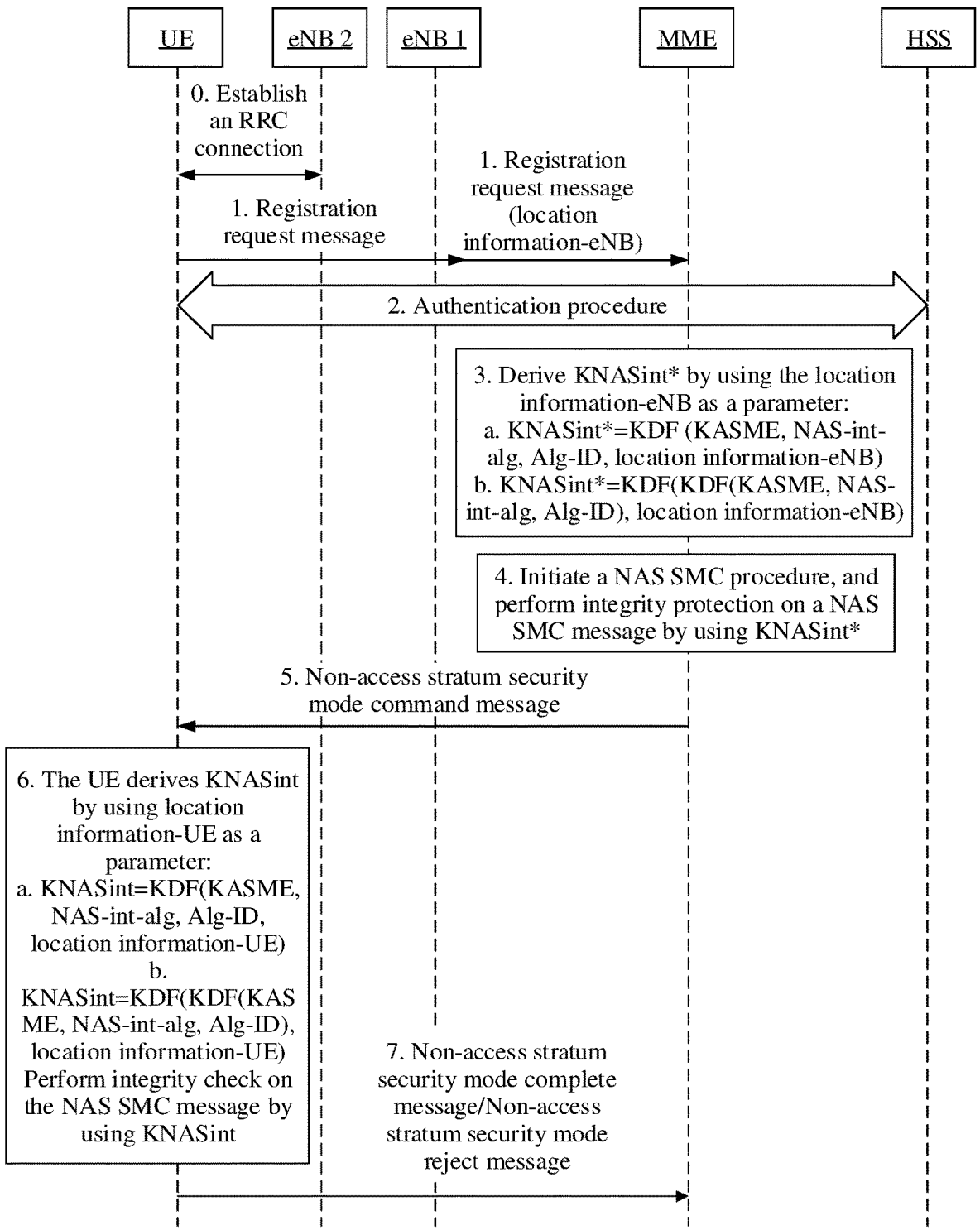
FIG. 17 is a message exchange diagram of a terminal device location determining method according to Embodiment 15.

FIG. 17 is a message exchange diagram of a terminal device location determining method according to Embodiment 15. Based on the embodiment shown in FIG. 14, this embodiment provides an exemplary implementation of the terminal device location determining method. The terminal device location determining method provided in this embodiment can be applied to an LTE communications system. Network elements in the LTE communications system may include a UE, eNodeBs (a first eNodeB eNB 1 and a second eNodeB eNB 2), and core network devices (an MME and an HSS). It should be noted that in some scenarios, the first eNodeB eNB 1 and the second eNodeB eNB 2 may be the same eNodeB. As shown in FIG. 17, the terminal device location determining method provided in this application may include the following steps.

In step 0, the UE establishes an RRC connection to the eNB 2.

After establishing the RRC connection to the eNB 2, the UE may obtain location information of the terminal device (represented by "location information-UE") from the eNB 2. The location information of the terminal device may be location information (for example, a TAI) of the eNB 2.

In step 1, the UE sends a registration request message to the MME by using the eNB 1.

The registration request message is a NAS message. The registration request message sent by the eNB 1 to the MME includes location information of the eNB 1 (represented by "location information-eNB 1").

In step 2, an authentication procedure may be performed.

The authentication procedure is similar to an existing authentication procedure. For the authentication procedure, refer to the existing authentication procedure.

In step 3, the MME derives KNASint* by using the location information-eNB 1 reported by the eNB 1 as a parameter.

Optionally, KNASint* may be determined in either of the following manners:

a. KNASint*=KDF(KASME, NAS-int-alg, Alg-ID, location information-eNB 1), and b. KNASint*=KDF(KDF(KASME, NAS-int-alg, Alg-ID), location information-eNB 1).

In step 4, the MME initiates a NAS SMC procedure, and then performs integrity protection on a NAS SMC message by using KNASint*.

In step 5, the MME sends a NAS SMC message to the UE by using the eNB 1.

In step 6, the UE derives KNASint by using the obtained location information-UE as a parameter.

Optionally, KNASint may be determined in either of the following manners:

a. KNASint=KDF(KASME, NAS-int-alg, Alg-ID, location information-UE), and b. KNASint=KDF(KDF(KASME, NAS-int-alg, Alg-ID), location information-UE).

Then, the UE performs integrity check on the NAS SMC message by using KNASint.

In step 7, based on a check result in step 6, the UE sends a NAS security mode complete (NAS Security Mode Complete) message or a NAS security mode reject (NAS Security Mode Reject) message to the MME by using the eNB 1.

In an exemplary embodiment, if the check succeeds in step 6, the UE sends the NAS Security Mode Complete message to the MME. If the check fails in step 6, the UE sends the NAS Security Mode Reject message to the MME.

It should be noted that all parameters in this embodiment except KNASint* and KNASint, and manners of obtaining the parameters are the same as those in the prior art.

Optionally, the terminal device location determining method provided in this embodiment may further include:

if the integrity check performed by the UE on the NAS SMC message based on the NAS integrity protection key fails, sending, by the UE, a NAS security mode reject message to the core network device.

Optionally, the core network device may send the location information of the first eNodeB to the UE by using the NAS SMC message. Alternatively, after receiving the NAS SMC message sent by the core network device to the UE, the first eNodeB packages the location information of the first eNodeB and a NAS PDU together, and sends packaged information to the UE. When failing in performing the integrity check on the NAS SMC message, the UE may determine, through comparison, whether the location information of the UE matches the location information of the first eNodeB, to determine whether a location of the UE is incorrect. Alternatively, the UE determines, based on the location information of the UE, whether a location of the UE is incorrect. For details, refer to the description of the embodiment shown in FIG. 3, and details are not described herein again. If the UE determines that the location information of the UE does not match the location information of the first eNodeB, the NAS security mode reject message may carry a cause value indicating location inconsistency.

Optionally, the NAS security mode reject message may carry the cause value and the location information of the UE. Subsequently, the core network device may determine, through comparison, whether the location information reported by the first eNodeB matches the location information of the UE reported by the UE.

Optionally, the terminal device location determining method provided in this embodiment may further include:

if the core network device receives a SMC reject message sent by the UE, sending, by the core network device, an attach reject message or a registration reject message to the UE.

Optionally, if the NAS security mode reject message includes the location information of the UE, the core network device may determine, through comparison, whether the location information of the first eNodeB matches the location information of the UE reported by the UE. If the core network device determines that the location information of the UE does not match the location information reported by the first eNodeB, the attach reject message or the registration reject message may carry the cause value indicating location information inconsistency.

A difference between this embodiment and the embodiment shown in FIG. 16A and FIG. 16B lies in that: In FIG. 16A and FIG. 16B, the HSS calculates KASME* based on the location information reported by the base station, and the MME performs NAS integrity key derivation based on KASME*. In this embodiment, the MME directly performs NAS integrity key derivation based on the location information reported by the device.

The terminal device location determining method provided in this embodiment can be applied to an LTE communications network. The MME can complete NAS integrity key derivation and integrity protection on the NAS message by using the location information reported by the base station. The terminal device can complete NAS integrity key derivation and check on the NAS message by using the obtained location information of the terminal device. In this way, when the two pieces of location information do not match each other, the terminal device is prevented from accessing a network, thereby improving communication security performance.

Figure 18:
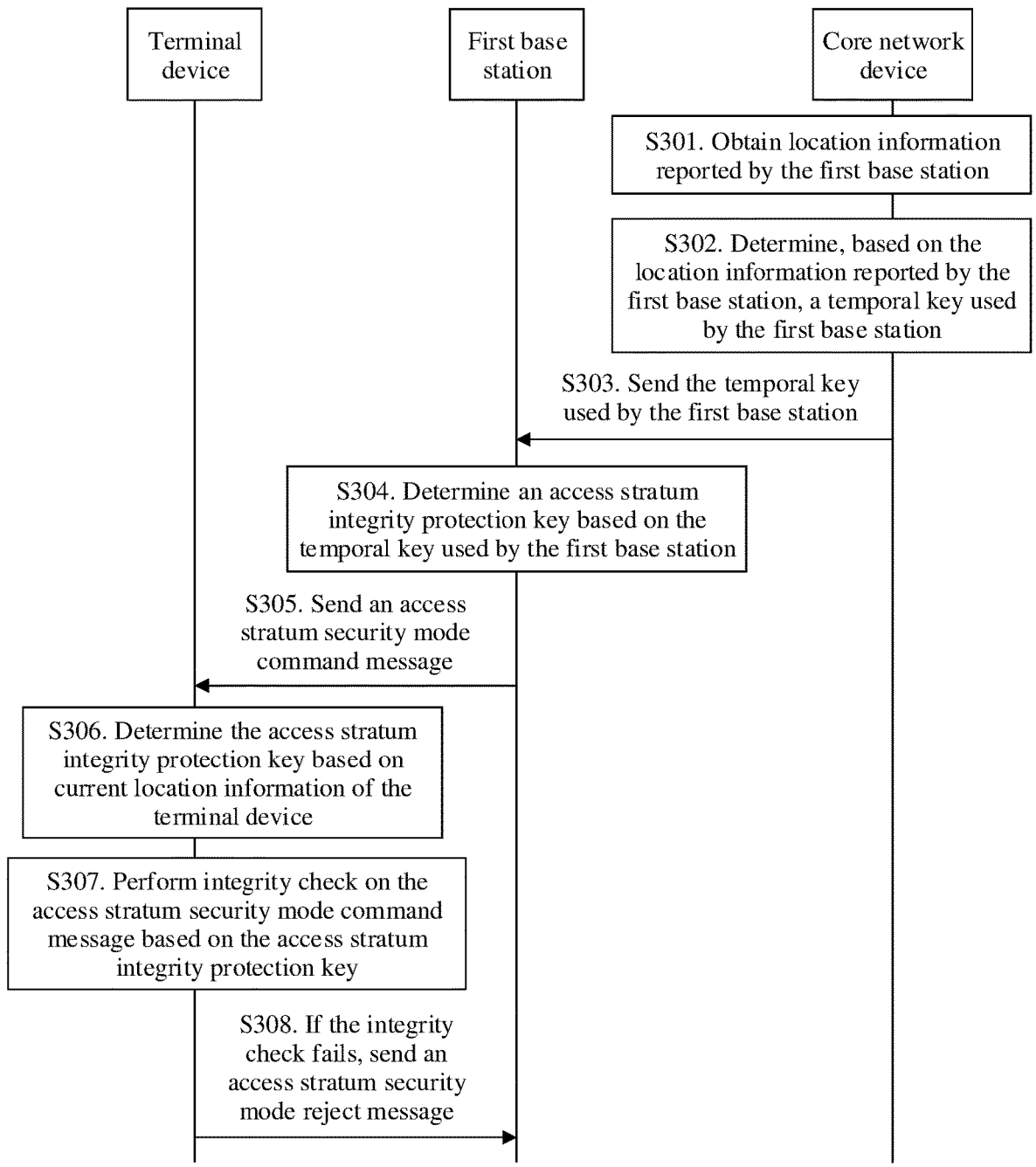
FIG. 18 is a message exchange diagram of a terminal device location determining method according to Embodiment 16.

FIG. 18 is a message exchange diagram of a terminal device location determining method according to Embodiment 16. The terminal device location determining method provided in this embodiment can be applied to a 4G communications network or a 5G communications network. Network elements in this embodiment may include a terminal device, a base station, and a core network device. The terminal device and the core network device may communicate with each other by using the base station (the base station is a first base station herein). As shown in FIG. 18, the terminal device location determining method provided in this embodiment may include the following steps.

In step S301, the core network device obtains location information reported by the first base station.

In step S302, the core network device determines, based on the location information reported by the first base station, a temporal key used by the first base station.

In step S303, the core network device sends the temporal key used by the first base station to the first base station.

Correspondingly, the first base station receives the temporal key that is used by the first base station and that is sent by the core network device.

In step S304, the first base station determines an access stratum integrity protection key based on the temporal key used by the first base station.

In step S305, the first base station sends an access stratum SMC message to the terminal device.

The access stratum SMC message is used to perform integrity protection by using the access stratum integrity protection key.

Correspondingly, the terminal device receives the access stratum SMC message sent by the first base station.

In step S306, the terminal device determines an access stratum integrity protection key based on current location information of the terminal device.

In step S307, the terminal device performs integrity check on the access stratum SMC message based on the access stratum integrity protection key.

It can be learned that in the terminal device location determining method provided in this embodiment, the core network device determines, based on location information reported by the base station, the temporal key used by the first base station, and the first base station determines the access stratum integrity protection key based on the temporal key used by the first base station, and performs integrity protection on the access stratum SMC message by using the access stratum integrity protection key; and the terminal device determines the access stratum integrity protection key based on the current location information of the terminal device, and performs integrity check on the access stratum SMC message based on the access stratum integrity protection key. If the location information reported by the base station does not match the current location information of the terminal device, the integrity protection check cannot succeed. If the location information reported by the base station matches the current location information of the terminal device, the integrity protection check can succeed. Therefore, the location information reported by the base station and the current location information of the terminal device are applied to a key derivation process. In this way, when the two pieces of location information do not match each other, the terminal device is prevented from accessing a network, thereby improving communication security performance.

Optionally, the terminal device location determining method provided in this embodiment may further include the following step.

In step S308, if the integrity check performed by the terminal device on the access stratum SMC message based on the access stratum integrity protection key fails, the terminal device sends an access stratum security mode reject message to the first base station.

Optionally, the core network device may send the location information of the first base station to the terminal device by using a NAS message. Alternatively, after receiving a NAS message sent by the core network device to the terminal device, the first base station packages the location information of the first base station and a NAS PDU together, and sends packaged information to the terminal device. Alternatively, the first base station may send the location information of the first base station to the terminal device by using the access stratum SMC message. When failing in performing the integrity check on the access stratum SMC message, the terminal device may determine, through comparison, whether the location information of the terminal device matches the location information of the first base station, to determine whether a location of the terminal device is incorrect. Alternatively, the terminal device determines, based on the location information of the terminal device, whether a location of the terminal device is incorrect. For details, refer to the description of the embodiment shown in FIG. 3. Details are not described herein again. If the terminal device determines that the location information of the terminal device does not match the location information of the first base station, the access stratum security mode reject message may carry a cause value indicating location inconsistency.

Optionally, the access stratum security mode reject message may carry the cause value and the location information of the terminal device. Subsequently, the first base station may determine, through comparison, whether the location information reported by the first base station matches the location information of the terminal device reported by the terminal device.

Optionally, if the access stratum security mode reject message includes the location information of the terminal device, the first base station may determine, through comparison, whether the location information of the first base station matches the location information of the terminal device reported by the terminal device. If the first base station determines that the location information of the terminal device does not match the location information of the first base station, an attach reject message or a registration reject message may carry the cause value indicating location information inconsistency.

According to the terminal device location determining method provided in this embodiment, the location information reported by the base station and the current location information of the terminal device are applied to an access stratum key derivation process. In this way, when the two pieces of location information do not match each other, the terminal device is prevented from accessing a network, thereby improving communication security performance.

Figure 19A:
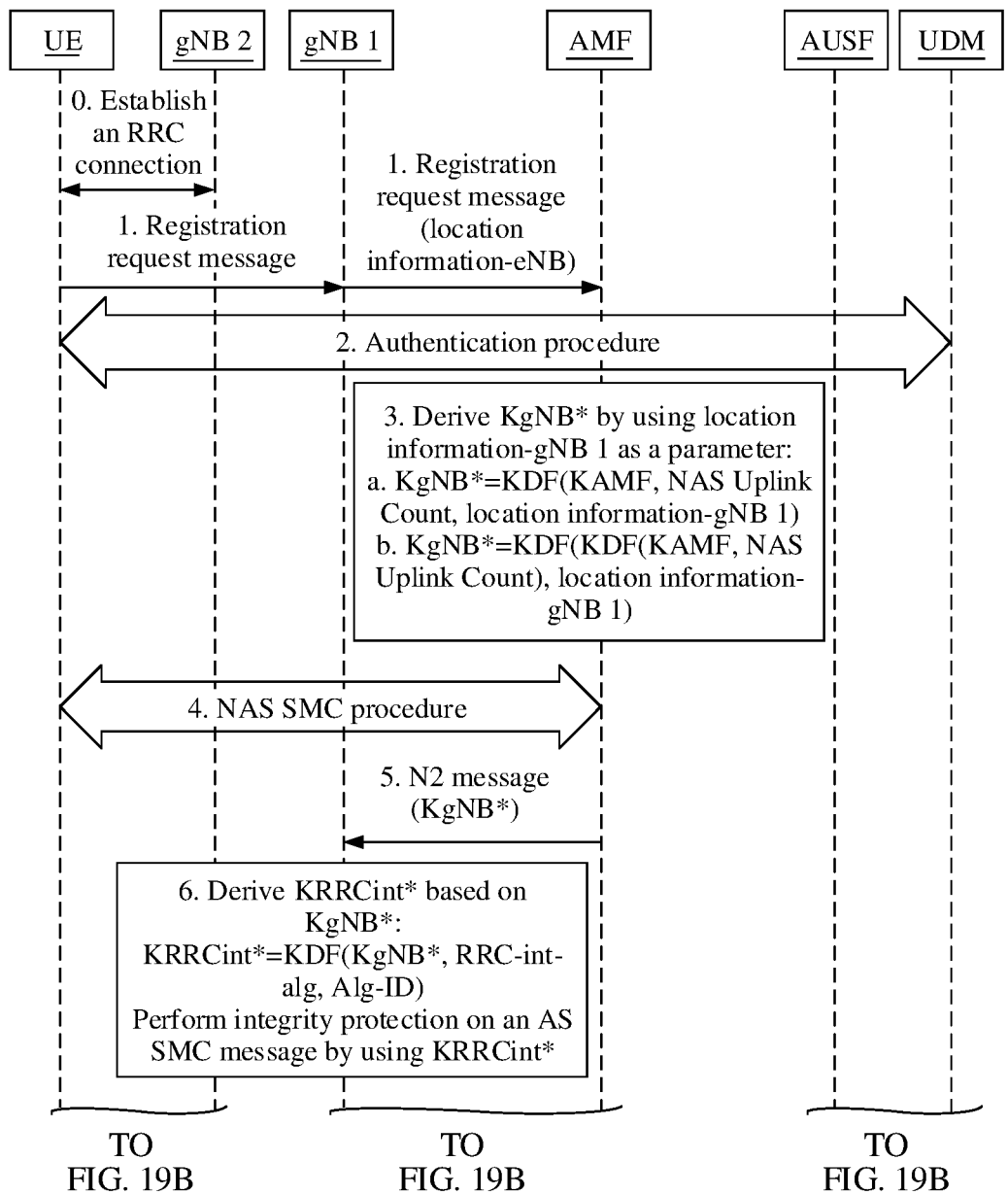
FIG. 19A is a message exchange diagram of a terminal device location determining method according to Embodiment 17.
Figure 19B:
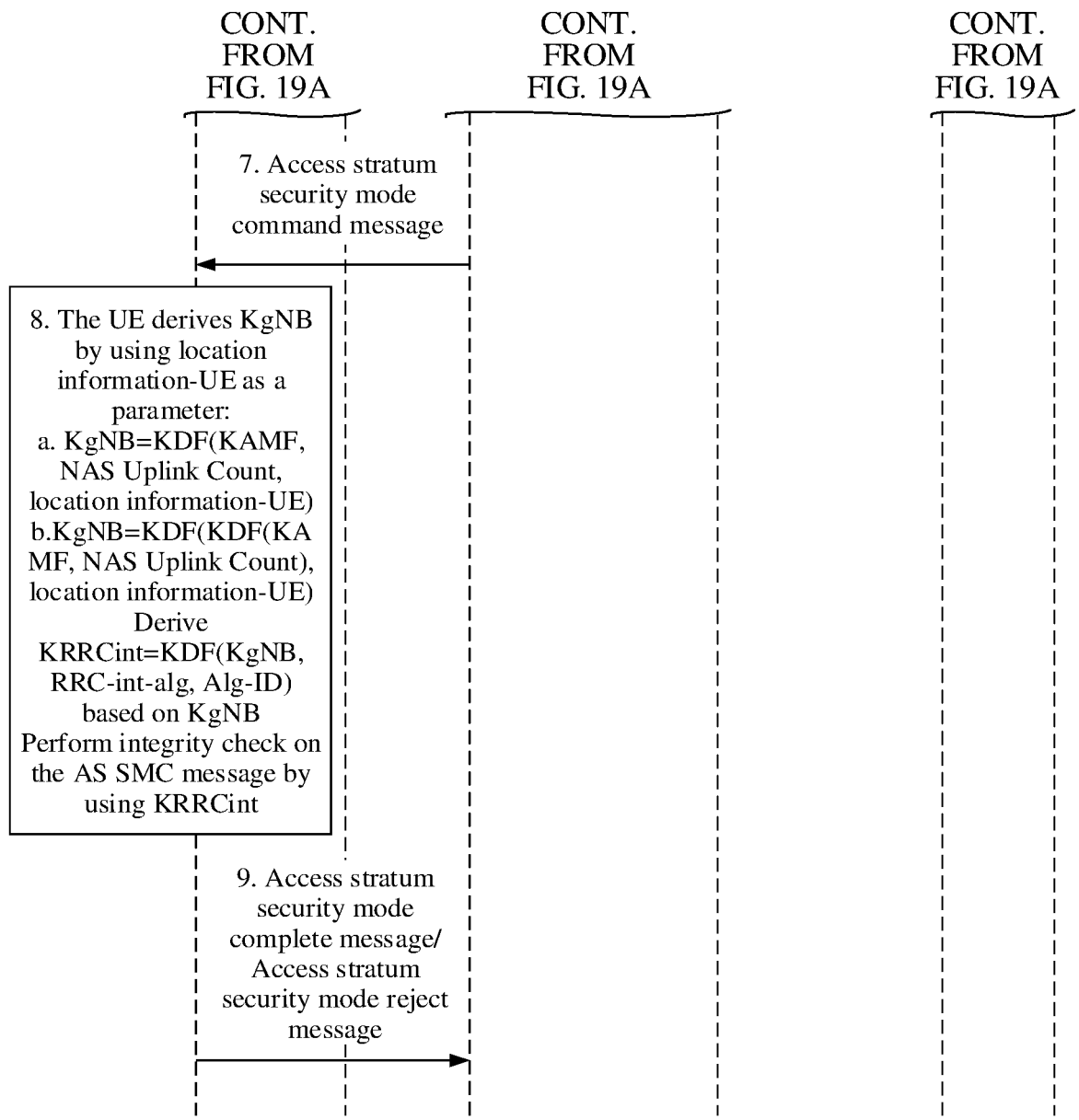
FIG. 19B is a message exchange diagram of a terminal device location determining method according to Embodiment 17.

FIG. 19A and FIG. 19B are a message exchange diagram of a terminal device location determining method according to Embodiment 17. Based on the embodiment shown in FIG. 18, this embodiment provides an exemplary implementation of the terminal device location determining method. The terminal device location determining method provided in this embodiment can be applied to a 5G communications system. Network elements in the 5G communications system may include a UE, gNodeBs (a first gNodeB gNB 1 and a second gNodeB gNB 2), and core network devices (an AMF, an AUSE, and a UDM entity). It should be noted that in some scenarios, the first gNodeB gNB 1 and the second gNodeB gNB 2 may be the same gNodeB. As shown in FIG. 19A and FIG. 19B, the terminal device location determining method provided in this application may include the following steps.

In step 0, the UE establishes an RRC connection to the gNB 2.

After establishing the RRC connection to the gNB 2, the UE may obtain location information of the terminal device (represented by "location information-UE") from the gNB 2. The location information of the terminal device may be location information (for example, a TAI) of the gNB 2.

In step 1, the UE sends a registration request message to the AMF by using the gNB 1.

The registration request message is a NAS message. The registration request message sent by the gNB 1 to the AMF includes location information of the gNB 1 (represented by "location information-gNB 1"). Correspondingly, the AMF obtains, through an N2 interface, the location information reported by the gNB 1.

In step 2, an authentication procedure may be performed.

The authentication procedure is similar to an existing authentication procedure. For the authentication procedure, refer to the existing authentication procedure.

In step 3, the AMF derives KgNB* by using the location information reported by the gNB 1 (location information-gNB 1) as a parameter.

Optionally, KgNB* may be determined in either of the following manners:

a. KgNB*=KDF(KAMF, NAS Uplink Count, location information-gNB 1), and b. KgNB*=KDF(KDF(KAMF, NAS Uplink Count), location information-gNB 1).

KgNB* represents a key that is used by a gNodeB (gNB) and that includes location information, and NAS Uplink Count represents a NAS uplink message counter.

In step 4, a NAS SMC procedure may be performed.

The NAS SMC procedure is similar to an existing NAS SMC procedure. For the NAS SMC procedure, refer to the existing NAS SMC procedure.

In step 5, the AMF sends an N2 message to the gNB 1, where the N2 message includes KgNB*.

In step 6, the gNB initiates an access stratum SMC procedure, and the gNB 1 derives KRRCint* based on KgNB*, and performs integrity protection on an access stratum SMC message by using KRRCint*, where KRRCint*=KDF(KgNB*, RRC-int-alg, Alg-ID).

KRRCint* represents an RRC integrity protection key including location information, and RRC-int-alg represents an RRC integrity protection algorithm.

In step 7, the gNB 1 sends an access stratum SMC message to the UE.

In step 8, the UE derives KgNB by using the obtained location information of the terminal device (location information-UE) as a parameter.

Optionally, KgNB may be determined in either of the following manners:

a. KgNB=KDF(KAMF, NAS Uplink Count, location information-UE), and b. KgNB=KDF(KDF(KAMF, NAS Uplink Count), location information-UE).

The UE derives KRRCint=KDF(KgNB, RRC-int-alg, Alg-ID) based on KgNB, and performs integrity check on the access stratum SMC message by using KRRCint.

KgNB represents a key used by a gNodeB (gNB), and KRRCint represents an RRC integrity protection key.

In step 9, based on a check result in step 8, the UE sends an access stratum security mode complete message or an access stratum security mode reject message to the gNB 1.

In an exemplary embodiment, if the check succeeds in step 8, the UE sends the access stratum Security Mode Complete message to the gNB 1. If the check fails in step 8, the UE sends the access stratum Security Mode Reject message to the gNB 1.

It should be noted that all parameters in this embodiment except KgNB*, KRRCint*, KgNB, and KgNB, and manners of obtaining the parameters are the same as those in the prior art.

Optionally, the core network device may send the location information of the first gNodeB to the UE by using a NAS message. Alternatively, after receiving a NAS message sent by the core network device to the UE, the first gNodeB packages the location information of the first gNodeB and a NAS PDU together, and sends packaged information to the UE. Alternatively, the first gNodeB may send the location information of the first gNodeB to the UE by using the access stratum SMC message. When failing in performing the integrity check on the access stratum SMC message, the UE may determine, through comparison, whether the location information of the UE matches the location information of the first gNodeB, to determine whether a location of the UE is incorrect. Alternatively, the UE determines, based on the location information of the UE, whether a location of the UE is incorrect. For details, refer to the description of the embodiment shown in FIG. 3, and details are not described herein again. If the UE determines that the location information of the UE does not match the location information of the first gNodeB, the access stratum security mode reject message may carry a cause value indicating location inconsistency.

Optionally, the access stratum security mode reject message may carry the cause value and the location information of the terminal device. Subsequently, the first gNodeB may determine, through comparison, whether the location information reported by the first gNodeB matches the location information of the terminal device reported by the terminal device.

Optionally, if the access stratum security mode reject message includes the location information of the terminal device, the first gNodeB may determine, through comparison, whether the location information of the first gNodeB matches the location information of the terminal device reported by the terminal device. If the first gNodeB determines that the location information of the terminal device does not match the location information of the first gNodeB, an attach reject message or a registration reject message may carry the cause value indicating location information inconsistency.

The terminal device location determining method provided in this embodiment can be applied to a 5G communications network, and is, for example, applied to integrity protection on an access stratum message. The AMF can obtain KgNB* by using the location information reported by the base station. The base station can complete access stratum integrity key derivation and integrity protection on the access stratum message based on KgNB*. The terminal device completes access stratum integrity key derivation and integrity check on the access stratum message based on the location information of the terminal device. In this way, when the two pieces of location information do not match each other, the terminal device is prevented from accessing a network, thereby improving communication security performance.

Figure 20A:
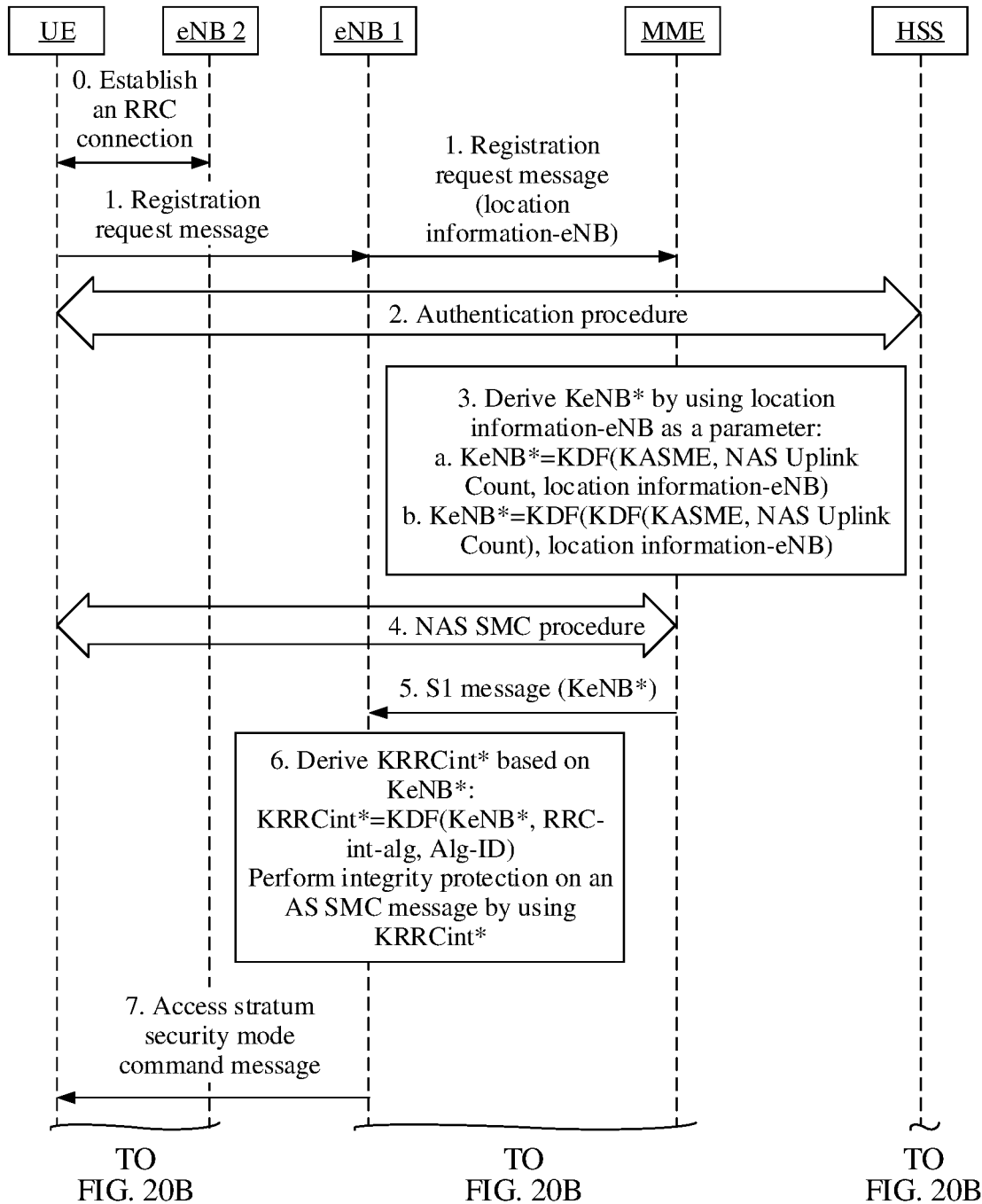
FIG. 20A is a message exchange diagram of a terminal device location determining method according to Embodiment 18.
Figure 20B:
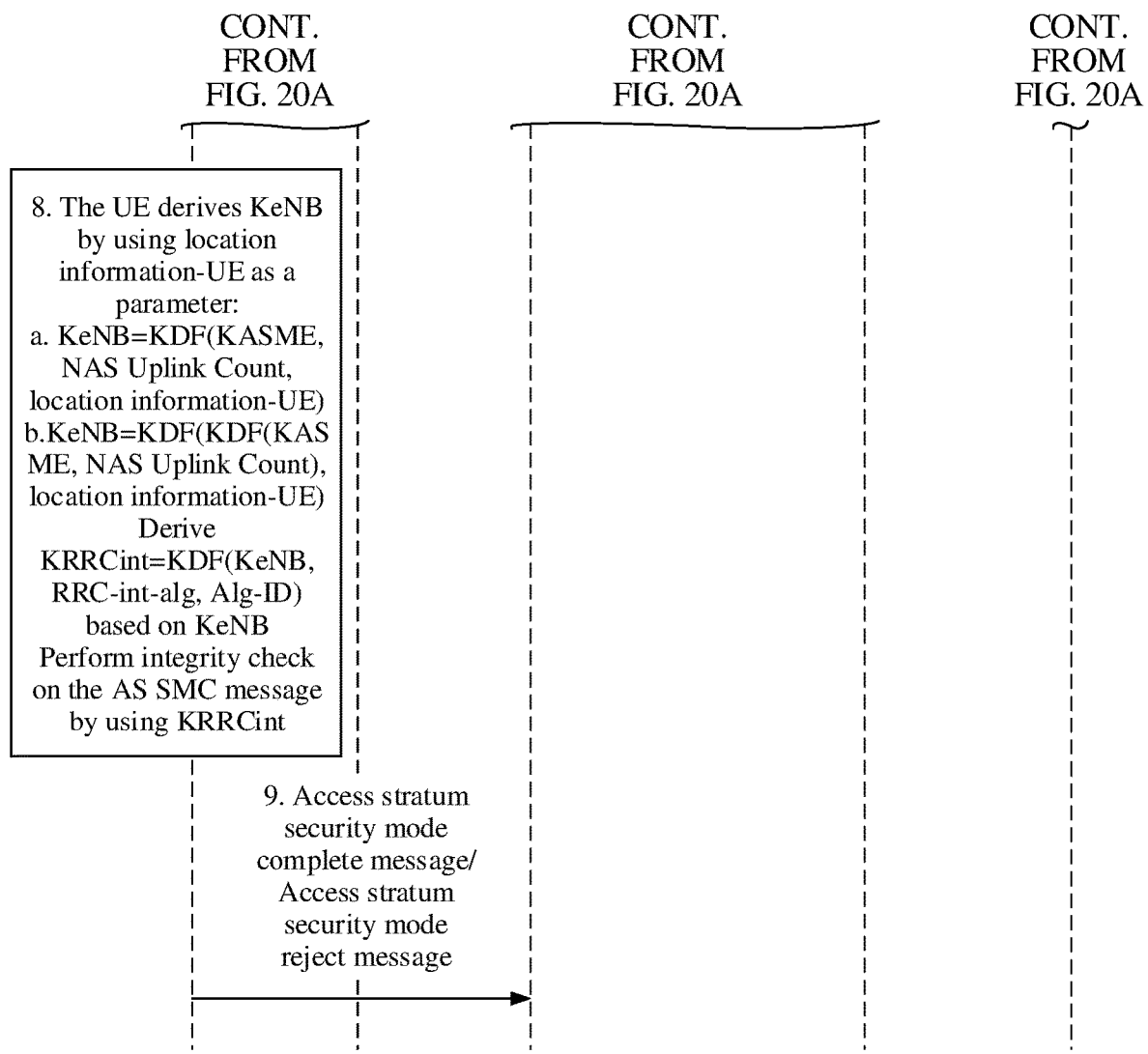
FIG. 20B is a message exchange diagram of a terminal device location determining method according to Embodiment 18.

FIG. 20A and FIG. 20B are a message exchange diagram of a terminal device location determining method according to Embodiment 18. Based on the embodiment shown in FIG. 18, this embodiment provides an exemplary implementation of the terminal device location determining method. The terminal device location determining method provided in this embodiment can be applied to an LTE communications system. Network elements in the LTE communications system may include a UE, eNodeBs (a first eNodeB eNB 1 and a second eNodeB eNB 2), and core network devices (an MME and an HSS). It should be noted that in some scenarios, the first eNodeB eNB 1 and the second eNodeB eNB 2 may be the same eNodeB. As shown in FIG. 20A and FIG. 20B, the terminal device location determining method provided in this application may include the following steps.

In step 0, the UE establishes an RRC connection to the eNB 2.

After establishing the RRC connection to the eNB 2, the UE may obtain location information of the terminal device (represented by "location information-UE") from the eNB 2. The location information of the terminal device may be location information (for example, a TAI) of the eNB 2.

In step 1, the UE sends a registration request message to the MME by using the eNB 1.

The registration request message is a NAS message. The registration request message sent by the eNB 1 to the MME includes location information of the eNB 1 (represented by "location information-eNB 1").

In step 2, an authentication procedure may be performed.

The authentication procedure is similar to an existing authentication procedure. For the authentication procedure, refer to the existing authentication procedure.

In step 3, the MME derives KeNB* by using the location information reported by the eNB 1 (location information-eNB 1) as a parameter.

Optionally, KeNB* may be determined in either of the following manners:

a. KeNB*=KDF (KASME, NAS Uplink Count, location information-eNB 1), and b. KeNB*=KDF(KDF(KASME, NAS Uplink Count), location information-eNB 1).

KeNB* represents a key of an evolved NodeB including location information, and NAS Uplink Count represents a NAS uplink message counter.

In step 4, a NAS SMC procedure may be performed.

The NAS SMC procedure is similar to an existing NAS SMC procedure. For the NAS SMC procedure, refer to the existing NAS SMC procedure.

In step 5, the MME sends an S1 message to the eNB 1, where the S1 message includes KeNB*.

In step 6, the eNB 1 derives KRRCint* based on KeNB*, and performs integrity protection on an access stratum SMC message by using KRRCint*, where KRRCint*=KDF(KeNB*, RRC-int-alg, Alg-ID)

In step 7, the eNB 1 sends an access stratum SMC message to the UE.

In step 8, the UE derives KeNB by using the obtained location information of the terminal device (location information-UE) as a parameter.

Optionally, KeNB may be determined in either of the following manners:

a. KeNB=KDF(KASME, NAS Uplink Count, location information-UE), and b. KeNB=KDF(KDF(KASME, NAS Uplink Count), location information-UE).

KRRCint=KDF(KeNB, RRC-int-alg, Alg-ID) is derived based on KeNB, and integrity check is performed on the access stratum SMC message by using KRRCint.

In step 9, based on a check result in step 8, the UE sends an access stratum security mode complete message or an access stratum security mode reject message to the eNB 1.

In an exemplary embodiment, if the check succeeds in step 8, the UE sends a NAS Security Mode Complete message to the eNB 1. If the check fails in step 8, the UE sends a NAS Security Mode Reject message to the eNB 1.

It should be noted that all parameters in this embodiment except KeNB*, KRRCint*, KeNB, and KRRCint, and manners of obtaining the parameters are the same as those in the prior art.

Optionally, the core network device may send the location information of the first eNodeB to the UE by using a NAS message. Alternatively, after receiving a NAS message sent by the core network device to the UE, the first eNodeB packages the location information of the first eNodeB and a NAS PDU together, and sends packaged information to the UE. Alternatively, the first eNodeB may send the location information of the first eNodeB to the UE by using the access stratum SMC message. When failing in performing integrity check on the access stratum SMC message, the UE may determine, through comparison, whether the location information of the UE matches the location information of the first eNodeB, to determine whether a location of the UE is incorrect. Alternatively, the UE determines, based on the location information of the UE, whether a location of the UE is incorrect. For details, refer to the description of the embodiment shown in FIG. 3, and details are not described herein again. If the UE determines that the location information of the UE does not match the location information of the first eNodeB, the access stratum security mode reject message may carry a cause value indicating location inconsistency.

Optionally, the access stratum security mode reject message may carry the cause value and the location information of the terminal device. Subsequently, the first eNodeB may determine, through comparison, whether the location information reported by the first eNodeB matches the location information of the terminal device reported by the terminal device.

Optionally, if the access stratum security mode reject message includes the location information of the terminal device, the first eNodeB may determine, through comparison, whether the location information of the first eNodeB matches the location information of the terminal device reported by the terminal device. If the first eNodeB determines that the location information of the terminal device does not match the location information of the first eNodeB, an attach reject message or a registration reject message may carry the cause value indicating location information inconsistency.

The terminal device location determining method provided in this embodiment can be applied to an LTE communications network. The MME can obtain KeNB* based on the location information reported by the base station, and the base station can complete access stratum integrity key derivation and integrity protection on the access stratum message based on KeNB*. The terminal device can complete access stratum integrity key derivation and check on the access stratum message by using the obtained location information of the terminal device. In this way, when the two pieces of location information do not match each other, the terminal device is prevented from accessing a network, thereby improving communication security performance.

Figure 21:
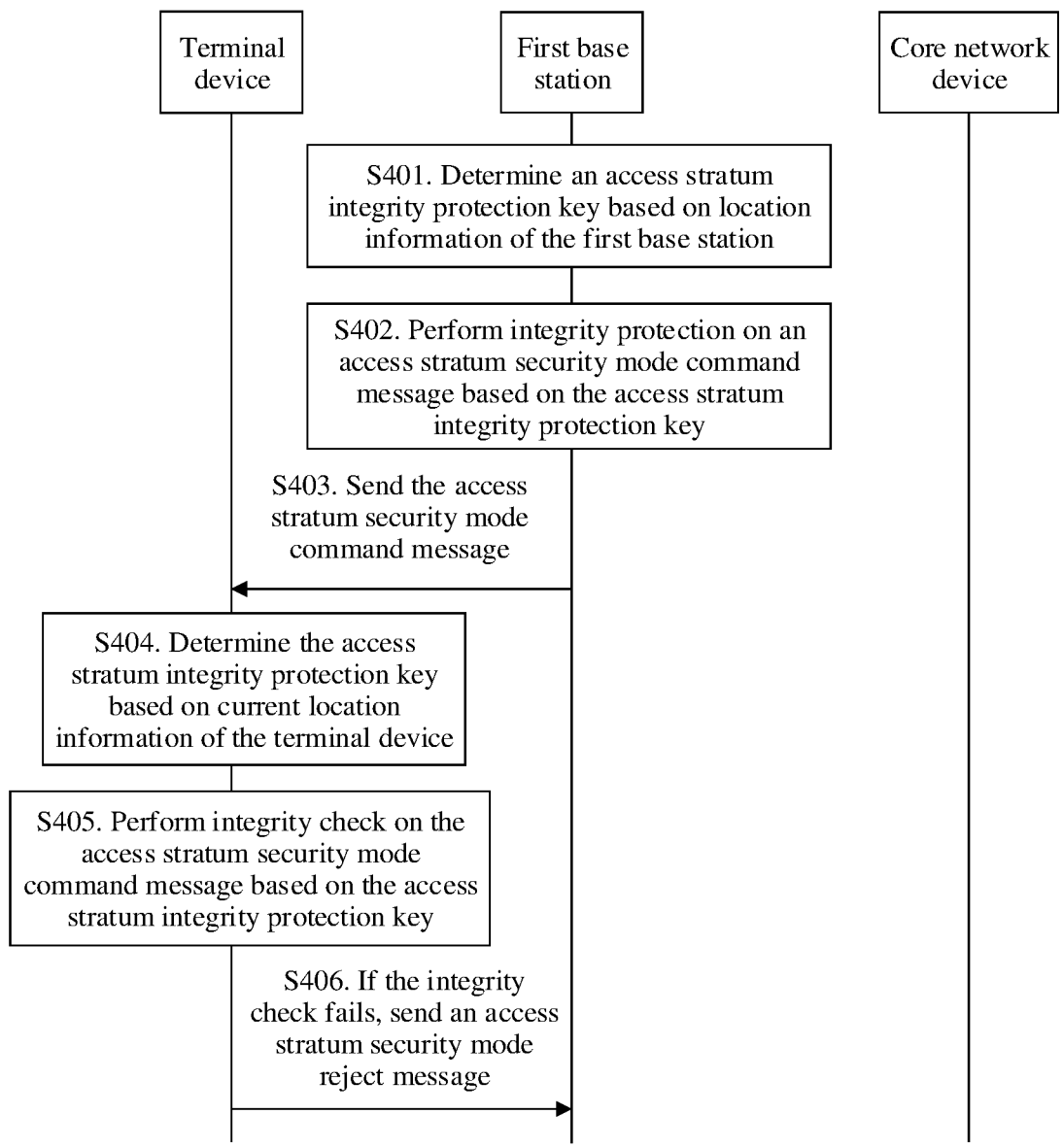
FIG. 21 is a message exchange diagram of a terminal device location determining method according to Embodiment 19.

FIG. 21 is a message exchange diagram of a terminal device location determining method according to Embodiment 19. The terminal device location determining method provided in this embodiment can be applied to a 4G communications network or a 5G communications network. Network elements in this embodiment may include a terminal device, a base station, and a core network device. The terminal device and the core network device may communicate with each other by using the base station (the base station is a first base station herein). As shown in FIG. 21, the terminal device location determining method provided in this embodiment may include the following steps.

In step S401, the base station determines an access stratum integrity protection key based on location information of the first base station.

In step S402, the base station performs integrity protection on an access stratum SMC message based on the access stratum integrity protection key.

In step S403, the base station sends the access stratum SMC message to the terminal device.

Correspondingly, the terminal device receives the access stratum SMC message sent by the base station.

In step S404, the terminal device determines an access stratum integrity protection key based on current location information of the terminal device.

In step S405, the terminal device performs integrity check on the access stratum SMC message based on the access stratum integrity protection key.

It can be learned that in the terminal device location determining method provided in this embodiment, the base station determines the access stratum integrity protection key based on the location information, and performs integrity protection on the access stratum SMC message by using the access stratum integrity protection key. The terminal device determines the access stratum integrity protection key based on the current location information of the terminal device, and performs integrity check on the access stratum SMC message based on the access stratum integrity protection key. If the location information of the base station does not match the current location information of the terminal device, the integrity protection check cannot succeed. If the location information of the base station matches the current location information of the terminal device, the integrity protection check can succeed. Therefore, the location information reported by the base station and the current location information of the terminal device are applied to a key derivation process. In this way, when the two pieces of location information do not match each other, the terminal device is prevented from accessing a network, thereby improving communication security performance.

Optionally, the terminal device location determining method provided in this embodiment may further include the following step.

In step S406, if the integrity check performed by the terminal device on the access stratum SMC message based on the access stratum integrity protection key fails, the terminal device sends an access stratum security mode reject message to the first base station.

Optionally, the core network device may send the location information of the first base station to the terminal device by using a NAS message. Alternatively, after receiving a NAS message sent by the core network device to the terminal device, the first base station packages the location information of the first base station and a NAS PDU together, and sends packaged information to the terminal device. Alternatively, the first base station may send the location information of the first base station to the terminal device by using the access stratum SMC message. When failing in performing the integrity check on the access stratum SMC message, the terminal device may determine, through comparison, whether the location information of the terminal device matches the location information of the first base station, to determine whether a location of the terminal device is incorrect. Alternatively, the terminal device determines, based on the location information of the terminal device, whether a location of the terminal device is incorrect. For details, refer to the description of the embodiment shown in FIG. 3. Details are not described herein again. If the terminal device determines that the location information of the terminal device does not match the location information of the first base station, the access stratum security mode reject message may carry a cause value indicating location inconsistency.

Optionally, the access stratum security mode reject message may carry the cause value and the location information of the terminal device. Subsequently, the first base station may determine, through comparison, whether the location information reported by the first base station matches the location information of the terminal device reported by the terminal device.

Optionally, if the access stratum security mode reject message includes the location information of the terminal device, the first base station may determine, through comparison, whether the location information of the first base station matches the location information of the terminal device reported by the terminal device. If the first base station determines that the location information of the terminal device does not match the location information of the first base station, an attach reject message or a registration reject message may carry the cause value indicating location information inconsistency.

According to the terminal device location determining method provided in this embodiment, the location information of the base station and the current location information of the terminal device are applied to an access stratum key derivation process. In this way, when the two pieces of location information do not match each other, the terminal device is prevented from accessing a network, thereby improving communication security performance.

Figure 22:
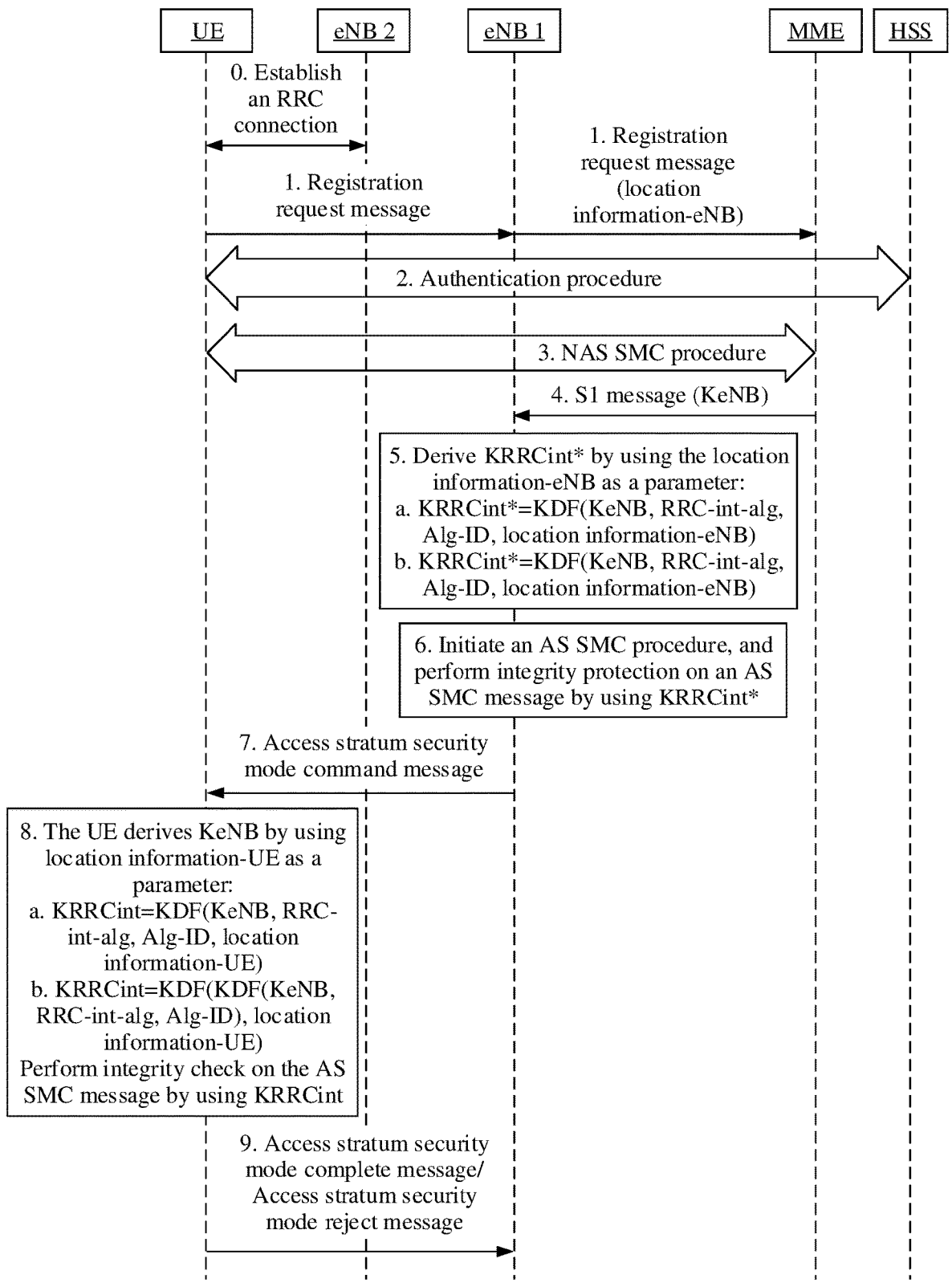
FIG. 22 is a message exchange diagram of a terminal device location determining method according to Embodiment 20.

FIG. 22 is a message exchange diagram of a terminal device location determining method according to Embodiment 20. Based on the embodiment shown in FIG. 21, this embodiment provides an exemplary implementation of the terminal device location determining method. The terminal device location determining method provided in this embodiment can be applied to an LTE communications system. Network elements in the LTE communications system may include a UE, eNodeBs (a first eNodeB eNB 1 and a second eNodeB eNB 2), and core network devices (an MME and an HSS). It should be noted that in some scenarios, the first eNodeB eNB 1 and the second eNodeB eNB 2 may be the same eNodeB. As shown in FIG. 22, the terminal device location determining method provided in this application may include the following steps.

In step 0, the UE establishes an RRC connection to the eNB 2.

After establishing the RRC connection to the eNB 2, the UE may obtain location information of the terminal device (represented by "location information-UE") from the eNB 2. The location information of the terminal device may be location information (for example, a TAI) of the eNB 2.

In step 1, the UE sends a registration request message to the MME by using the eNB 1.

In step 2, an authentication procedure may be performed.

The authentication procedure is similar to an existing authentication procedure. For the authentication procedure, refer to the existing authentication procedure.

In step 3, a NAS SMC procedure may be performed.

The NAS SMC procedure is similar to an existing NAS SMC procedure. For the NAS SMC procedure, refer to the existing NAS SMC procedure.

In step 4, the MME sends an S1 message to the eNB 1, where the S1 message includes KeNB.

In step 5, the eNB 1 derives KRRCint* by using location information-eNB 1 as a parameter.

Optionally, KRRCint* may be determined in either of the following manners:

a. KRRCint*=KDF(KeNB, RRC-int-alg, Alg-ID, location information-eNB 1), and b. KRRCint*=KDF(KDF(KeNB, RRC-int-alg, Alg-ID), location information-eNB 1).

In step 6, the eNB 1 initiates an access stratum SMC procedure, and performs integrity protection on an access stratum SMC message by using KRRCint*.

In step 7, the eNB 1 sends an access stratum SMC SMC) message to the UE.

In step 8, the UE derives KRRCint by using the obtained location information of the terminal device (location information-UE) as a parameter.

Optionally, KRRCint may be determined in either of the following manners:

a. KRRCint=KDF(KeNB, RRC-int-alg, Alg-ID, location information-UE), and b. KRRCint=KDF(KDF(KeNB, RRC-int-alg, Alg-ID), location information-UE).

Integrity check is performed on the access stratum SMC message by using KRRCint.

In step 9, based on a check result in step 8, the UE sends an access stratum security mode complete message or an access stratum security mode reject message to the eNB 1.

In an exemplary embodiment, if the check succeeds in step 8, the UE sends a NAS Security Mode Complete message to the eNB 1. If the check fails in step 8, the UE sends a NAS Security Mode Reject message to the eNB 1.

It should be noted that parameters in this embodiment except KRRCint* and KRRCint and manners of obtaining the parameters are the same as those in the prior art.

Optionally, the core network device may send the location information of the first eNodeB to the UE by using a NAS message. Alternatively, after receiving a NAS message sent by the core network device to the UE, the first eNodeB packages the location information of the first eNodeB and a NAS PDU together, and sends packaged information to the UE. Alternatively, the first eNodeB may send the location information of the first eNodeB to the UE by using the access stratum SMC message. When failing in performing the integrity check on the access stratum SMC message, the UE may determine, through comparison, whether the location information of the UE matches the location information of the first eNodeB, to determine whether a location of the UE is incorrect. Alternatively, the UE determines, based on the location information of the UE, whether a location of the UE is incorrect. For details, refer to the description of the embodiment shown in FIG. 3, and details are not described herein again. If the UE determines that the location information of the UE does not match the location information of the first eNodeB, the access stratum security mode reject message may carry a cause value indicating location inconsistency.

Optionally, the access stratum security mode reject message may carry the cause value and the location information of the terminal device. Subsequently, the first eNodeB may determine, through comparison, whether the location information reported by the first eNodeB matches the location information of the terminal device reported by the terminal device.

Optionally, if the access stratum security mode reject message includes the location information of the terminal device, the first eNodeB may determine, through comparison, whether the location information of the first eNodeB matches the location information of the terminal device reported by the terminal device. If the first eNodeB determines that the location information of the terminal device does not match the location information of the first eNodeB, an attach reject message or a registration reject message may carry the cause value indicating location information inconsistency.

The terminal device location determining method provided in this embodiment can be applied to an LTE communications network. The base station can complete access stratum integrity key derivation and integrity protection on the access stratum message based on the location information of the base station. The terminal device can complete access stratum integrity key derivation and check on the access stratum message by using the obtained location information of the terminal device. In this way, when the two pieces of location information do not match each other, the terminal device is prevented from accessing a network, thereby improving communication security performance.

FIG. 23 is a message exchange diagram of a terminal device location determining method according to Embodiment 21. Network elements in this embodiment may include a UE, a core network device (MME/AMF), and a base station (eNB/gNB). The terminal device and the mobility management device communicate with each other by using the base station (the base station is a first base station herein). As shown in FIG. 23, the terminal device location determining method provided in this embodiment may include the following steps.

In step 0, the terminal device successfully attaches to a network.

In step 1, the core network device sends a positioning request message to the terminal device.

Correspondingly, the terminal device receives the positioning request message sent by the core network device.

Optionally, the MME/AMF may send a positioning request message (DL Positioning Message) to the UE according to a preset policy by using the eNB/gNB.

The preset policy is not limited in this embodiment, and may be set depending on a requirement.

Optionally, the preset policy may include any one of the following:

TAIs of a plurality of base stations (gNB/eNB) reported by the UE are inconsistent and there is a relatively large location difference;

a TAI location changes greatly within a preset time period; and a request for listening on the terminal device is received from a monitoring center.

In step 2, the terminal device sends a positioning response message to the core network device.

The positioning response message includes current location information of the terminal device.

Correspondingly, the core network device receives the positioning response message sent by the terminal device.

In an exemplary embodiment, the UE performs location measurement based on the positioning request message, to obtain the current location information of the terminal device.

Optionally, the current location information of the terminal device may include at least one of the following:

second location information broadcast by a second base station;

auxiliary location information, where the auxiliary location information indicates a region in which the terminal device is located; and third location information broadcast by a third base station, where the third base station is a base station adjacent to the second base station.

Optionally, the current location information of the terminal device may further include precise location information, where the precise location information is determined by the terminal device based on a signal measurement value between the terminal device and the second base station. The signal measurement value may be signal strength or a signal transmission delay.

In step 3, the core network device determines whether location information reported by the first base station matches the location information reported by the terminal device.

Optionally, if the location information reported by the first base station does not match the location information reported by the terminal device, the core network device sends a deregistration message or a detach message to the terminal device.

The deregistration message or the detach message may include a cause value indicating location inconsistency.

Optionally, if the terminal device receives the deregistration message or the detach message sent by the core network device, the terminal device performs processing based on the cause value in the deregistration message or the detach message.

Optionally, if the location information reported by the first base station does not match the location information reported by the terminal device, the core network device may send an alarm message to an OM device. The alarm message indicates that the two pieces of location information of the UE match each other.

It should be noted that the MME/AMF compares the location information reported by the UE with the location information sent by the eNB/gNB. For details, refer to the embodiment shown in FIG. 3. Principles thereof are similar, and details are not described herein again.

According to the terminal device location determining method provided in this embodiment, the core network device may send the positioning request information to the terminal device; the terminal device reports the location information of the terminal device to the core network device; and the core network device determines, through comparison, whether the location information reported by the terminal device matches the location information reported by the base station, to determine whether a location of the terminal device is incorrectly determined. In this way, accuracy of determining the location of the terminal device and communication security performance are improved.

FIG. 24 is a message exchange diagram of a terminal device location determining method according to Embodiment 22. Network elements in this embodiment may include a UE, a base station (eNB/gNB), a mobility management device (MME/AMF), and a location management device (E-SMLC/LMF). The terminal device and the mobility management device communicate with each other by using the base station (the base station is a first base station herein). As shown in FIG. 24, the terminal device location determining method provided in this embodiment may include the following steps.

In step 0, the UE successfully attaches to a network.

In step 1, the MME/AMF sends a positioning request message to the UE and/or the eNB/gNB according to a preset policy.

Optionally, the MME/AMF may send a positioning request message (NAS Transport) to the UE according to the preset policy by using the eNB/gNB.

Optionally, the MME/AMF may send a positioning request message (DL Positioning Message) to the eNB/gNB through an S1/N2 interface according to the preset policy.

The preset policy is not limited in this embodiment, and may be set depending on a requirement.

Optionally, the preset policy may include any one of the following: TAIs of a plurality of base stations (gNB/eNB) reported by the UE are inconsistent and there is a relatively large location difference;

a TAI location changes greatly within a preset time period; and a request for listening on the terminal device is received from a monitoring center.

In step 2, the eNB/gNB sends the positioning request message (DL Positioning Message) to the UE.

In step 3, the UE performs location measurement based on the positioning request message, to obtain location information of the terminal device.

Optionally, the performing, by the UE, location measurement based on the positioning request message, to obtain location information of the terminal device may include:

receiving, by the UE, a broadcast message sent by a second base station, to obtain second location information of the second base station carried in the broadcast message, where the second base station is abase station accessed by the terminal device, and the terminal device is located within a coverage area of the second base station;

obtaining, by the UE, auxiliary location information; or receiving, by the UE, a broadcast message sent by a third base station, to learn that third location information of the third base station carried in the broadcast message is the location information of the UE; or performing, by the UE, signal measurement on a third base station to obtain third location information of the third base station.

In step 4, the UE sends a positioning response message (UL Positioning Message) to the eNB/gNB, where the positioning response message includes the location information of the terminal device.

In step 5, the eNB/gNB sends a positioning response message (UL Positioning Message/NAS Transport) to the MME/AMF, where the positioning response message includes location information of the terminal device.

In step 6, the MME/AMF sends a request message to the E-SMLC/LMF, where the request message may include the location information of the terminal device reported by the UE and the location information reported by the eNB/gNB.

In step 7, the E-SMLC/LMF compares the location information of the terminal device reported by the UE with the location information sent by the eNB/gNB, to obtain a comparison result.

The E-SMLC/LMF compares the location information of the terminal device reported by the UE with the location information sent by the eNB/gNB. For details, refer to the embodiments shown in FIG. 3 to FIG. 7. Principles thereof are similar, and details are not described herein again.

In step 8, the E-SMLC/LMF sends a response message to the MME/AMF, where the response message may include the comparison result; and subsequently the MME/AMF may determine subsequent processing according to the preset policy.

A main difference between this embodiment and the embodiment shown in FIG. 23 lies in that execution bodies for comparing the location information reported by the UE with the location information sent by the eNB/gNB are different. In the embodiment shown in FIG. 23, an execution body is the mobility management device. In this embodiment, an execution body is the location management device. Principles of other solutions are similar. For details, refer to the embodiment shown in FIG. 23, and details are not described herein again.

According to the terminal device location determining method provided in this embodiment, the mobility management device may send a location query request to the terminal device and the base station according to the preset policy, and the location management device may determine, through comparison, whether the location information of the terminal device reported by the terminal device matches the location information reported by the base station, to determine whether a location of the terminal device is incorrectly determined. In this way, accuracy of determining the location of the terminal device and communication security performance are improved.

The following describes a terminal device, a base station, and a core network device that are provided in the embodiments. The devices are in a one-to-one correspondence with the foregoing methods, are configured to implement the terminal device location determining methods provided in the foregoing method embodiments, and have the same technical feature and same technical effects. Details are not described in the embodiments.

Figure 25:
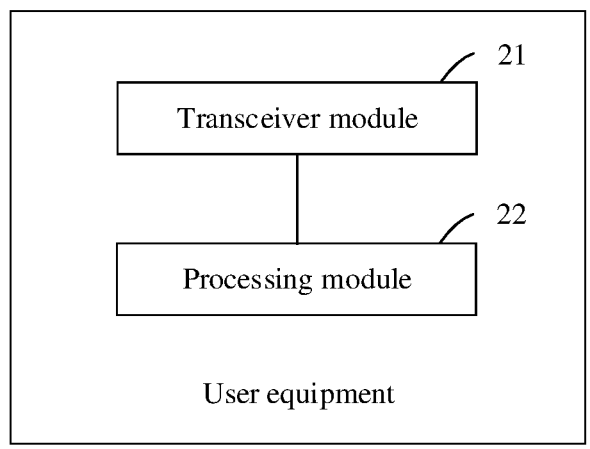
FIG. 25 is a schematic diagram of a structure of a terminal device according to an embodiment.

FIG. 25 is a schematic diagram of a structure of a terminal device according to an embodiment. As shown in FIG. 25, the terminal device may include a transceiver module 21 and a processing module 22. The processing module 22 is configured to control, manage, and perform an action of the terminal device. The transceiver module 21 is configured to support communication between the terminal device and another device. The terminal device may further include a storage module, configured to store program code and data of the terminal device.

Figure 26:
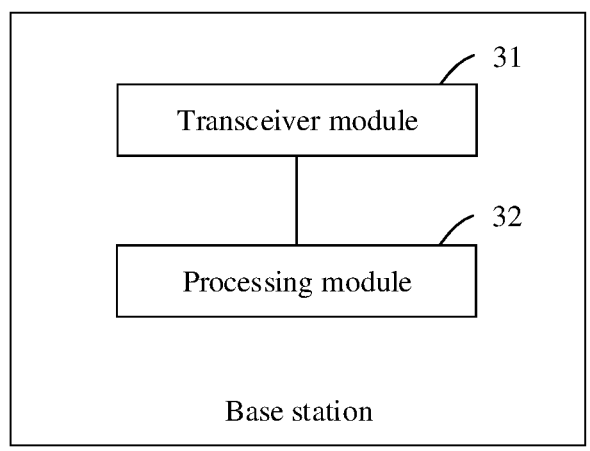
FIG. 26 is a schematic diagram of a structure of a base station according to an embodiment.

FIG. 26 is a schematic diagram of a structure of a base station according to an embodiment. As shown in FIG. 26, the base station may include a transceiver module 31 and a processing module 32. The processing module 32 is configured to control, manage, and perform an action of the base station. The transceiver module 31 is configured to support communication between the base station and another device. The base station may further include a storage module, configured to store program code and data of a terminal device.

Figure 27:
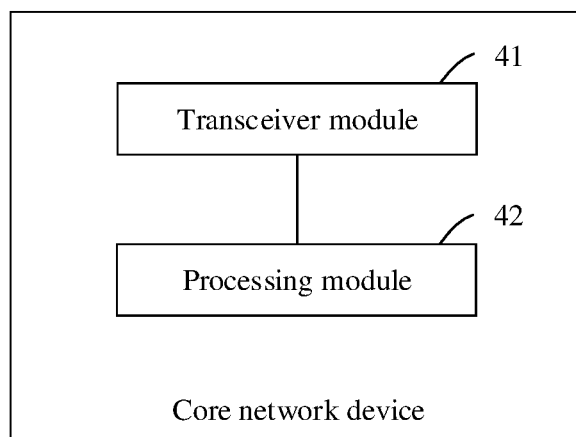
FIG. 27 is a schematic diagram of a structure of a core network device according to an embodiment.

FIG. 27 is a schematic diagram of a structure of a core network device according to an embodiment. As shown in FIG. 27, the core network device may include a transceiver module 41 and a processing module 42. The processing module 42 is configured to control, manage, and perform an action of the core network device. The transceiver module 41 is configured to support communication between the core network device and another device. The core network device may further include a storage module, configured to store program code and data of a terminal device.

The core network device may include any one of the following: an MME, an HSS, an E-SMLC, an AMF, an AUSF, a UDM entity, and an LMF.

The following describes another terminal device, another base station, and another core network device that are provided in the embodiments. The devices are in a one-to-one correspondence with the foregoing methods, are configured to implement the terminal device location determining methods provided in the foregoing method embodiments, and have the same technical feature and same technical effects. Details are not described in the embodiments.

Figure 28:
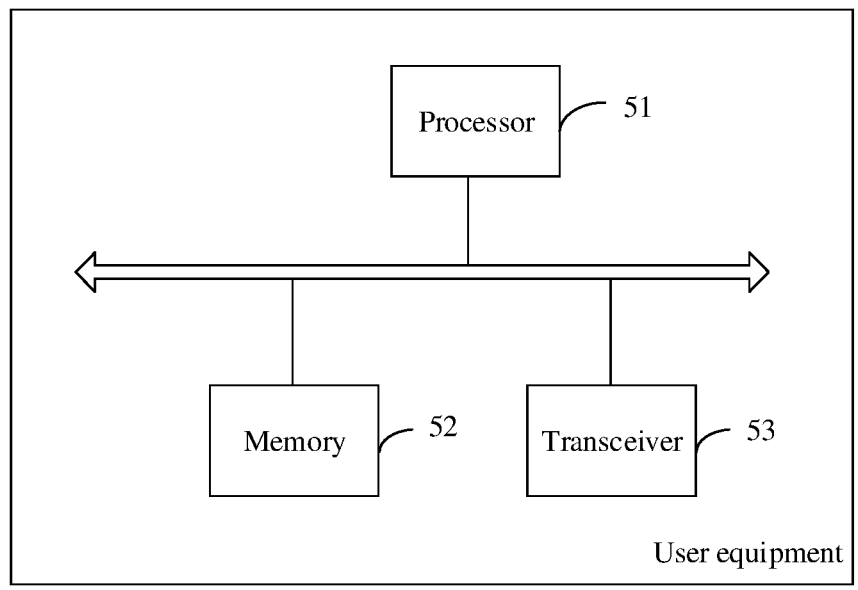
FIG. 28 is another schematic diagram of a structure of a terminal device according to an embodiment.

FIG. 28 is another schematic diagram of a structure of a terminal device according to an embodiment. As shown in FIG. 28, the terminal device may include a processor 51, a memory 52, and a transceiver 53. The transceiver 53 is configured to communicate with another device, and the processor 51 is configured to execute an instruction stored in the memory 52, so that the terminal device performs an operation performed by the terminal device in the foregoing method embodiments.

Figure 29:
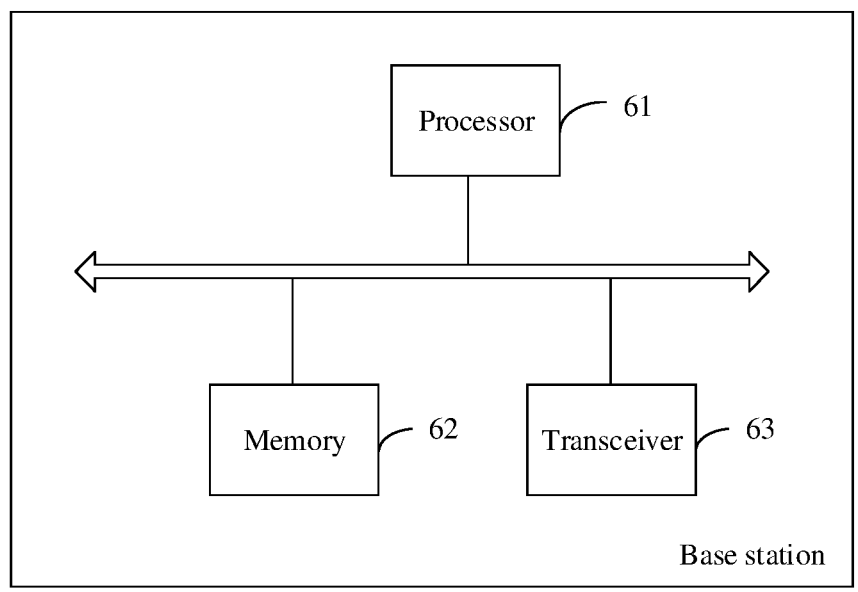
FIG. 29 is another schematic diagram of a structure of a base station according to an embodiment.

FIG. 29 is another schematic diagram of a structure of a base station according to an embodiment. As shown in FIG. 29, the base station may include a processor 61, a memory 62, and a transceiver 63. The transceiver 63 is configured to communicate with another device, and the processor 61 is configured to execute an instruction stored in the memory 62, so that the base station performs an operation performed by the base station in the foregoing method embodiments.

Figure 30:
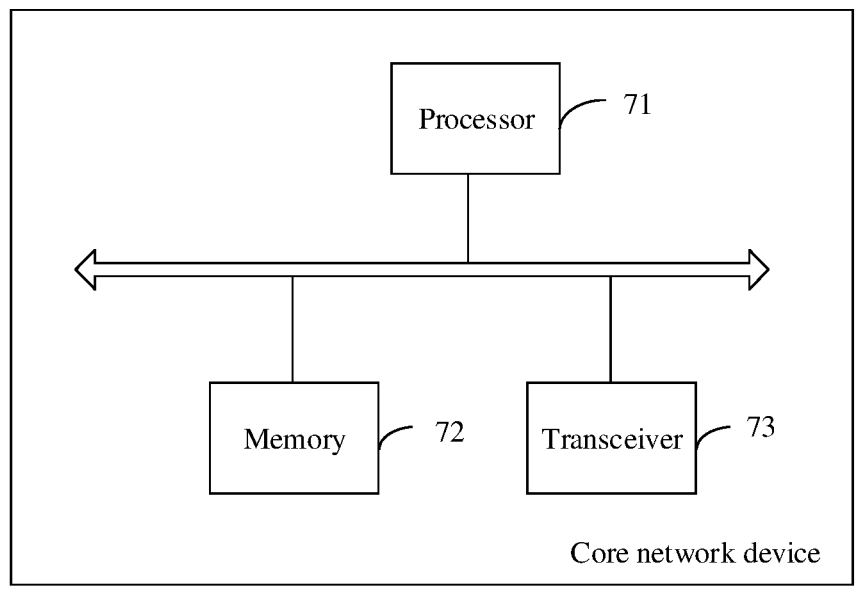
FIG. 30 is another schematic diagram of a structure of a core network device according to an embodiment.

FIG. 30 is another schematic diagram of a structure of a core network device according to an embodiment. As shown in FIG. 30, the core network device may include a processor 71, a memory 72, and a transceiver 73. The transceiver 73 is configured to communicate with another device, and the processor 71 is configured to execute an instruction stored in the memory 72, so that the core network device performs an operation performed by the core network device in the foregoing method embodiments.

The core network device may include any one of the following: an MME, an HSS, an E-SMLC, an AMF, an AUSF, a UDM entity, and an LMF.

It can be understood that the processor in the embodiments may be a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

What is claimed is:

1. A terminal device location determining method, comprising:
    obtaining, by a core network device, location information of a terminal device reported by the terminal device and location information reported by a first base station;
    determining, by the core network device, whether the location information of the terminal device matches the location information reported by the first base station; and
    if the location information of the terminal device does not match the location information reported by the first base station, sending, by the core network device, a reject message to the terminal device,
    wherein the location information of the terminal device further comprises:
        location information broadcast by a second base station, wherein the second base station is a base station accessed by the terminal device;
        auxiliary location information, wherein the auxiliary location information is information provided by an auxiliary positioning device, and the auxiliary location information is used to indicate a location of the terminal device; and
        location information broadcast by a third base station, wherein the third base station is a base station whose distance to the second base station is shorter than a preset distance.

2. The method according to claim 1, wherein the core network device is a mobility management device, and the obtaining, by the core network device, location information of the terminal device reported by the terminal device further comprises:
    obtaining, by the mobility management device by using a non-access stratum initial attach request message, a non-access stratum registration request message, or a non-access stratum security mode command complete response message, the location information of the terminal device reported by the terminal device.

3. The method according to claim 1, wherein the core network device is a location management network element, and the obtaining, by the core network device, location information of the terminal device reported by the terminal device and location information reported by the first base station further comprises:
    receiving, by the location management network element, a request message sent by a mobility management device, wherein the request message comprises the location information of the terminal device and the location information reported by the first base station.

4. A core network device, comprising:
    a transceiver module obtaining location information of a terminal device reported by the terminal device and location information reported by a first base station; and
    a processing module determining whether the location information of the terminal device matches the location information reported by the first base station, wherein
    the transceiver module further sends a reject message to the terminal device if the location information of the terminal device does not match the location information reported by the first base station,
    wherein the location information of the terminal device further comprises:
        location information broadcast by a second base station, wherein the second base station is a base station accessed by the terminal device;
        auxiliary location information, wherein the auxiliary location information is information provided by an auxiliary positioning device, and the auxiliary location information is used to indicate a location of the terminal device; and
        location information broadcast by a third base station, wherein the third base station is a base station whose distance to the second base station is shorter than a preset distance.

5. The core network device according to claim 4, wherein the core network device is a mobility management device, and the transceiver module further:
    obtains, by using a non-access stratum initial attach request message, a non-access stratum registration request message, or a non-access stratum security mode command complete response message, the location information of the terminal device reported by the terminal device.

6. The core network device according to claim 4, wherein the core network device is a location management network element, and the transceiver module further:
   receives a request message sent by a mobility management device, wherein the request message comprises the location information of the terminal device and the location information reported by the first base station.

* * * * *